US012782557B2

(12) United States Patent
Honda

(10) Patent No.: US 12,782,557 B2
(45) Date of Patent: Nov. 3, 2026

(54) OBJECT POSITION ANALYSIS DEVICE, OBJECT POSITION ANALYSIS METHOD, AND PROGRAM

(71) Applicant: Sony Group Corporation, Tokyo (JP)

(72) Inventor: Yoshiro Honda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 155 days.

(21) Appl. No.: 18/869,294

(22) PCT Filed: May 24, 2023

(86) PCT No.: PCT/JP2023/019360
§ 371 (c)(1),
(2) Date: Nov. 26, 2024

(87) PCT Pub. No.: WO2023/243348
PCT Pub. Date: Dec. 21, 2023

(65) Prior Publication Data

US 2025/0306201 A1 Oct. 2, 2025

(30) Foreign Application Priority Data

Jun. 14, 2022 (JP) ................................ 2022-095492

(51) Int. Cl.
*G01S 15/42* (2006.01)
*G01S 7/527* (2006.01)

(52) U.S. Cl.
CPC .............. *G01S 15/42* (2013.01); *G01S 7/527* (2013.01)

(58) Field of Classification Search
CPC . G01S 15/42; G01S 7/52; G01S 7/527; G01S 15/931; G01S 3/803; G01S 15/93;
(Continued)

(56) References Cited

U.S. PATENT DOCUMENTS

| | | | | |
|---|---|---|---|---|
| 7,880,669 | B2 * | 2/2011 | Shinagawa ........... | G01S 13/426 342/146 |
| 8,248,887 | B2 * | 8/2012 | Akiyama .............. | G01S 15/101 367/98 |

(Continued)

FOREIGN PATENT DOCUMENTS

| | | | |
|---|---|---|---|
| DE | 102013200458 | A1 | 7/2014 |
| JP | 2000-152372 | A | 5/2000 |

(Continued)

*Primary Examiner* — Isam A Alsomiri
*Assistant Examiner* — Amie M Ndure
(74) *Attorney, Agent, or Firm* — Paratus Law Group, PLLC

(57) ABSTRACT

Provided is an object position analysis device that analyzes the position of an object in a specific analysis target region. The device includes: a speaker that outputs a sound pulse signal; a plurality of microphones that input reflected waves from the sound pulse signal output by the speaker; and a data processing unit that analyzes the reflected waves input by the plurality of microphones and analyzes a position of an object that has reflected the sound pulse signal. The data processing unit: selects, as an analysis target reflected wave, a reflected wave, among the reflected waves input by the plurality of microphones, having a phase difference that has a high correlation with a phase difference of a sound pulse signal from an analysis target direction defined in advance; and analyzes a position of an object in an analysis target region near the analysis target direction through analysis processing on the analysis target reflected wave selected.

18 Claims, 33 Drawing Sheets

(58) Field of Classification Search
CPC .. G01S 3/805; G01H 3/00; H04R 3/00; G10L 25/18; G10L 21/0216
See application file for complete search history.

(56) References Cited

U.S. PATENT DOCUMENTS

| | | | | |
|---|---|---|---|---|
| 10,996,331 | B2 * | 5/2021 | Yamamoto | G01S 15/32 |
| 2008/0169969 | A1 * | 7/2008 | Shirai | G01S 7/4972 342/107 |
| 2010/0220551 | A1 * | 9/2010 | Akiyama | G01S 7/539 367/99 |
| 2012/0223855 | A1 * | 9/2012 | Kurono | G01S 7/2925 342/146 |
| 2014/0136095 | A1 * | 5/2014 | Isogai | G01S 15/87 701/300 |
| 2015/0245152 | A1 * | 8/2015 | Ding | H04R 1/406 381/56 |
| 2016/0116583 | A1 * | 4/2016 | Fukuman | G01S 15/46 342/59 |
| 2019/0011551 | A1 * | 1/2019 | Yamamoto | G01S 15/32 |
| 2020/0337679 | A1 * | 10/2020 | Watanabe | A61B 8/085 |
| 2021/0025969 | A1 * | 1/2021 | Ouchi | G01S 13/931 |
| 2021/0356583 | A1 * | 11/2021 | Kutomi | G01S 15/101 |

FOREIGN PATENT DOCUMENTS

| | | | |
|---|---|---|---|
| JP | 2001-183437 | A | 7/2001 |
| JP | 2010-197342 | A | 9/2010 |
| JP | 2015-161551 | A | 9/2015 |
| JP | 2019-015598 | A | 1/2019 |
| WO | WO 2006/004099 | A1 | 1/2006 |

* cited by examiner

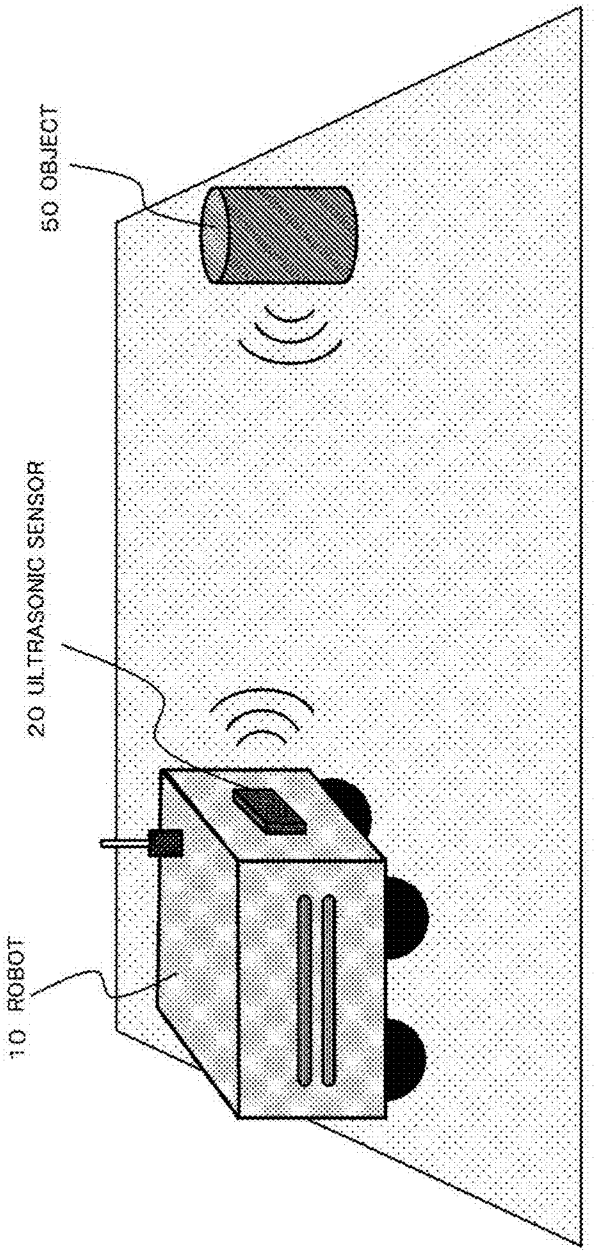
[Fig. 1]

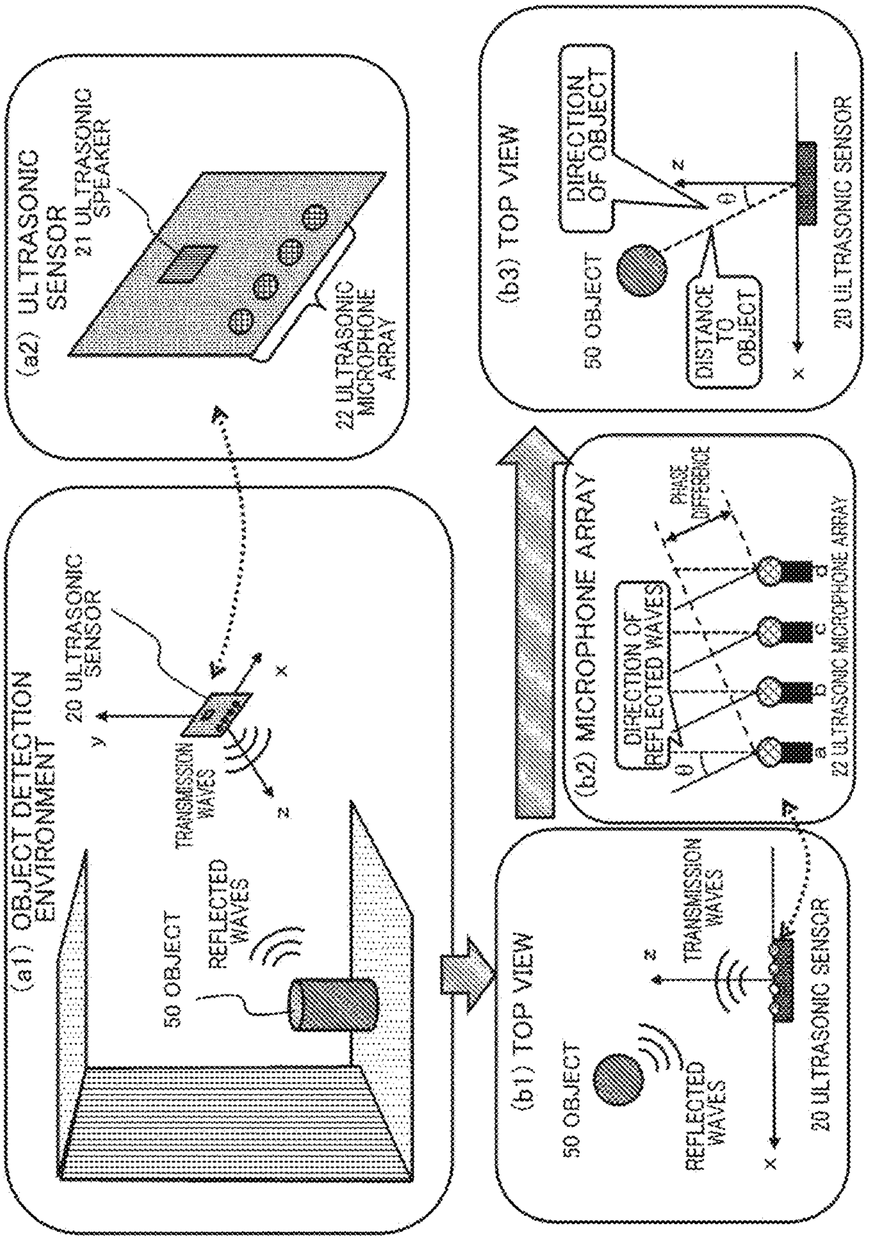
[Fig. 2]

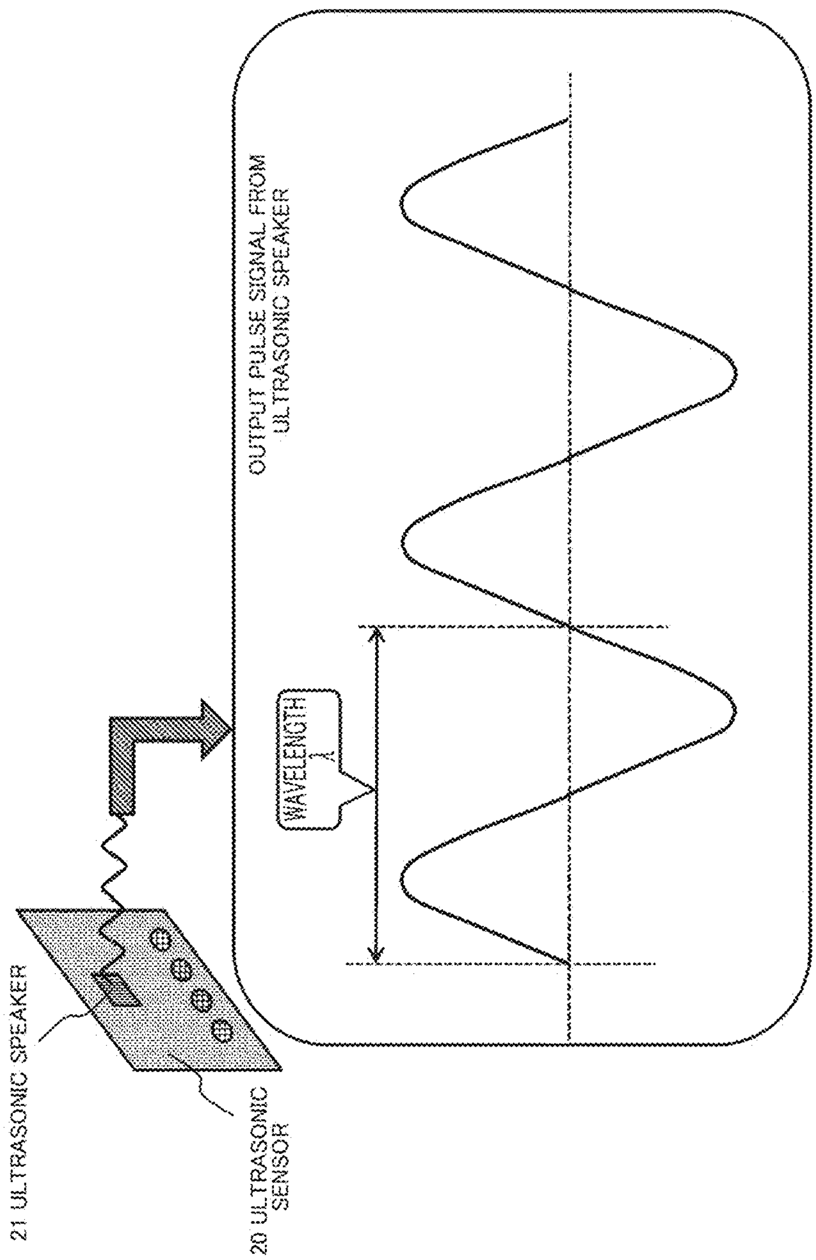
[Fig. 3]

[Fig. 4]
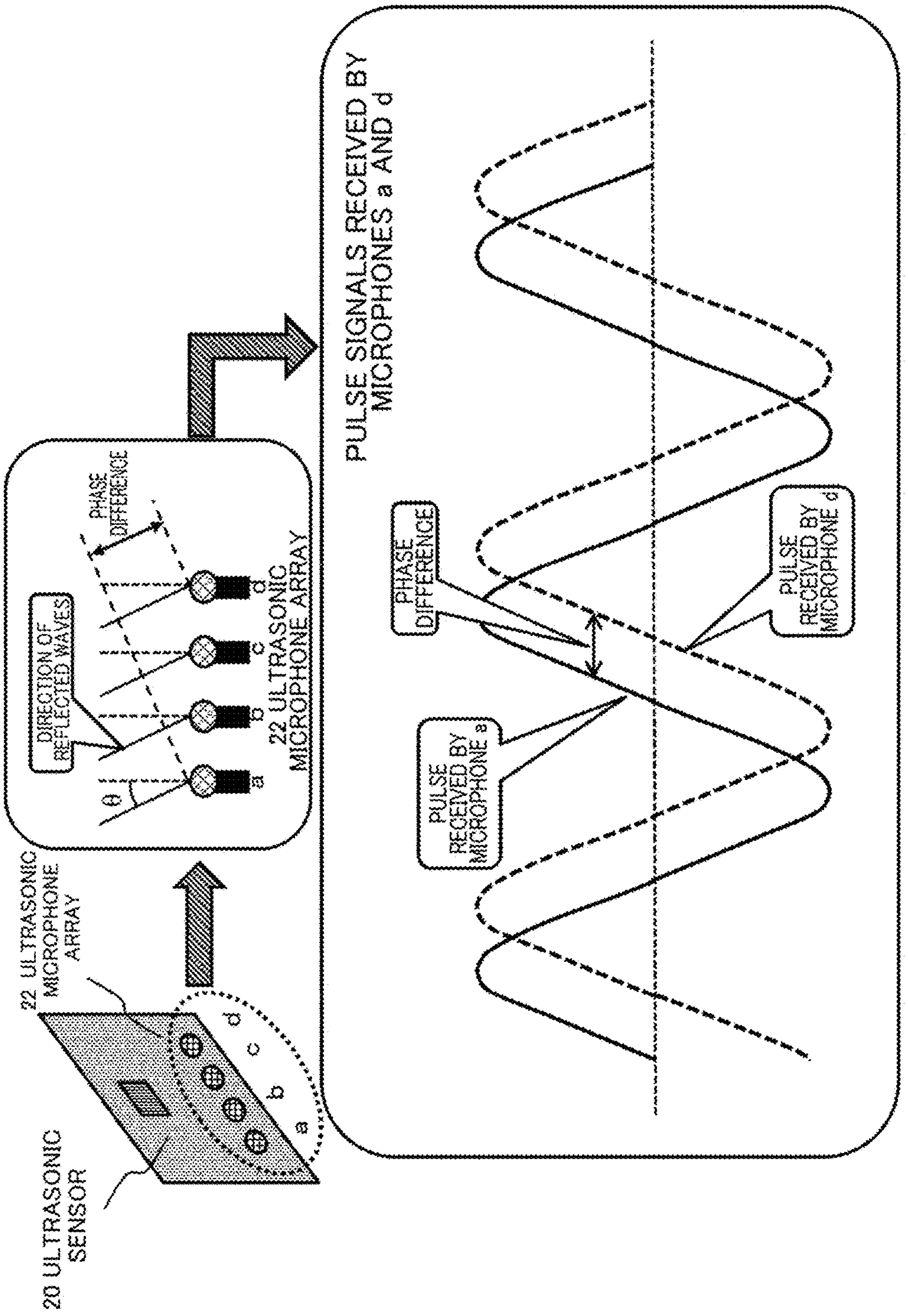

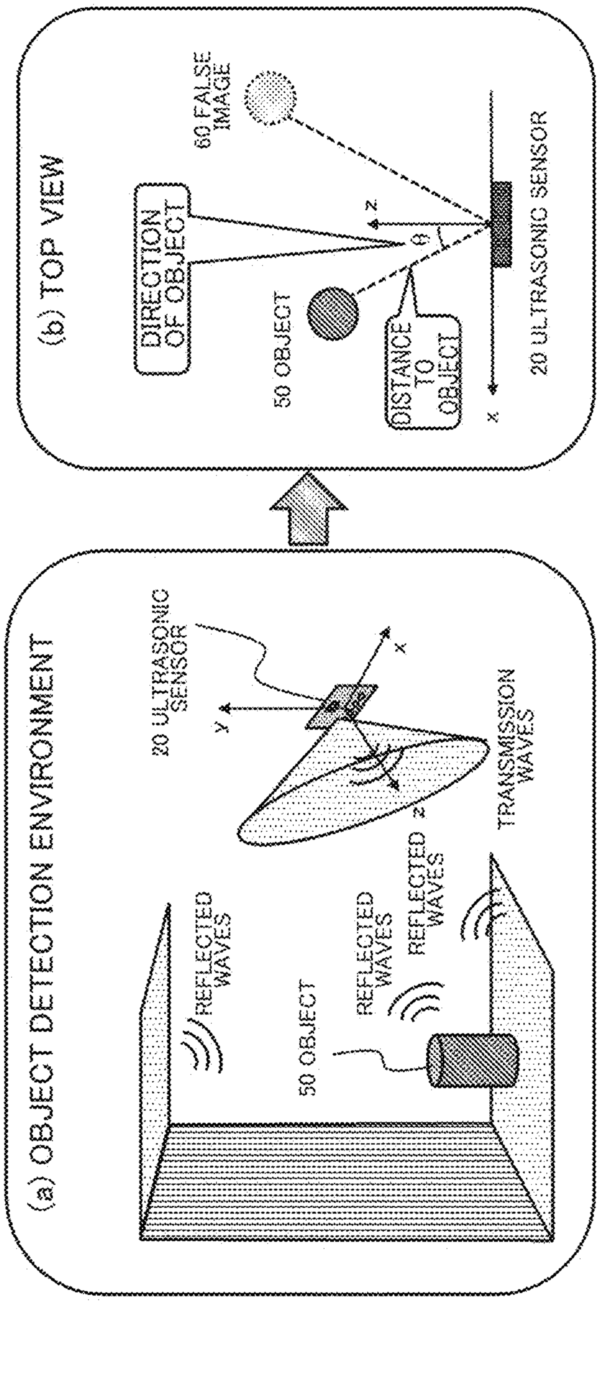
[Fig. 5]

[Fig. 6]
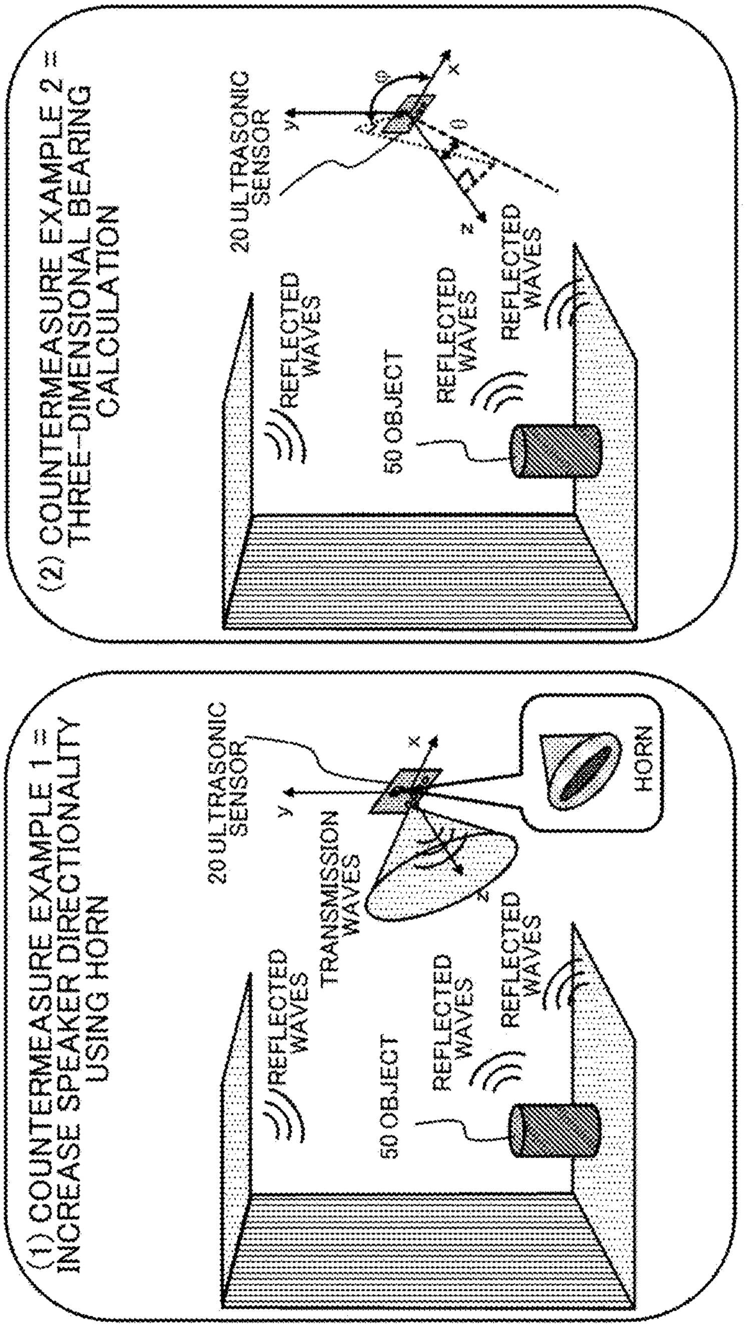

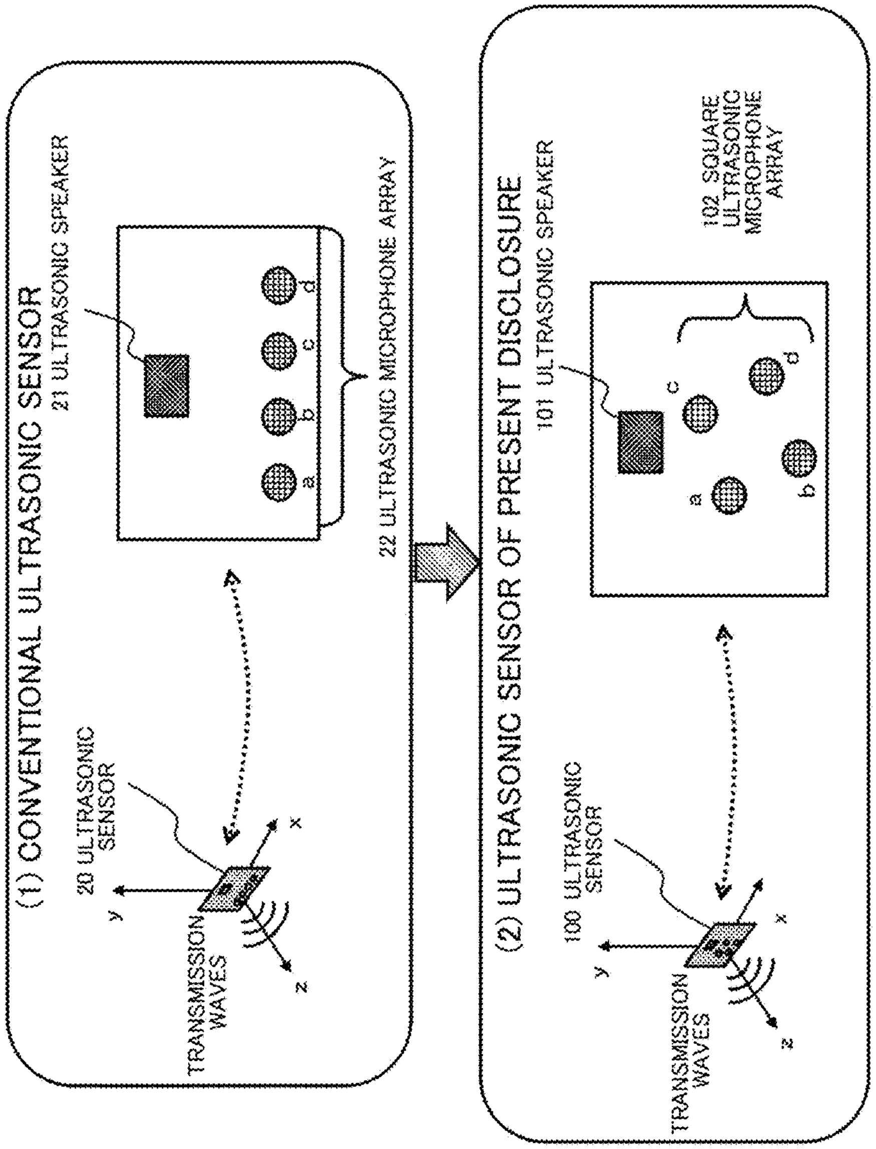
[Fig. 7]

[Fig. 8]
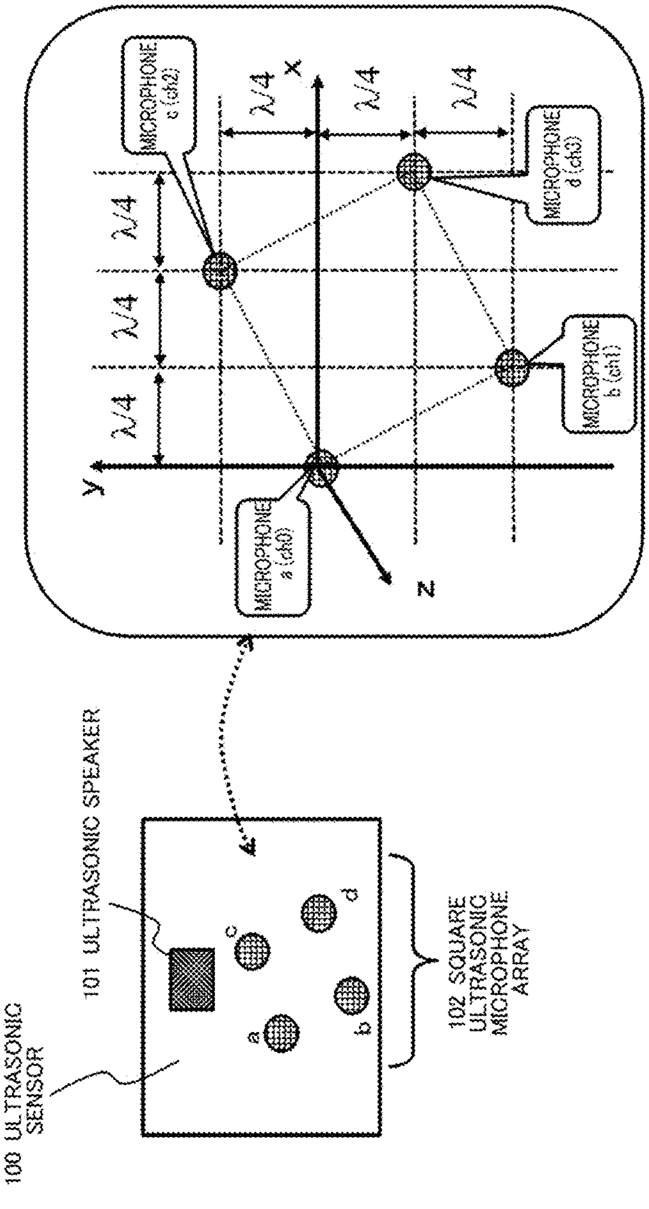

[Fig. 9]
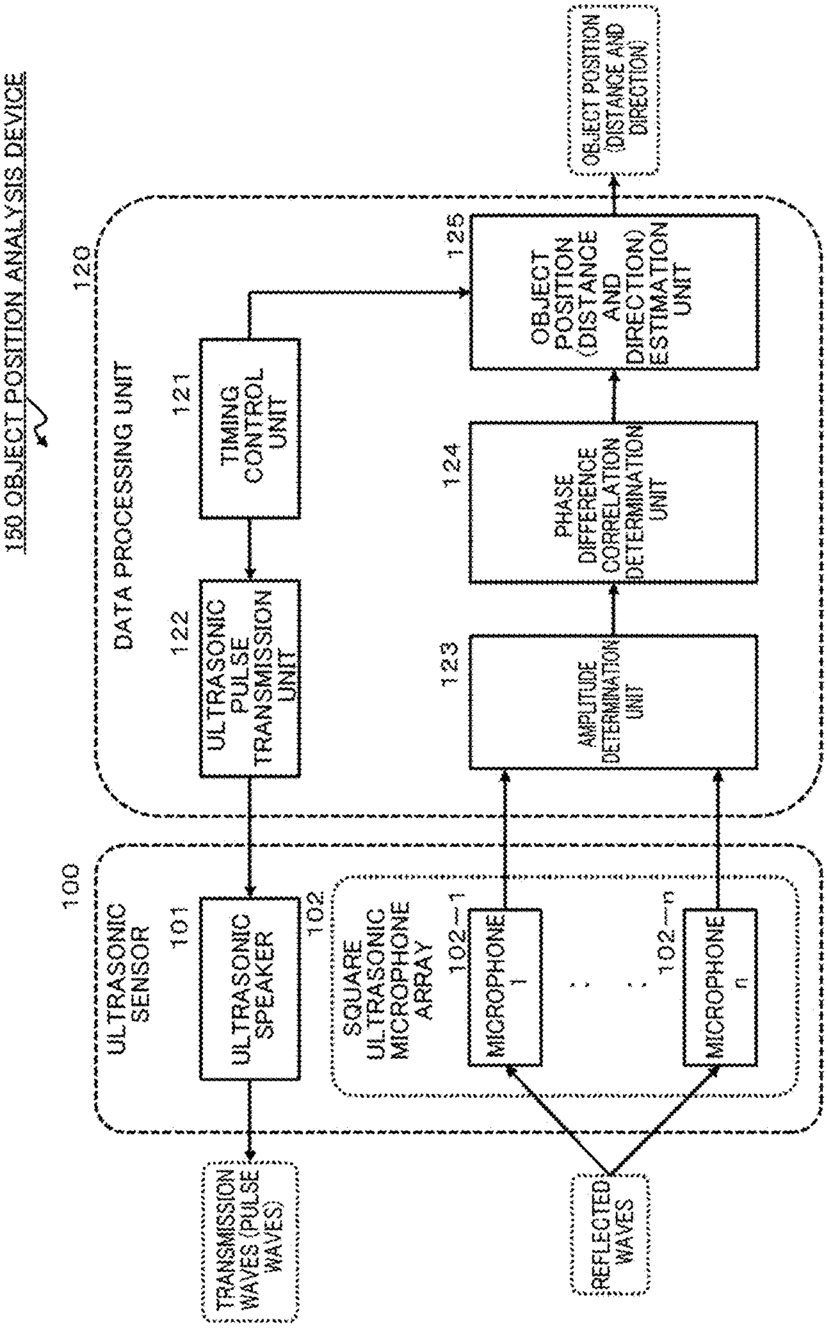

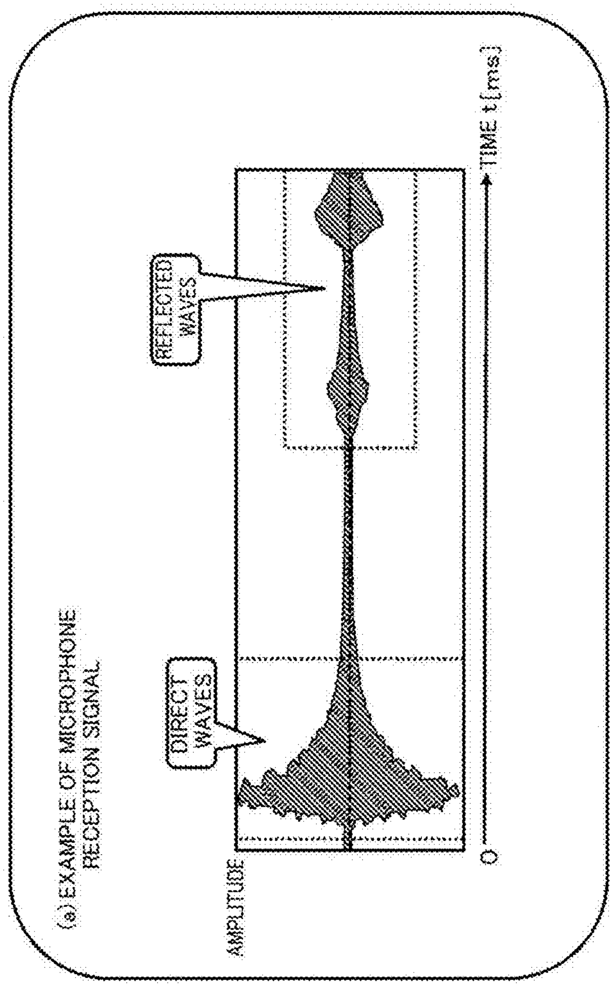
[Fig. 10]

[Fig. 11]
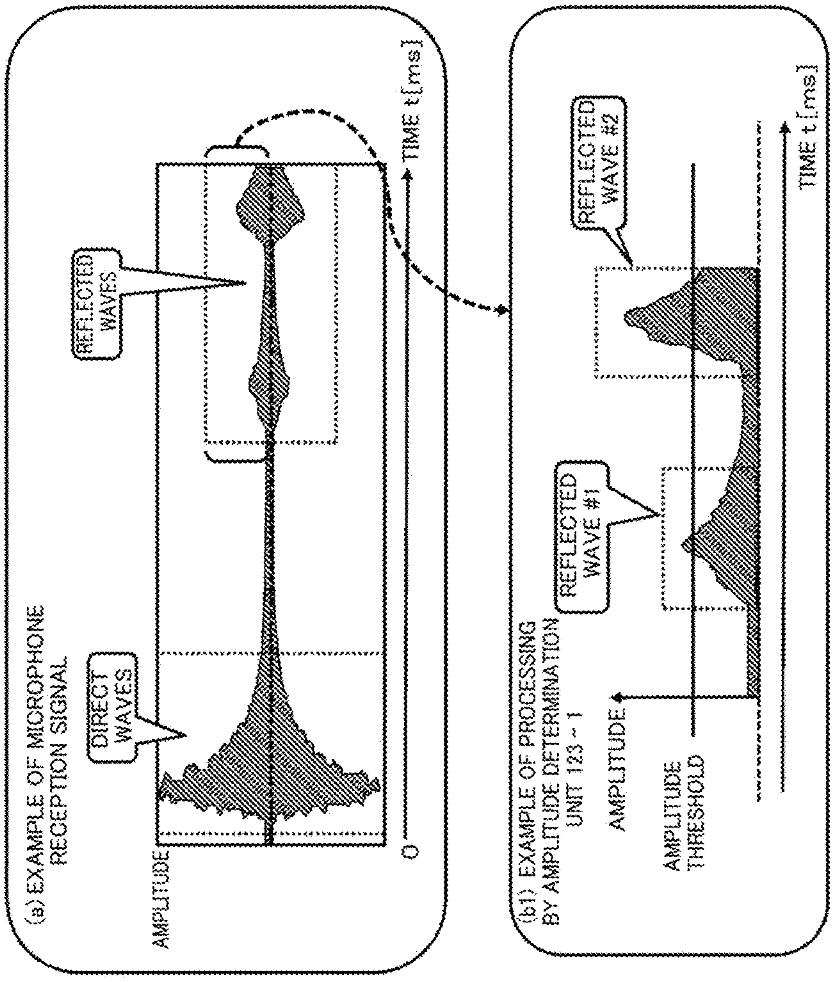

[Fig. 12]
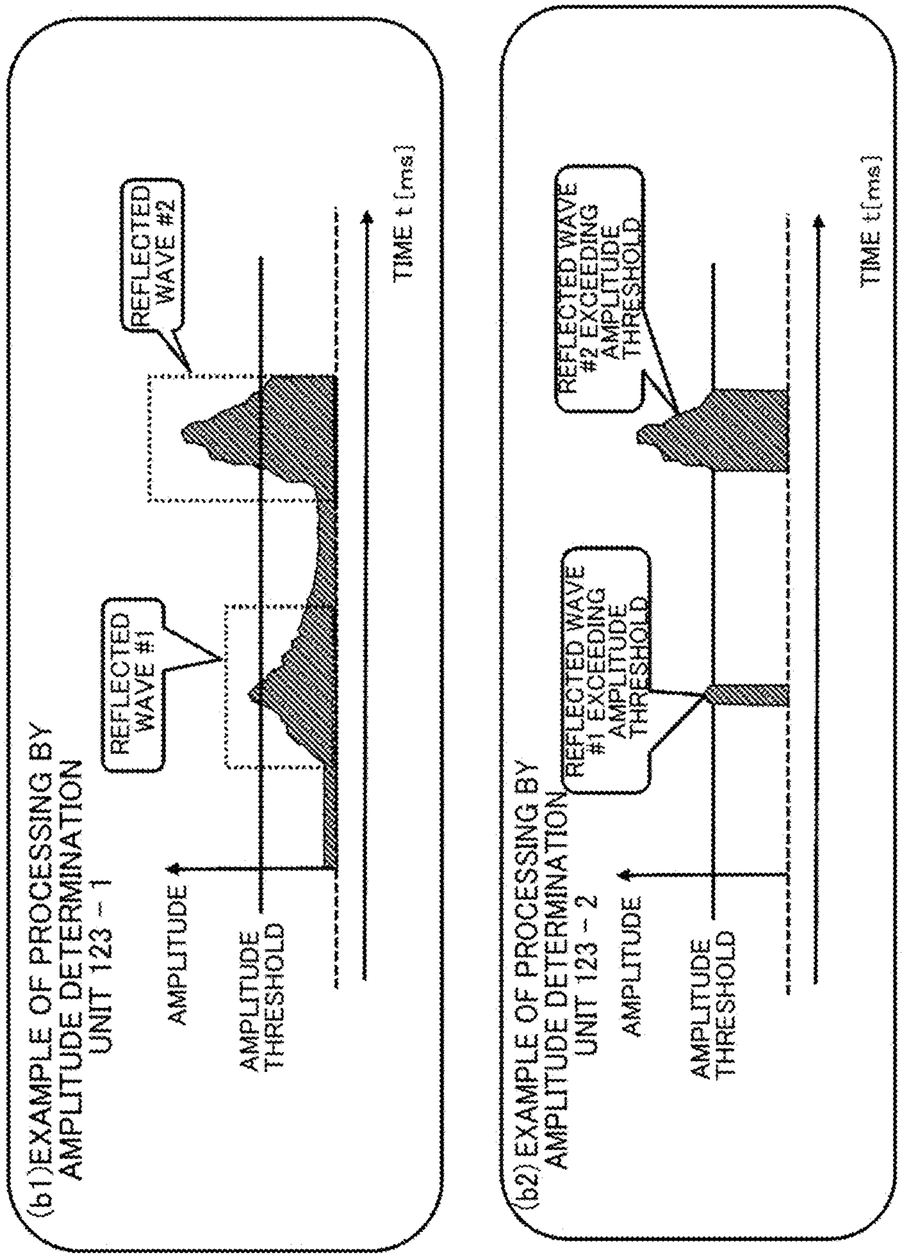

[Fig. 13]
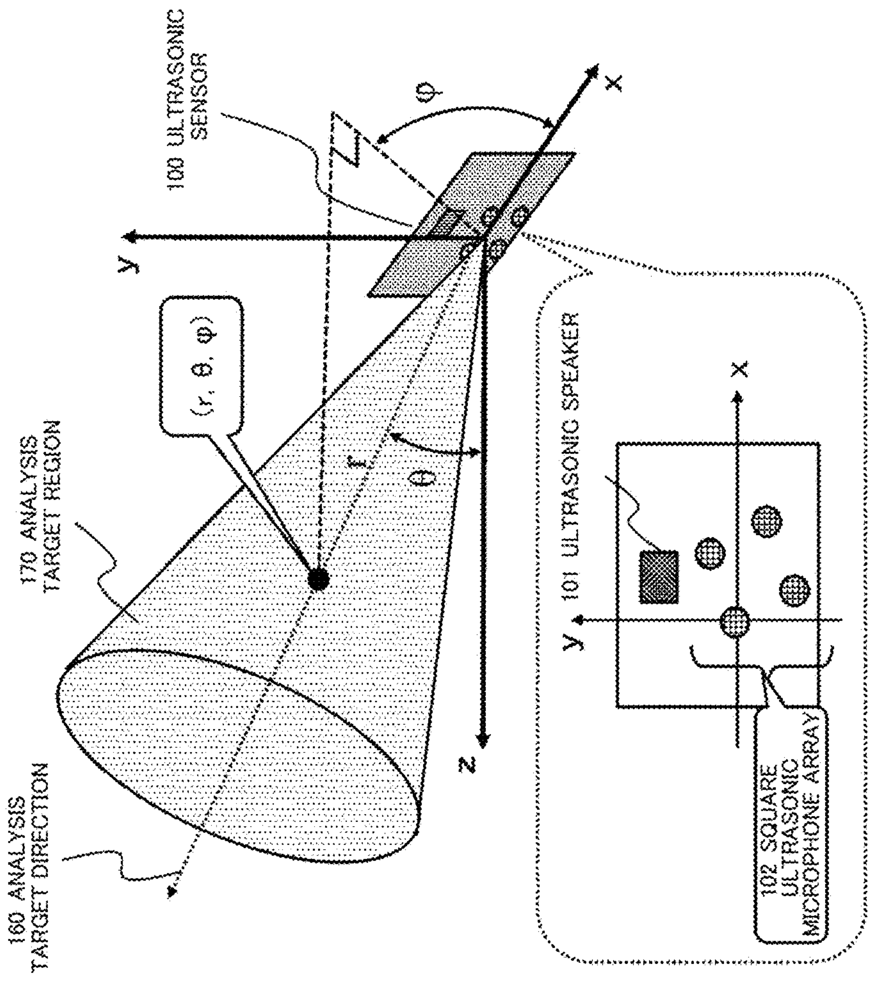

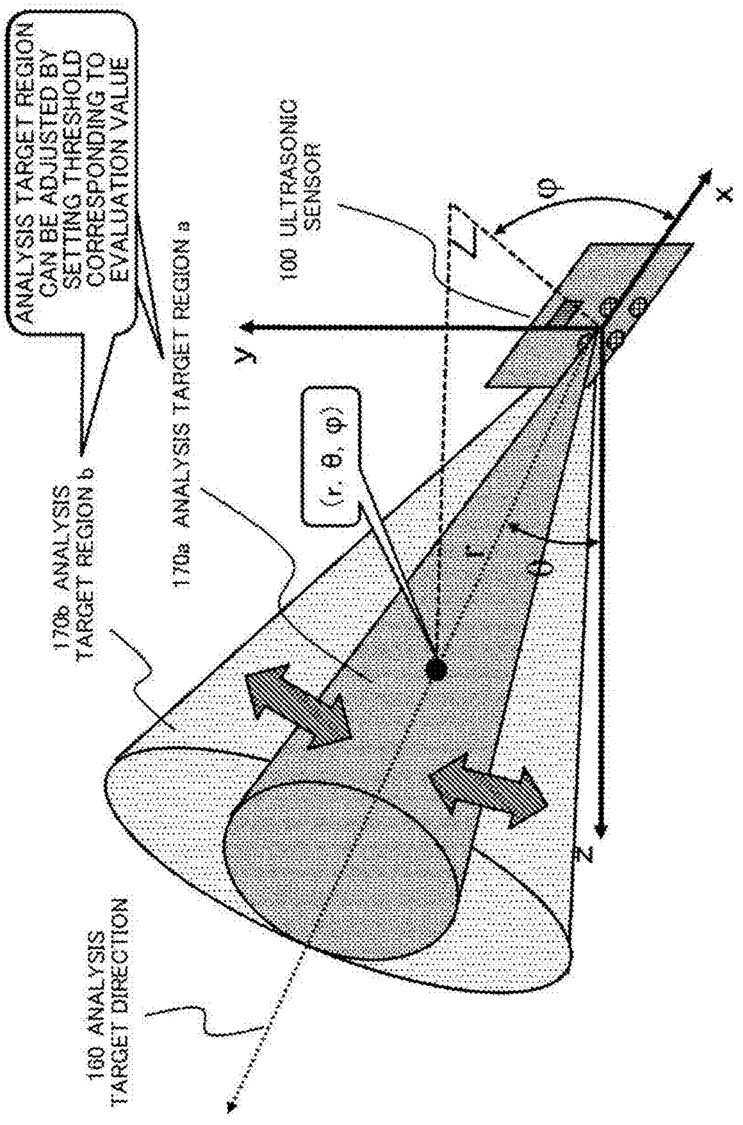
[Fig. 14]

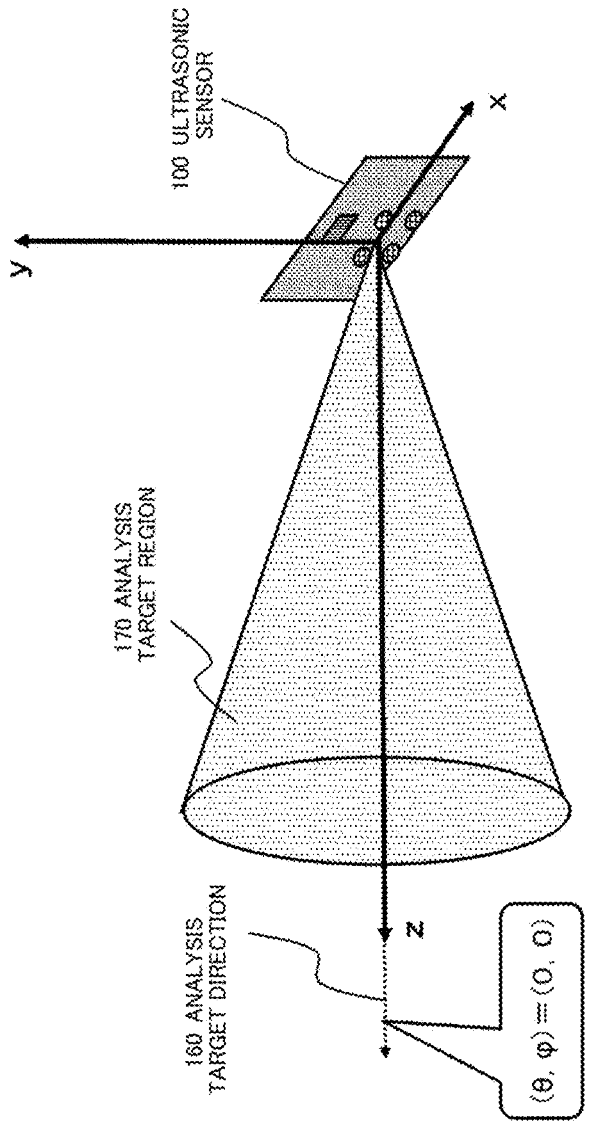
[Fig. 15]

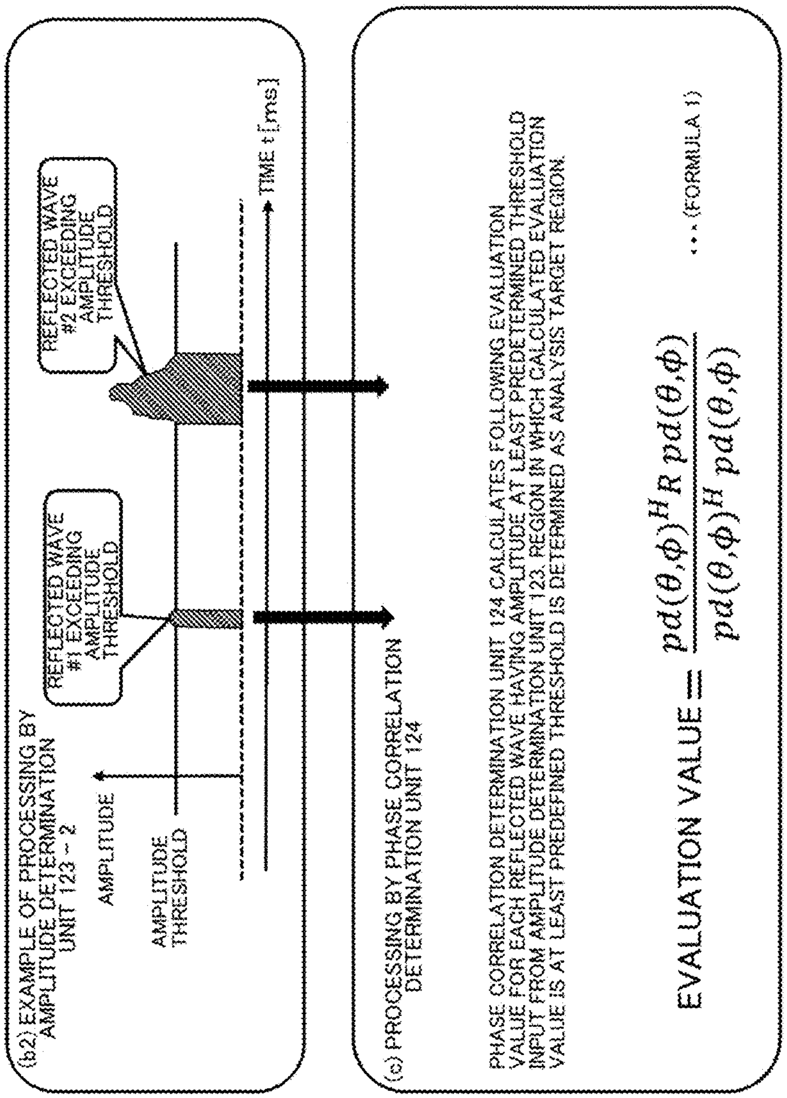
[Fig. 16]

[Fig. 17]

(c1)PROCESSING BY PHASE CORRELATION DETERMINATION UNIT 124
(EVALUATION VALUE CALCULATION PROCESSING)

$$\text{EVALUATION VALUE} = \frac{pd(\theta,\phi)^H R\, pd(\theta,\phi)}{pd(\theta,\phi)^H\, pd(\theta,\phi)} \quad \cdots \text{(FORMULA 1)}$$

IN ABOVE FORMULA, $$pd(\theta,\phi) = \begin{pmatrix} pd(\theta,\phi)_0 \\ pd(\theta,\phi)_1 \\ pd(\theta,\phi)_2 \\ pd(\theta,\phi)_3 \end{pmatrix} = \begin{pmatrix} 1 \\ \exp\left[-i \times \frac{2\pi}{\lambda} \times \left(\left(\frac{\lambda}{4}\right) sin\theta cos\phi - \left(\frac{\lambda}{2}\right) sin\theta sin\phi\right)\right] \\ \exp\left[-i \times \frac{2\pi}{\lambda} \times \left(\left(\frac{\lambda}{2}\right) sin\theta cos\phi + \left(\frac{\lambda}{4}\right) sin\theta sin\phi\right)\right] \\ \exp\left[-i \times \frac{2\pi}{\lambda} \times \left(\left(\frac{3\lambda}{4}\right) sin\theta cos\phi - \left(\frac{\lambda}{4}\right) sin\theta sin\phi\right)\right] \end{pmatrix} \quad \cdots \text{(FORMULA 2)}$$

$i$: IMAGINARY UNIT
$\pi$: PI
$\lambda$: AUDIO SIGNAL WAVELENGTH
$\theta$: ANGLE BETWEEN ANALYSIS TARGET DIRECTION AND z AXIS
$\phi$: ANGLE BETWEEN xy PLANE PROJECTION LINE AND x AXIS IN ANALYSIS TARGET DIRECTION
$pd(\theta,\phi)^H$ IS HERMITIAN TRANSPOSE OF $pd(\theta,\phi)$ R IS COVARIANCE MATRIX OF RECEIVED SIGNAL, AND WHEN REFLECTED WAVE AT RECEPTION TIME t IS SET TO x(t), IS CALCULATED THROUGH FOLLOWING FORMULA. ENSEMBLE MEAN IS OBTAINED DURING PRE-SET TIME WINDOW.

$$R = E[x(t)x(t)^H] \quad \cdots \text{(FORMULA 3)}$$

$x(t)^H$ IS HERMITIAN TRANSPOSE OF x(t)
E[] IS ENSEMBLE MEAN $$x(t) = \begin{pmatrix} x0(t) \\ x1(t) \\ x2(t) \\ x3(t) \end{pmatrix} \quad \cdots \text{(FORMULA 4)}$$

[Fig. 18]
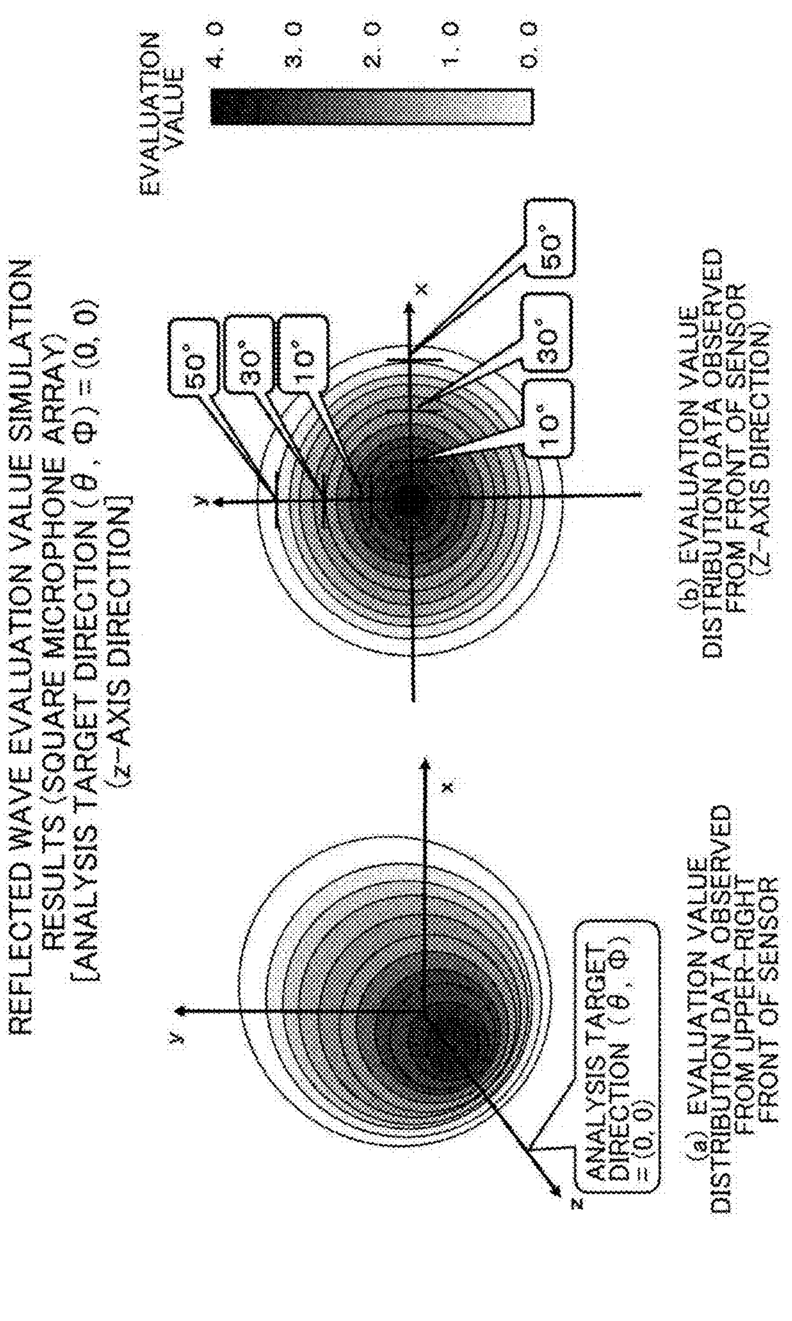

[Fig. 19]
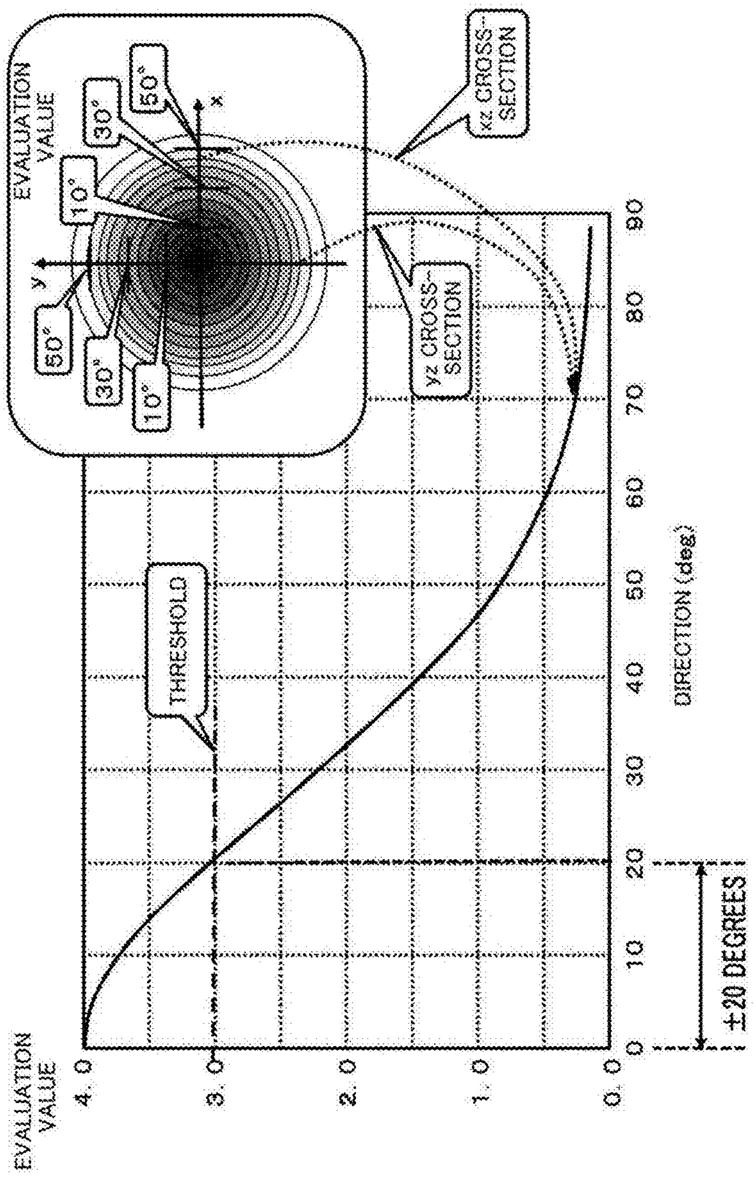

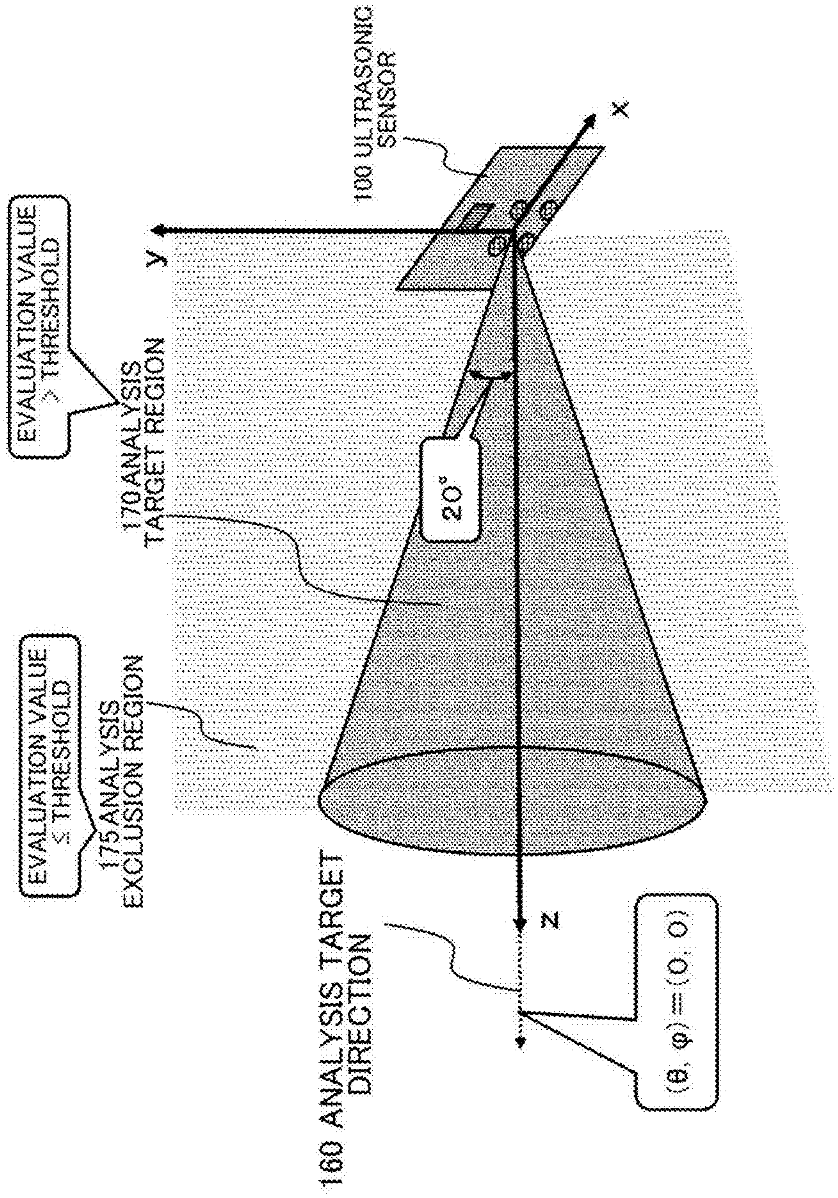
[Fig. 20]

[Fig. 21]
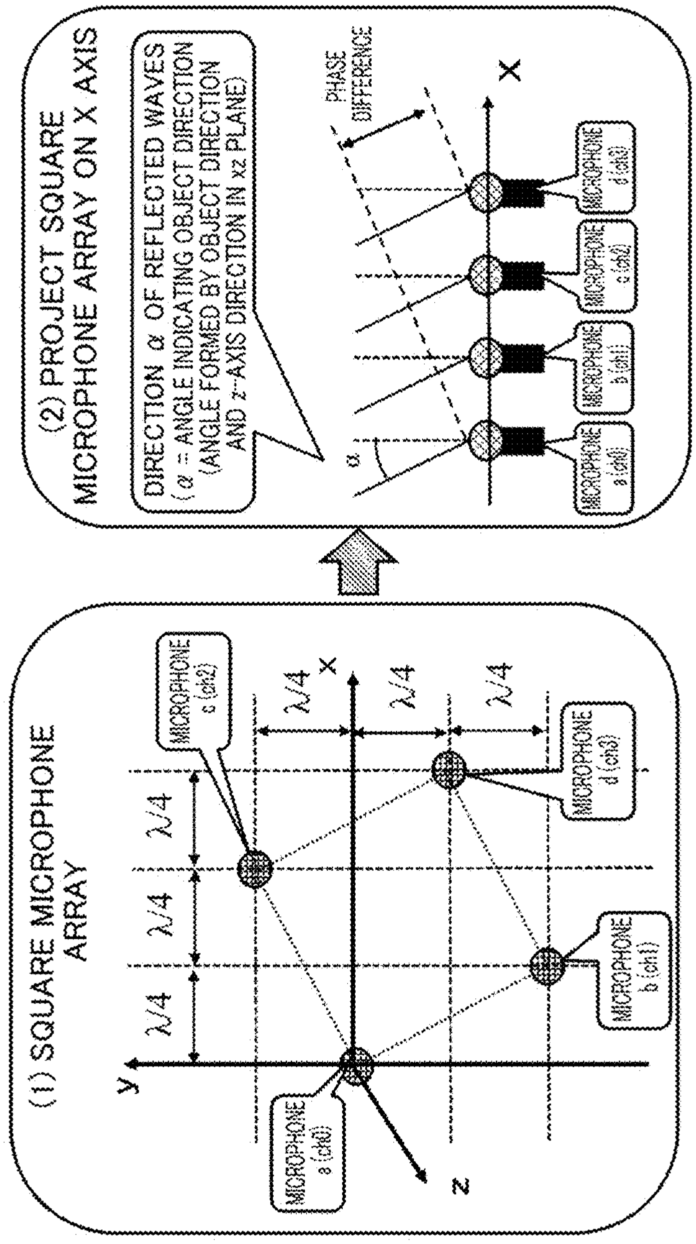

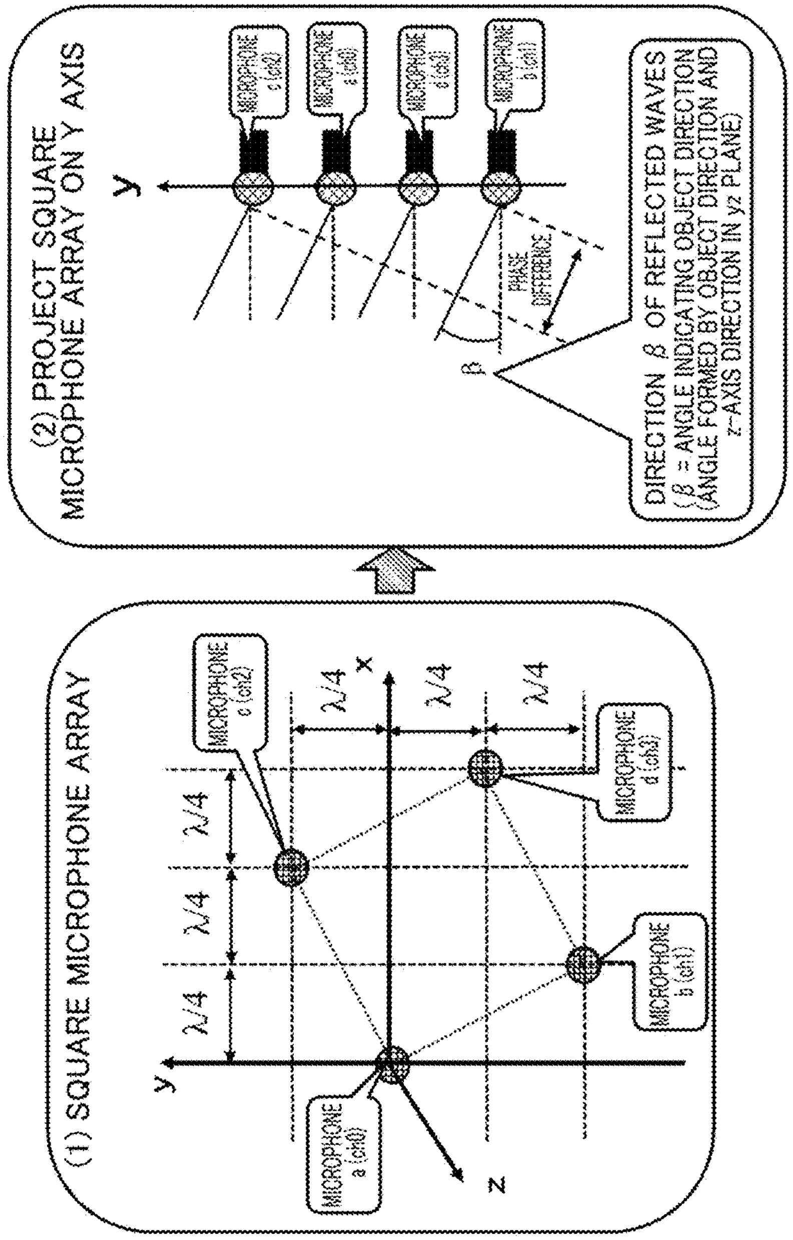
[Fig. 22]

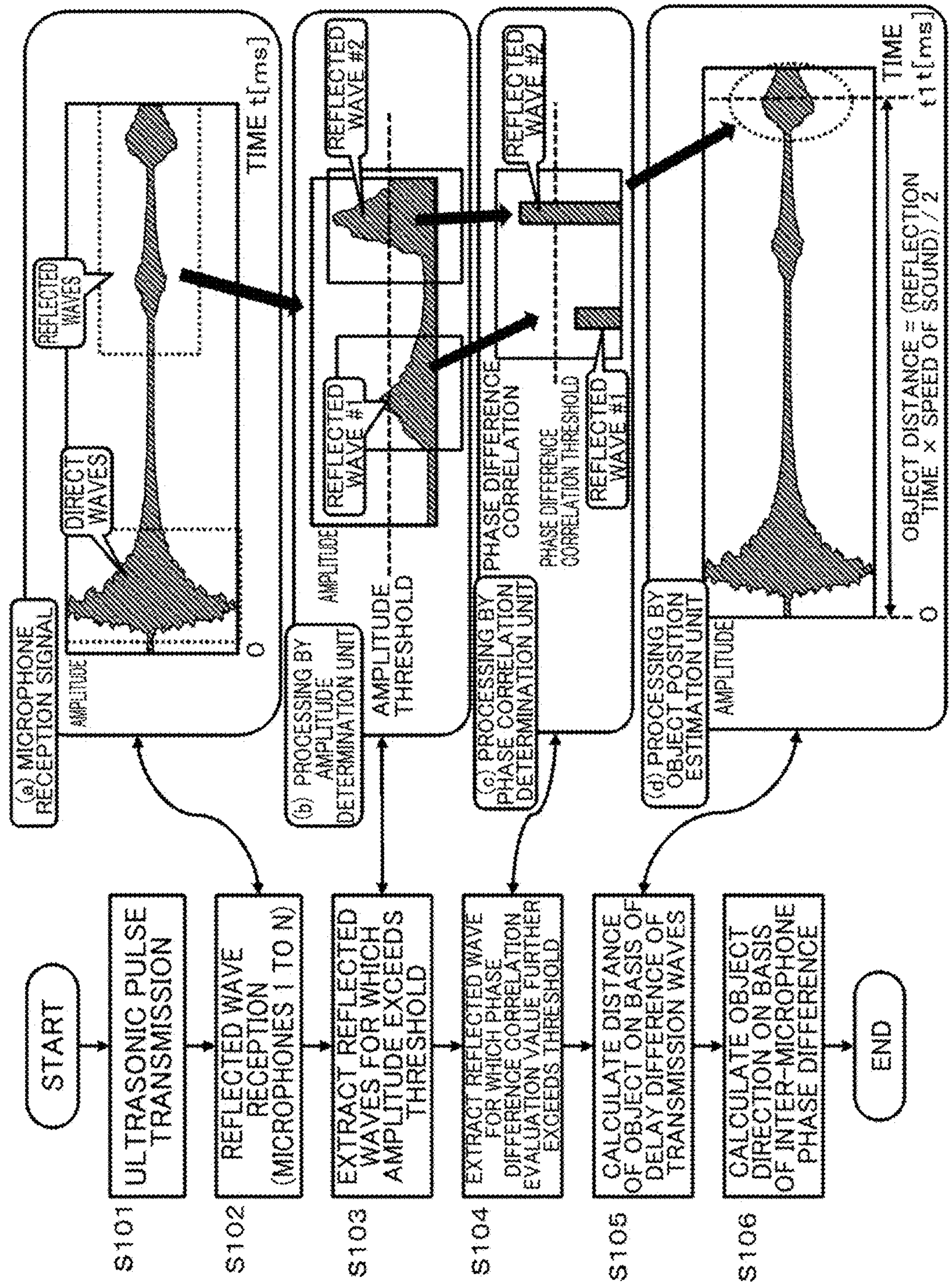
[Fig. 23]

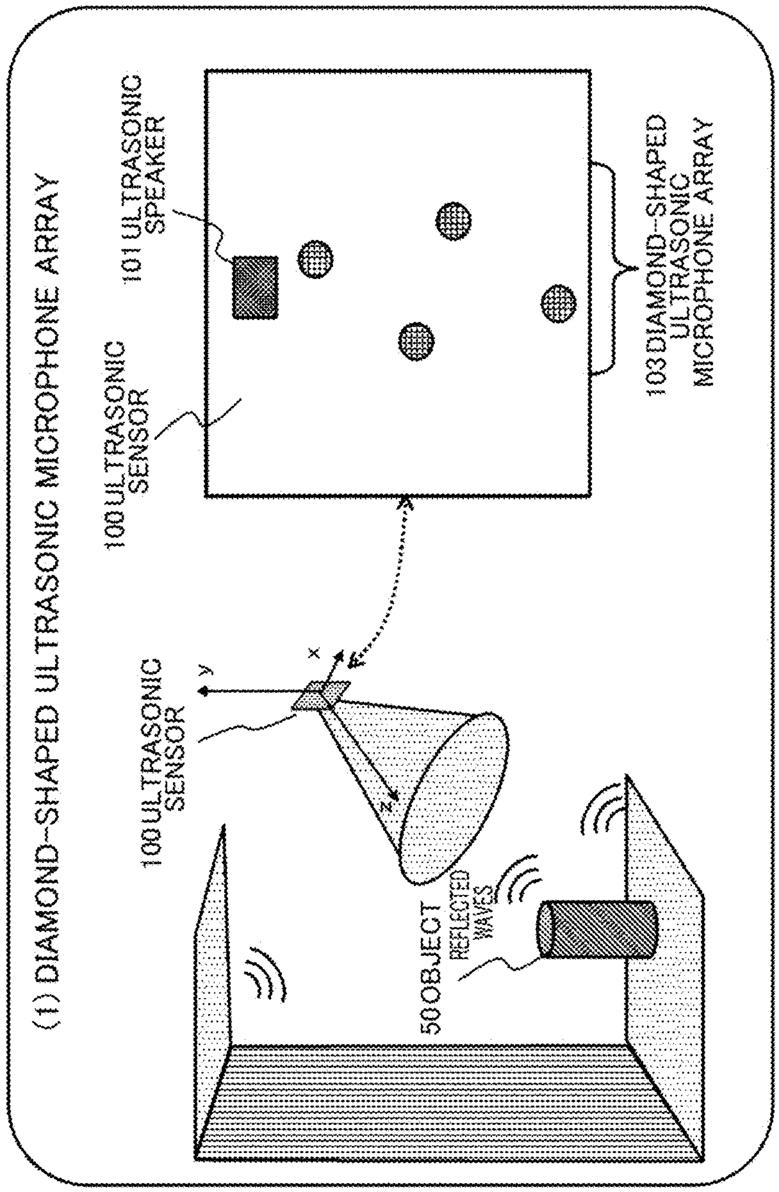
[Fig. 24]

[Fig. 25]
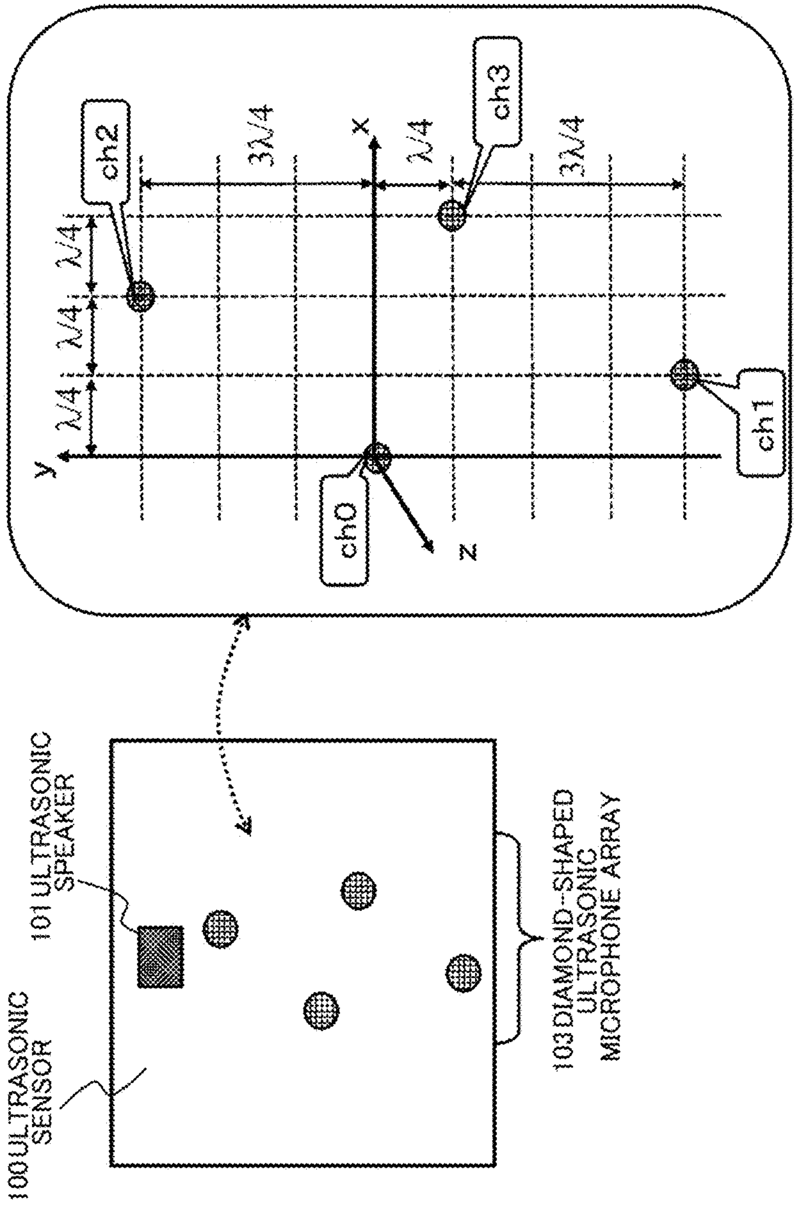

[Fig. 26]
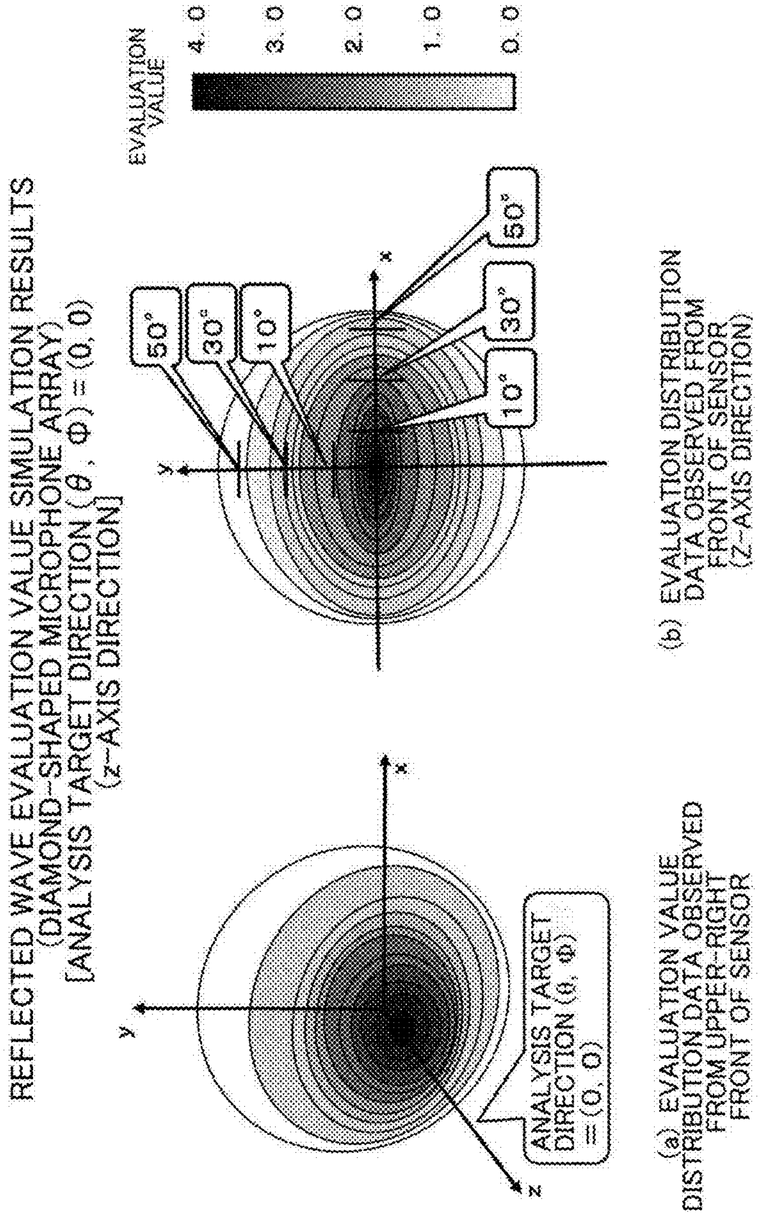

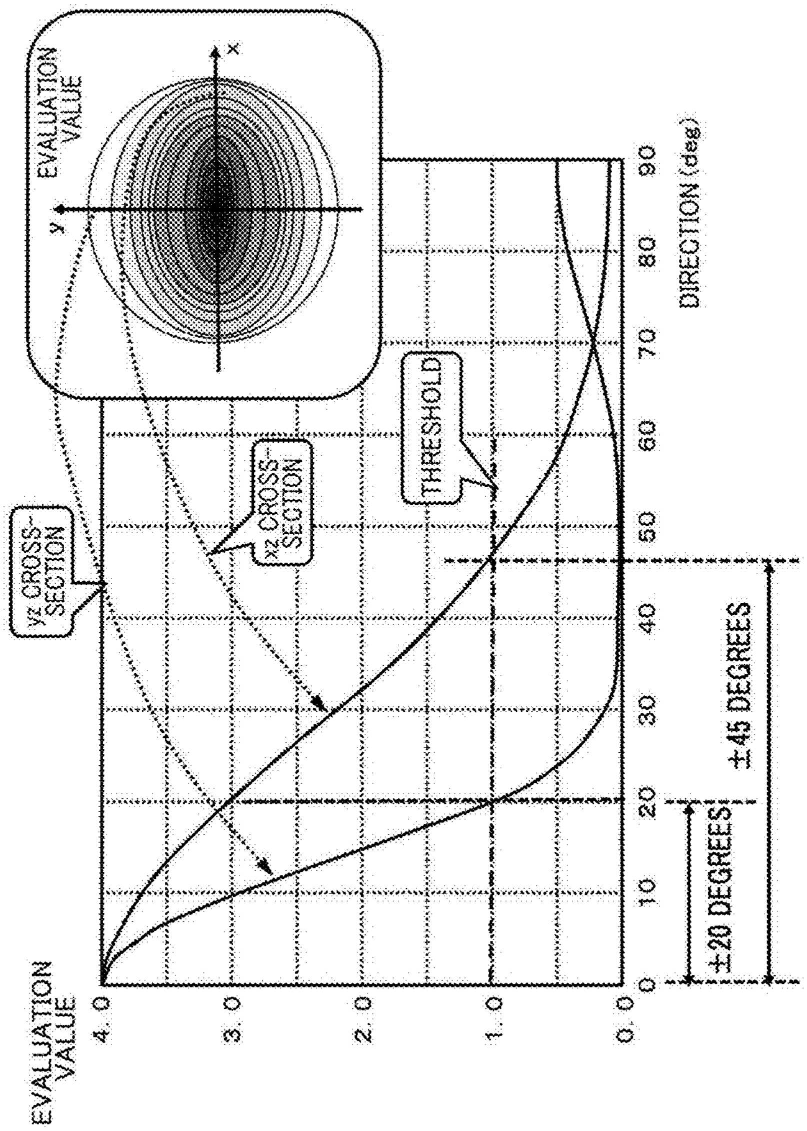
[Fig. 27]

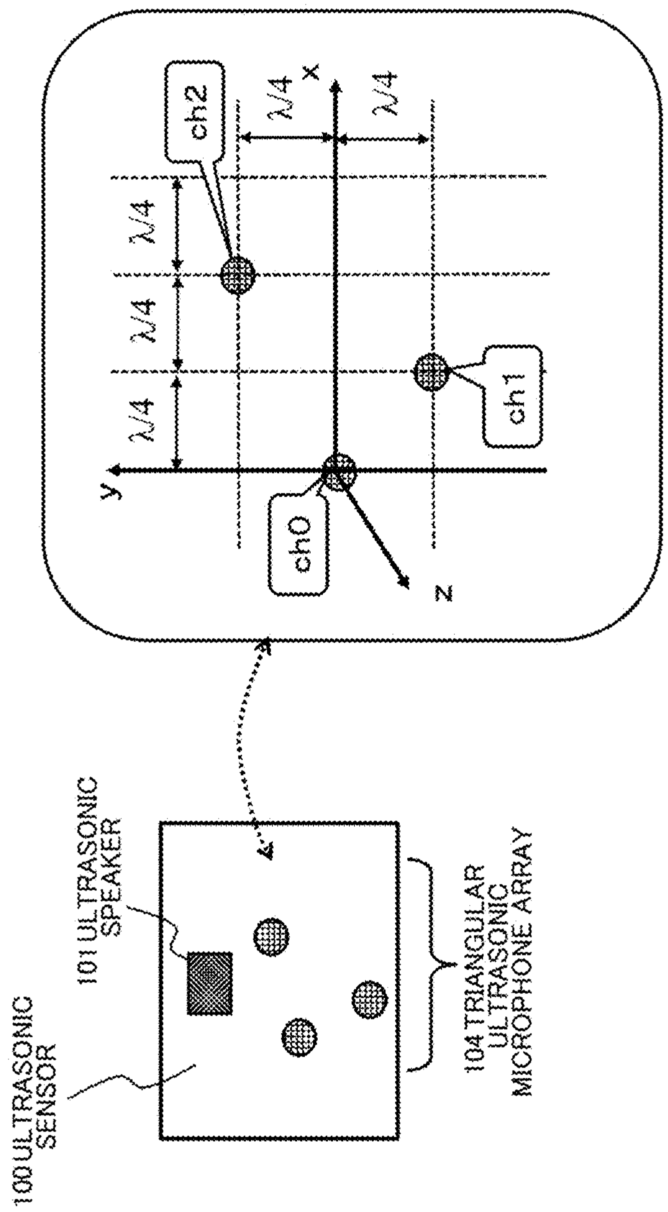
[Fig. 28]

[Fig. 29]
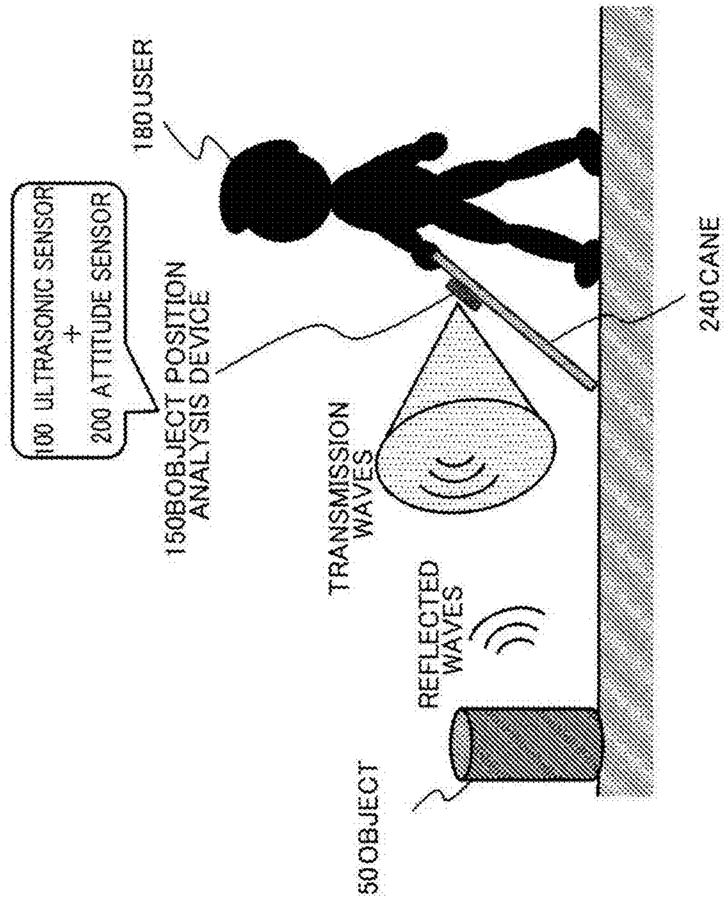

[Fig. 30]
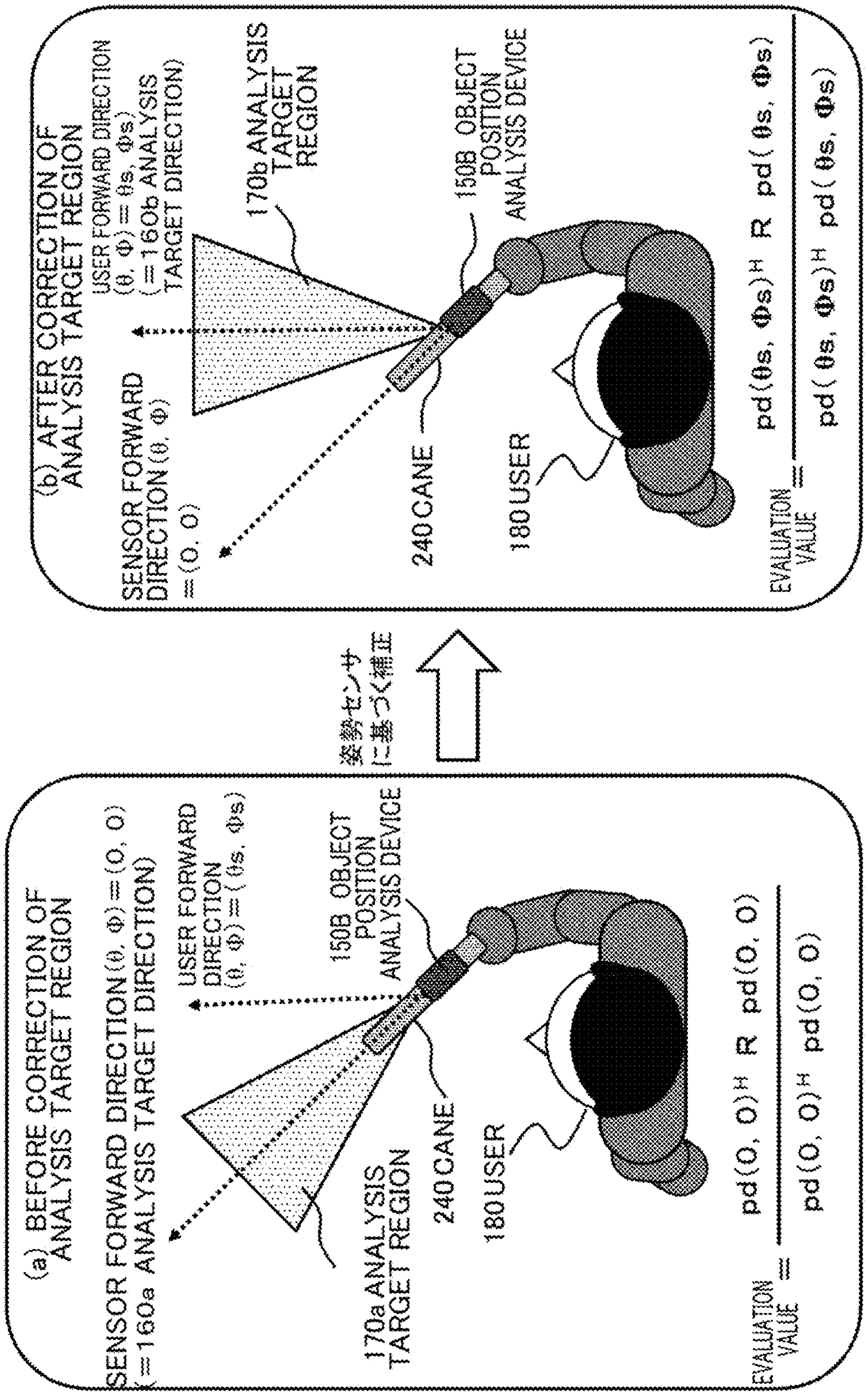

[Fig. 31]
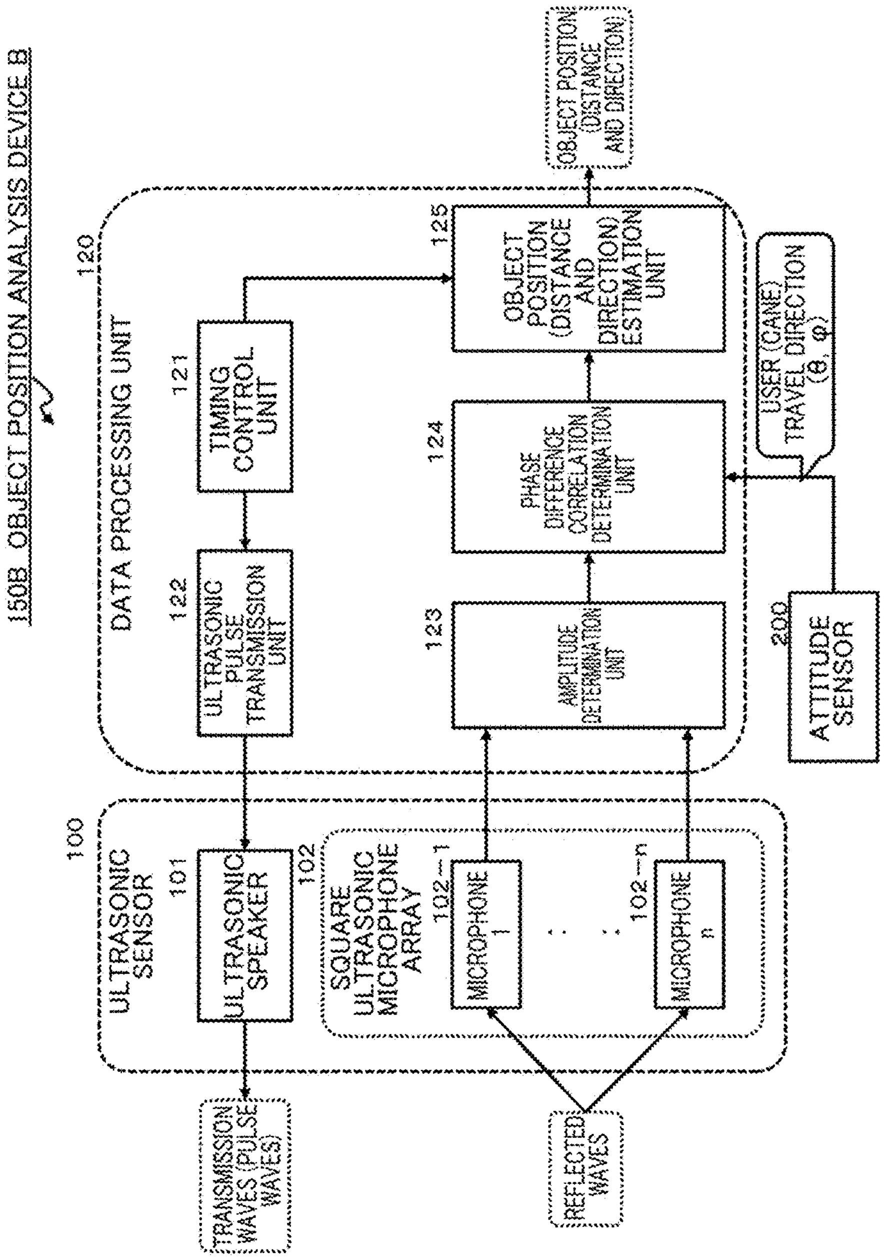

[Fig. 32]
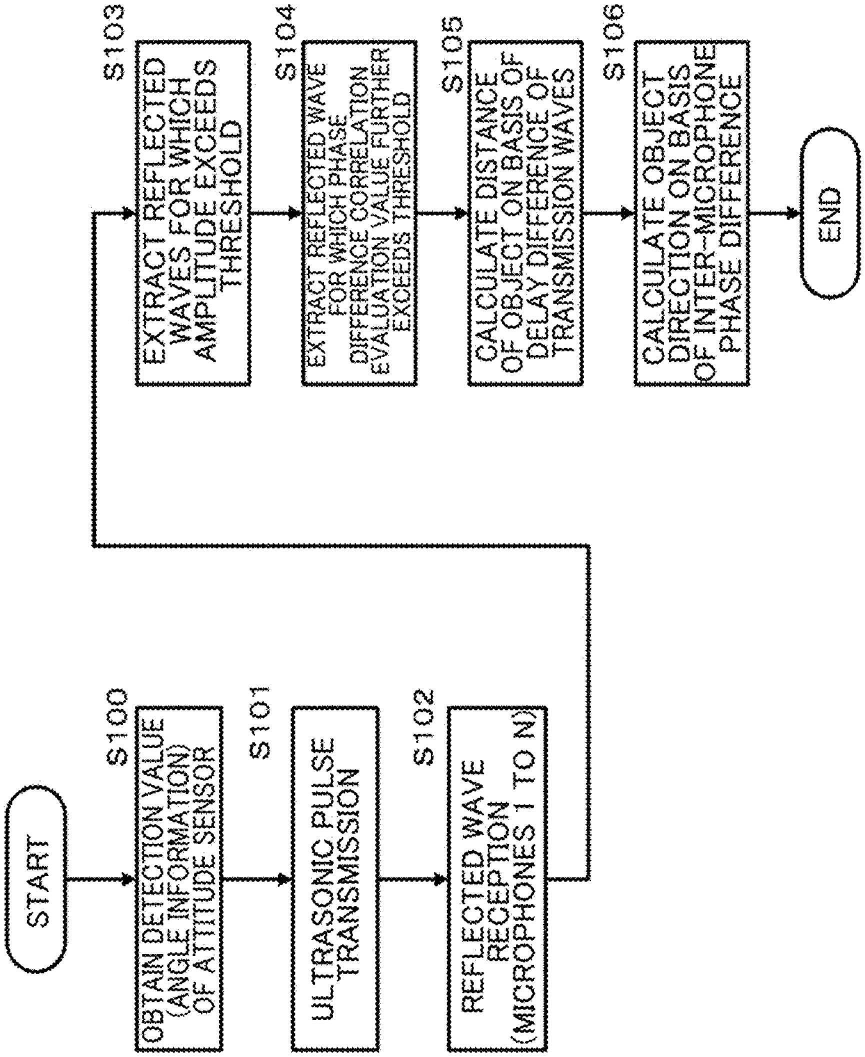

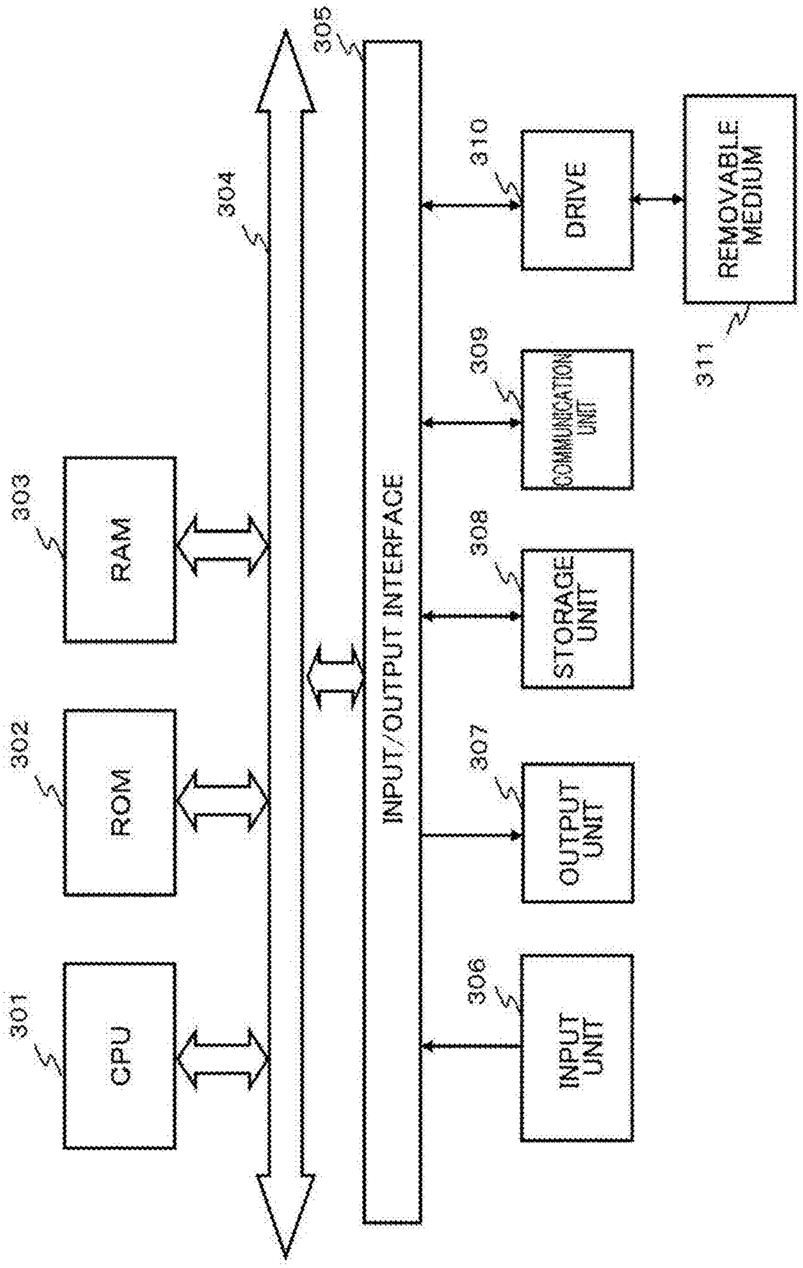
[Fig. 33]

OBJECT POSITION ANALYSIS DEVICE, OBJECT POSITION ANALYSIS METHOD, AND PROGRAM

CROSS REFERENCE TO PRIOR APPLICATION

This application is a National Stage Patent Application of PCT International Patent Application No. PCT/JP2023/019360 (filed on May 24, 2023) under 35 U.S.C. § 371, which claims priority to Japanese Patent Application No. 2022-095492 (filed on Jun. 14, 2022), which are all hereby incorporated by reference in their entirety.

TECHNICAL FIELD

The present disclosure relates to an object position analysis device, an object position analysis method, and a program. In particular, the present disclosure relates to an object position analysis device, an object position analysis method, and a program for analyzing a distance and a direction of an object using a sensor installed on a mobile device such as a robot.

BACKGROUND ART

When a mobile device such as a robot or an automated driving vehicle travels automatically, it is necessary to ascertain the surrounding situation, such as the positions of obstacles in the surroundings.

For a mobile device to safely travel automatically to a destination without colliding or making contact with obstacles, it is necessary to accurately ascertain the positions and directions of the obstacles. For this processing, various sensors are installed on mobile devices such as robots or automated driving vehicles.

Sensors that use sound pulse signals, such as ultrasonic sensors, are used as sensors for analyzing the positions and directions of obstacles.

Ultrasonic sensors have the advantages of being able to detect glass, mirrors, and the like, consuming less power than photosensors, and the like.

An ultrasonic sensor transmits ultrasonic pulse waves and receives reflected waves from an object. The distance to the object can be calculated by measuring the time from the transmission to the reception of the pulse wave, and multiplying the measured time by the speed of sound. The direction of the object can be calculated using algorithms such as the beamforming method, MUSIC, and the like, using a microphone array in which a plurality of microphones that output ultrasonic waves are arranged.

However, there is a problem in that transmitted ultrasonic waves have broad directionality, and reflected waves from various directions other than the object detection range are input to the microphones as noise.

For example, even if the sensor faces in front of the robot, which is the direction in which the robot is traveling, in order to detect objects in the front of a robot, reflected waves from directions other than in front of the robot, such as ceilings, floors, side walls, and the like, will be input to the microphone.

In this manner, when reflected waves from an outside region other than in front of the robot, which is the intended object detection region, are input to the microphone of the sensor, the accuracy of object detection in front of the robot, which is the intended direction, decreases.

For example, when a robot travels independently, it is necessary to detect objects in a specific region with high accuracy, such as obstacles at a certain height from the travel surface in the direction in which the robot travels. It is also desirable to exclude reflected waves (noise) from the ceiling and floor as much as possible. For example, a method that increases the directionality of a speaker that outputs ultrasonic waves by attaching a horn to the speaker is a method for removing such noise. However, the horn has only a limited effect, and it is difficult to obtain a sufficient noise reduction effect.

Additionally, for example, PTL 1 (JP 2001-183437 A) discloses a configuration in which the position of an object is detected not only in a horizontal direction, but also in an elevation direction to detect a ceiling surface, a floor surface, and the like. This achieves object detection in the entire three-dimensional space around a robot.

However, this method requires performing a high amount of processing for calculating the positions of objects which are unnecessary for the robot to travel, such as the position of the ceiling, and this increases the processing load. There is a further problem in that it becomes difficult to perform the processing at high speeds, which results in a decrease in the speed at which the robot travels.

CITATION LIST

Patent Literature

PTL 1: JP 2001-183437 A

PTL 2: JP 2000-152372 A

PTL 3: WO 2006/004099 A1

SUMMARY

Technical Problem

Having been achieved in view of the problems described above, for example, an object of the present disclosure is to provide an object position analysis device, an object position analysis method, and a program that, in a configuration in which the position of an object is detected by a sensor using a sound pulse signal, such as an ultrasonic sensor, installed on a mobile device such as a robot, are capable of quickly and accurately analyzing a distance, a direction, and the like of an object in a target direction having removed reflected waves from directions other than the target direction, such as reflected waves from a ceiling or the like.

Solution to Problem

A first aspect of the present disclosure is an object position analysis device including:

- a speaker that outputs a sound pulse signal;
- a plurality of microphones that input reflected waves from the sound pulse signal output by the speaker; and
- a data processing unit that analyzes the reflected waves input by the plurality of microphones and analyzes a position of an object that has reflected the sound pulse signal, wherein the data processing unit:

selects, as an analysis target reflected wave, a reflected wave, among the reflected waves input by the plurality of microphones, having a phase difference that has a high correlation with a phase difference of a sound pulse signal from an analysis target direction defined in advance; and analyzes a position of an object in an analysis target region near the analysis target direction through analysis processing on the analysis target reflected wave selected.

Furthermore, a second aspect of the present disclosure is an object position analysis method performed by an object position analysis device, the object position analysis method including:

outputting, by a speaker, a sound pulse signal;

inputting, by a plurality of microphones, reflected waves from the sound pulse signal output by the speaker; and performing, by a data processing unit, object position analysis processing of analyzing the reflected waves input by the plurality of microphones and analyzing a position of an object that has reflected the sound pulse signal, wherein in the object position analysis processing, the data processing unit: selects, as an analysis target reflected wave, a reflected wave, among the reflected waves input by the plurality of microphones, having a phase difference that has a high correlation with a phase difference of a sound pulse signal from an analysis target direction defined in advance; and analyzes a position of an object in an analysis target region near the analysis target direction through analysis processing on the analysis target reflected wave selected.

Furthermore, a third aspect of the present disclosure is a program that causes an object position analysis device to perform object position analysis processing, the object position analysis processing including:

causing a speaker to output a sound pulse signal;

causing a plurality of microphones to input reflected waves from the sound pulse signal output by the speaker; and causing a data processing unit to perform object position analysis processing of analyzing the reflected waves input by the plurality of microphones and analyzing a position of an object that has reflected the sound pulse signal, wherein in the object position analysis processing, the program causes the object position analysis device to:

perform processing of selecting, as an analysis target reflected wave, a reflected wave, among the reflected waves input by the plurality of microphones, having a phase difference that has a high correlation with a phase difference of a sound pulse signal from an analysis target direction defined in advance; and perform processing of analyzing a position of an object in an analysis target region near the analysis target direction through analysis processing on the analysis target reflected wave selected.

The program of the present disclosure is, for example, a storage medium provided in a computer-readable form or a program that can be provided by a communication medium, the storage medium or the program being provided to an information processing device or a computer system that can execute various program codes, for example. By providing such a program in a computer-readable format, processing according to the program is realized in the information processing device and the computer system.

Still other objects, features, and advantages of the present disclosure will become clear from the detailed descriptions based on the embodiments of the present disclosure described below and the attached drawings. In the present specification, the system is a logical set of configurations of a plurality of devices, and the devices having each configuration are not limited to being in the same housing.

According to the configuration of one embodiment of the present disclosure, an object position analysis device that analyzes the position of an object in a specific analysis target region is realized.

Specifically, for example, the device includes: a speaker that outputs a sound pulse signal: a plurality of microphones that input reflected waves from the sound pulse signal output by the speaker; and a data processing unit that analyzes the reflected waves input by the plurality of microphones and analyzes a position of an object that has reflected the sound pulse signal. The data processing unit: selects, as an analysis target reflected wave, a reflected wave, among the reflected waves input by the plurality of microphones, having a phase difference that has a high correlation with a phase difference of a sound pulse signal from an analysis target direction defined in advance; and analyzes a position of an object in an analysis target region near the analysis target direction through analysis processing on the analysis target reflected wave selected.

According to this configuration, an object position analysis device that analyzes the position of an object in a specific analysis target region is realized.

Note that the effects described in the present specification are merely exemplary and not limited, and may have additional effects.

BRIEF DESCRIPTION OF DRAWINGS

FIG. 1 is a diagram illustrating an example of a robot serving as an example of a mobile device of the present disclosure.

FIG. 2 is a diagram illustrating an overview of processing for analyzing a position (a distance and a direction) of an object using an ultrasonic sensor.

FIG. 3 is a diagram illustrating an example of a pulse signal output by an ultrasonic speaker.

FIG. 4 is a diagram illustrating an example of an input pulse signal from each of microphones constituting an ultrasonic microphone array.

FIG. 5 is a diagram illustrating a problem in which the accuracy of analysis decreases due to reflected waves from various directions other than an object position analysis direction.

FIG. 6 is a diagram illustrating an example of a conventional configuration for solving the problem in which the accuracy of analysis decreases due to reflected waves from various directions other than an object position analysis direction.

FIG. 7 is a diagram illustrating an example of the configuration of an ultrasonic sensor serving as an example of a sensor in an object position analysis device of the present disclosure.

FIG. 8 is a diagram illustrating, in detail, the configuration of a square ultrasonic microphone array.

FIG. 9 is a diagram illustrating an example of the configuration of an object position analysis device of a first embodiment.

FIG. 10 is a diagram illustrating an example of an input signal (an input ultrasonic signal) input to a single microphone.

FIG. 11 is a diagram illustrating a specific example of processing performed by an amplitude determination unit.

FIG. 12 is a diagram illustrating a specific example of processing performed by the amplitude determination unit.

FIG. 13 is a diagram illustrating a specific example of an analysis target direction and an analysis target region.

FIG. 14 is a diagram illustrating an example of adjusting a size of the analysis target region.

FIG. 15 is a diagram illustrating a specific example of processing for extracting reflected waves exceeding a defined phase difference correlation evaluation value correspondence threshold, performed by a phase difference correlation determination unit.

FIG. 16 is a diagram illustrating a specific example of processing for extracting reflected waves exceeding a defined phase difference correlation evaluation value correspondence threshold, performed by the phase difference correlation determination unit.

FIG. 17 is a diagram illustrating a specific example of processing for extracting reflected waves exceeding a defined phase difference correlation evaluation value correspondence threshold, performed by the phase difference correlation determination unit.

FIG. 18 is a diagram illustrating an example of a specific calculation result of an evaluation value (a phase difference correlation evaluation value).

FIG. 19 is a diagram illustrating an example of processing for determining an analysis target region on the basis of a threshold (a phase difference correlation evaluation value correspondence threshold).

FIG. 20 is an explanatory diagram illustrating an example of an analysis target region determined on the basis of a threshold (a phase difference correlation evaluation value correspondence threshold).

FIG. 21 is an explanatory diagram illustrating an example of processing for analyzing a direction of an object, performed by an object position (distance and direction) calculation unit.

FIG. 22 is an explanatory diagram illustrating an example of processing for analyzing a direction of an object, performed by the object position (distance and direction) calculation unit.

FIG. 23 is a diagram illustrating a flowchart that illustrates a processing sequence performed by the object analysis device of the first embodiment.

FIG. 24 is a diagram illustrating an example of the configuration of a diamond-shaped ultrasonic microphone array in an ultrasonic sensor of a second embodiment.

FIG. 25 is a diagram illustrating an example of the configuration of a diamond-shaped ultrasonic microphone array in an ultrasonic sensor of a second embodiment.

FIG. 26 is a diagram illustrating a specific example of a phase difference correlation evaluation value calculated when the diamond-shaped ultrasonic microphone array of the second embodiment is used.

FIG. 27 is a diagram illustrating processing of comparing a phase difference correlation evaluation value with a predefined threshold (a phase difference correlation evaluation value correspondence threshold) and determining a region having a phase difference correlation evaluation value exceeding the threshold to be an analysis target region.

FIG. 28 is a diagram illustrating an example of the configuration of a triangular ultrasonic microphone array in an ultrasonic sensor of a third embodiment.

FIG. 29 is a diagram illustrating an object position analysis device having an ultrasonic sensor and an attitude sensor of a fourth embodiment.

FIG. 30 is a diagram illustrating processing executed by the object position analysis device having an ultrasonic sensor and an attitude sensor of the fourth embodiment.

FIG. 31 is a diagram illustrating an example of the configuration of the object position analysis device having an ultrasonic sensor and an attitude sensor of the fourth embodiment.

FIG. 32 is a diagram illustrating a flowchart that illustrates a processing sequence performed by the object position analysis device of the fourth embodiment.

FIG. 33 is a diagram illustrating an example of the hardware configuration of the object position analysis device of the present disclosure.

DESCRIPTION OF EMBODIMENTS

An object position analysis device, an object position analysis method, and a program of the present disclosure will be described in detail hereinafter with reference to the drawings. The descriptions will be given in the following order.

1. Overview of and Problem with Object Position Analysis Processing Using Sensor
2. (First Embodiment) Embodiment Using Sensor Having Square Microphone Array
3. (First Embodiment) Processing Sequence in Embodiment Using Sensor Having Square Microphone Array
4. (Second Embodiment) Embodiment Using Sensor Having Diamond-Shaped Microphone Array
5. (Third Embodiment) Embodiment Using Sensor Having Triangular Microphone Array
6. (Fourth Embodiment) Embodiment of Object Position Analysis Device Having Ultrasonic Sensor and Attitude Sensor
7. Example of Hardware Configuration of Object Position Analysis Device
8. Summary of Configuration of Present Disclosure

1. Overview of and Problem with Object Position Analysis Processing Using Sensor An overview of and a problem with object position analysis processing using a sensor will be described first.

As described earlier, for a mobile device such as a robot or an automated driving vehicle to safely travel to a destination without colliding with obstacles, it is necessary to accurately ascertain the positions and directions of the obstacles.

Various sensors are installed on mobile devices such as robots and automated driving vehicles to analyze the positions of objects such as obstacles.

Sensors that use sound pulse signals, such as ultrasonic sensors, are used as one type of sensor for analyzing the positions and directions of obstacles. Ultrasonic sensors have the advantages of being able to detect glass, mirrors, and the like, consuming less power than photosensors, and the like.

FIG. 1 is a diagram illustrating an example of a robot 10 on which an ultrasonic sensor 20 is installed. To avoid collisions with various objects, such as obstacles in the direction of travel of the robot 10, it is necessary for the robot 10 to analyze the position of an object 50 in the direction of travel of the robot 10, i.e., the distance from the robot 10 to the object 50, and the direction of the object relative to the robot 10.

The ultrasonic sensor 20 installed on the robot 10 illustrated in FIG. 1 transmits an ultrasonic pulse wave and receives a reflected wave from the object 50. An object position analysis device in the robot 10 calculates the distance to the object 50 by measuring the time from the transmission to the reception of the pulse wave and multiplying the measured time by the speed of sound.

The ultrasonic sensor 20 has a microphone array configuration in which a plurality of microphones are arranged, and the object position analysis device in the robot 10 can calculate the direction of the object 50 relative to the robot 10 using an algorithm such as a beamforming method, MUSIC, or the like.

FIG. 2 is a diagram illustrating an overview of processing for analyzing a position (a distance and a direction) of an object using an ultrasonic sensor.

(a1) in FIG. 2 indicates an example of an object detection environment. The ultrasonic sensor 20 and the object 50 are illustrated here. Although the robot 10 is not illustrated in the figure, the ultrasonic sensor 20 is a sensor installed on the robot 10 illustrated in FIG. 1, for example.

A plane of the ultrasonic sensor 20 is taken as an xy plane, and the forward direction of the ultrasonic sensor 20 is taken as a z direction.

An ultrasonic pulse signal is output as a transmission wave in the z-axis direction from the ultrasonic sensor 20.

(a2) in FIG. 2 is a diagram illustrating an example of the configuration of the ultrasonic sensor 20, which is a typical conventional ultrasonic sensor.

The ultrasonic sensor 20 includes an ultrasonic speaker 21 that outputs an ultrasonic pulse signal, and an ultrasonic microphone array 22 in which a plurality of microphones are arranged in a straight line.

The ultrasonic speaker 21 of the ultrasonic sensor 20 outputs an ultrasonic pulse signal (transmission wave) in the z-axis direction illustrated in (a1) of FIG. 2.

FIG. 3 illustrates an example of the pulse signal output by the ultrasonic speaker 21. As illustrated in FIG. 3, the ultrasonic speaker 21 outputs an ultrasonic pulse signal at a predetermined wavelength, e.g., a wavelength A.

The ultrasonic pulse signal output from the ultrasonic speaker 21 as a transmission wave is reflected by the object 50, and the reflected wave is input to the microphone (the ultrasonic microphone array 22) of the ultrasonic sensor 20.

The reflected wave input to each microphone of the ultrasonic microphone array 22 of the ultrasonic sensor 20 is input to a data processing unit in the robot 10 (not shown) and analyzed by the data processing unit, and the distance and direction of the object 50 that produced the reflected wave are calculated.

For example, the data processing unit determines that a reflected wave obtained by the ultrasonic microphone array 22 having a reception strength higher than a threshold is a valid reflected wave, and calculates the distance to the object 50 by multiplying the time from the transmission to the reception of the ultrasonic pulse signal by the speed of sound.

In addition, the data processing unit calculates the direction of the object (the direction of the object relative to the ultrasonic sensor 20) by analyzing differences (phase differences) among the signals obtained by the microphones constituting the ultrasonic microphone array 22.

(b1) in FIG. 2 is a top view of the object detection environment illustrated in (a1) in FIG. 2.

(b2) in FIG. 2 illustrates microphones a to d constituting the ultrasonic microphone array 22 of the ultrasonic sensor 20 in the top view illustrated in (a1) in FIG. 2.

As illustrated in (b2) in FIG. 2, when a reflected wave from a single object 50 is input to the ultrasonic microphone array 22 from a direction tilted from the z-axis direction, a phase difference arises in the ultrasonic pulse signals input by the microphones a to d.

(b2) in FIG. 2 is a diagram illustrating an example of a phase difference between the microphone a, located at the left end, and the microphone d, located at the right end, when a reflected wave is input from a direction tilted by an angle (θ) from the z-axis direction, which is a perpendicular forward direction of the ultrasonic sensor 20.

An example of an input pulse signal from each of the microphones constituting the ultrasonic microphone array 22 will be described with reference to FIG. 4. Like (b2) in FIG. 2, the graph in FIG. 4 is a graph indicating an example of the input pulse signals of the microphone a located at the left end and the microphone d located at the right end, when a reflected wave is input from a direction tilted by an angle (θ) from the z-axis direction, which is the perpendicular forward direction of the ultrasonic sensor 20.

As indicated in the upper part of FIG. 4, when a reflected wave is input from a direction tilted by an angle (θ) from the z-axis direction, the reflected wave is input to the microphone a located at the left end before the microphone d located at the right end.

As a result, as illustrated in the graph in the lower part of FIG. 4, a phase difference such as that indicated in the figure arises between the input pulse signals of the microphone a and the microphone d.

The phase difference varies depending on the angle of direction from which the reflected waves arrive. In other words, the phase difference varies by the angle (θ) from the z-axis direction, which is the perpendicular forward direction of the ultrasonic sensor 20.

For example, if the direction from which the reflected waves arrive is the z-axis direction, which is the perpendicular forward direction of the ultrasonic sensor 20, i.e., if θ=0, the timing at which the reflected waves are input is the same for all the microphones a to d. Therefore, no phase difference arises.

However, as the direction from which the reflected waves arrive deviates from the z-axis direction, i.e., as the angle θ increases, the timings at which the reflected waves are input to the microphones a to d will deviate more, which increases the phase difference.

When the microphone array is a linear array in which the microphones are arranged on a straight line, the phase differences among the microphones can be estimated on the basis of the direction from which the reflected waves arrive, i.e., the direction of the object 50, by setting the interval between microphones to be no greater than λ/2 with respect to the wavelength A of the ultrasonic pulse signal. Various existing object direction analysis algorithms, such as a beamforming method, MUSIC, and the like, can be applied to estimate the direction from which the reflected waves arrive.

Applying an existing object direction analysis algorithm in this manner makes it possible to calculate the direction from which the reflected waves arrive, i.e., the direction (θ) of the object 50, as illustrated in (b2) and (b3) in FIG. 2. As indicated in (b3) in FIG. 2, the direction (θ) of the object 50 can be calculated as an angle (θ) relative to the z axis of an xz plane in which the direction in which the microphones are arranged in the ultrasonic microphone array 22 of the ultrasonic sensor 20 is the x axis and the direction in which the ultrasonic sensor 20 outputs ultrasonic wave pulses is the z-axis direction.

However, when using a linear array-type ultrasonic microphone array 22, in which the microphones are arranged on a straight line as illustrated in (a2) in FIG. 2, there is a problem in that the analysis accuracy decreases due to reflected waves from various directions other than the target object position analysis direction, i.e., reflected waves that act as noise.

This problem will be described with reference to FIG. 5.

With ultrasonic waves, the transmission waves have broad directionality. As such, reflected waves from walls, floors, ceilings, and the like that are not in front of the sensor are also detected. For example, with an automated transport robot traveling on a flat travel surface, it is sufficient to detect reflected waves from objects such as obstacles protruding into the travel surface of the robot. Reflected waves from a ceiling distant from the travel surface, from the flat travel surface, and the like act as noise signals and interfere with object detection.

(a) in FIG. 5 is a diagram illustrating an example of an object detection environment similar to that described earlier with reference to (a1) in FIG. 2. The ultrasonic sensor 20 and the object 50 are illustrated in (a) in FIG. 5. Although the robot 10 is not illustrated in the figure, the ultrasonic sensor 20 is a sensor installed on the robot 10 illustrated in FIG. 1, for example.

A plane of the ultrasonic sensor 20 is taken as the xy plane, and the forward direction of the ultrasonic sensor 20 is taken as the z direction.

An ultrasonic pulse signal is output as a transmission wave in the z-axis direction from the ultrasonic sensor 20. The ultrasonic pulse signal, which is a transmission wave, output from the ultrasonic sensor 20 is reflected by the object 50, and the reflected wave is input to the ultrasonic microphone array 22 of the ultrasonic sensor 20 described with reference to FIG. 2.

Furthermore, the ultrasonic pulse signal, which is a transmission wave output from the ultrasonic sensor 20, is also reflected by the ceiling and the floor (the travel surface for the robot), as indicated in (a) in FIG. 5, and these reflected waves are also input to the ultrasonic microphone array 22 of the ultrasonic sensor 20.

In this manner, when reflected waves from various directions are input to the ultrasonic microphone array 22 of the ultrasonic sensor 20, an object which is not actually present may be erroneously determined to be present at a position different from the direction in which an actual object is present, even if the directions of objects are analyzed by applying various existing object direction analysis algorithms such as a beamforming method, MUSIC, or the like as described above.

For example, an object that is not actually present may be determined to be present at a position different from the direction of the actual object 50, as indicated as a false image 60 in the example object direction analysis result (the top view) in (b) in FIG. 5.

When such a false image 60 is detected, the robot 10 on which the ultrasonic sensor 20 is installed recognizes an object (an obstacle) as actually being present at the position of the false image 60, and sets a travel route to avoid the position of the false image 60. As a result, the route which could originally be traveled on can no longer be used for travel, and an unnecessarily longer route is set erroneously.

An example of a conventional method for solving such a problem will be described with reference to FIG. 6.

(1) in FIG. 6 indicates a method that increases the directionality of a speaker that outputs ultrasonic waves by attaching a horn to the speaker. However, the horn has only a limited effect, and it is difficult to obtain a sufficient noise reduction effect.

Meanwhile, (2) in FIG. 6 illustrates a method in which the position of an object is detected not only in a horizontal direction, but also in an elevation direction to detect a ceiling surface, a floor surface, and the like. This achieves object detection in the entire three-dimensional space around a robot.

However, this method requires performing a high amount of processing for calculating the positions of objects which are unnecessary for the robot to travel, such as the position of the ceiling, and this increases the processing load. There is a further problem in that it becomes difficult to perform the processing at high speeds, which results in a decrease in the speed at which the robot travels.

The present disclosure solves such problems, and makes it possible, in a configuration in which the positions of objects are detected by a sensor using a sound pulse signal such as an ultrasonic sensor, to quickly and accurately analyze the distance and direction of an object in a target direction by removing reflected waves from directions other than the target direction, such as reflected waves from a ceiling.

The configuration of and processing by the object position analysis device of the present disclosure will be described in detail hereinafter.

2. (First Embodiment) Embodiment Using Sensor Having Square Microphone Array

An embodiment using a sensor having a square microphone array will be described first as a first embodiment of the object position analysis device of the present disclosure.

Note that the sensor of the object position analysis device of the present disclosure is an audio pulse sensor that outputs an audio pulse signal and receives a reflected wave resulting therefrom. The following will describe an embodiment in which an ultrasonic sensor is used as an example of an audio pulse sensor, but this is merely one example. The sensor used in the object position analysis device of the present disclosure is not limited to an ultrasonic sensor, and may be any audio pulse input/output-type sensor that outputs an audio pulse signal and receives a reflected wave thereof.

FIG. 7 is a diagram illustrating an example of the configuration of an ultrasonic sensor serving as an example of the sensor in the object position analysis device of the present disclosure.

FIG. 7 includes the following two figures.

(1) Conventional Ultrasonic Sensor (2) Ultrasonic Sensor of the Present Disclosure The ultrasonic sensor 20 indicated in "(1) conventional ultrasonic sensor" has the same configuration as that described earlier with reference to FIG. 2. In other words, the ultrasonic sensor 20 includes an ultrasonic speaker 21 that outputs an ultrasonic pulse signal, and an ultrasonic microphone array 22 having a linear array-type microphone arrangement in which a plurality of microphones are arranged in a straight line.

On the other hand, an ultrasonic sensor 100 indicated in "(2) ultrasonic sensor of the present disclosure" includes an ultrasonic speaker 101 that outputs an ultrasonic pulse signal, and a square ultrasonic microphone array 102 in which four microphones are provided at corresponding vertices of a square tilted with respect to the x axis.

The configuration of the square ultrasonic microphone array 102 in the ultrasonic sensor 100 indicated in "(2)

ultrasonic sensor of the present disclosure" will be described in detail next with reference to FIG. 8.

As illustrated in FIG. 8, the ultrasonic sensor 100 of the present disclosure includes the square ultrasonic microphone array 102 in which four microphones are provided at corresponding vertices of a square tilted with respect to the x axis.

The right side of FIG. 8 is a diagram illustrating the arrangement of the square ultrasonic microphone array 102 in detail.

The plane of the ultrasonic sensor is indicated as an xy plane, and a direction extending perpendicular from the xy plane is indicated as the z axis. The z-axis direction corresponds to a direction in which ultrasonic waves are output from the ultrasonic speaker 101.

A microphone a (ch0), a microphone b (ch1), a microphone c (ch2), and a microphone d (ch3) indicated on the xy coordinates on the right side of FIG. 8 represent the specific positions of the four microphones a to d constituting the square ultrasonic microphone array 102. Each of the microphones a (ch0) to d (ch3) is disposed at a corresponding vertex of a square, set on the xy plane, that has a tilt, as illustrated in the figure.

When the wavelength of the ultrasonic pulse signal output from the ultrasonic speaker 101 is represented by λ, the four microphones a (ch0) to d (ch3) constituting the square ultrasonic microphone array 102 are arranged such that the interval between adjacent microphones projected on each of the x axis and the y axis is no greater than λ/4, and such that the projection positions of the microphones on the x axis do not overlap. Setting the microphone arrangement in this manner makes it possible to accurately estimate a direction in the xz plane.

Furthermore, arranging the microphones such that the projection positions thereof on the y axis do not overlap makes it possible to accurately estimate a direction in the yz plane.

Although the present embodiment describes an example in which four microphones are used, various settings can be made as long as the number of microphones is three or greater. An embodiment in which three microphones are used will be described later.

As illustrated on the right side of FIG. 8, when the microphone (ch0) is set to the position of the origin (x, y)=(0, 0) of the xy coordinates, the four microphones (ch0 to ch3) are set to the following coordinate positions.

Position (x, y) of microphone a (ch0)=(0, 0)

Position (x, y) of microphone b (ch1)=(λ/4, −λ/2)

Position (x, y) of microphone c (ch2)=(λ/2, λ/4)

Position (x, y) of microphone d (ch3)=(3λ/4, −λ/4)

In this manner, the ultrasonic sensor of the object position analysis apparatus of the present first embodiment includes the square ultrasonic microphone array 102 in which the four microphones a (ch0) to d (ch3) are disposed on a xy plane and at corresponding vertices of a square tilted with respect to the x axis, as illustrated in FIG. 8.

Analyzing the phase differences between the reflected waves input to the microphones using the square ultrasonic microphone array 102 makes it possible to extract only the reflected waves in a pre-set analysis target direction, e.g., an analysis target direction in front of a robot corresponding to the z-axis direction, which follows an axis orthogonal to the sensor plane (the xy plane). This makes it possible to analyze the position (distance and direction) of an object in the analysis target direction with a high level of accuracy.

Specifically, using the square ultrasonic microphone array 102 having the microphone arrangement illustrated in FIG. 8 makes it possible to obtain a signal from which reflected waves (noise) from objects outside the pre-set analysis target direction, such as a ceiling or a floor surface, have been removed.

This makes it possible to extract only reflected waves in the analysis target direction in front of the robot, corresponding to the z-axis direction of the sensor, for example, and the position (distance and direction) of an object in the limited analysis target direction can be analyzed with a high level of accuracy.

The principles by which only the reflected waves from the analysis target direction corresponding to the z-axis direction of the sensor can be extracted by using the square ultrasonic microphone array 102 illustrated in FIG. 8 will be described later.

Although using the square ultrasonic microphone array 102 illustrated in FIG. 8 limits the analysis target direction and therefore narrows the viewing angle (the angle that defines the object detection range (the analysis target region)), doing so makes it possible analyze the positions of objects with a high level of accuracy without false images.

In addition, in the configuration of the present disclosure, processing for calculating the positions of objects in regions other than the analysis target direction, such as a ceiling, is not performed. This suppresses the amount of computations and makes it possible to perform the analysis processing at high speed.

PTL 2 (JP 2000-152372 A), for example, can be given as a conventional technique disclosing a microphone arrangement (array) different from a linear microphone array in which the microphones are arranged in a straight line, as described earlier with reference to FIG. 2 and the like.

PTL 2 discloses a configuration in which microphones are arranged in a circle. PTL 2 discloses a configuration in which a received signal from a desired direction is obtained using an orthogonal function expansion, independent of the frequency of the sound wave.

In contrast, the object position analysis device of the present disclosure makes it possible to extract only the reflected waves in a specific analysis target direction by analyzing the phase differences between ultrasonic wave pulses constituted by reflected waves, which are the received signals of the microphones constituting the square ultrasonic microphone array 102 illustrated in FIG. 8.

Furthermore, PTL 3 (WO 2006/004099 A1) discloses a configuration in which microphones are arranged in a polygon shape. However, PTL 3 only discloses a configuration in which output sounds from a plurality of speakers are input to the microphones, and the sounds input to the microphones are used to analyze and adjust reverberation characteristics of a room.

In other words, PTL 3 does not disclose processing for analyzing the phase differences between the ultrasonic wave pulses constituted by the reflected waves, which are the received signals of the microphones, extracting the reflected waves in a specific analysis target direction, and analyzing the position (distance and direction) of an object in the specific analysis target direction, as is the case with the object position analysis device of the present disclosure.

Using the square ultrasonic microphone array 102 in the square arrangement illustrated in FIG. 8, for example, the object position analysis device of the present disclosure makes it possible to extract only reflected waves in the analysis target direction corresponding to the z-axis direction of the sensor, and analyze the position (distance and direction) of an object in the analysis target direction corresponding to the z-axis direction orthogonal to the sensor plane (the xy plane) with a high level of accuracy.

An example of the configuration of an object position analysis device 150 of the first embodiment will be described with reference to FIG. 9.

As illustrated in FIG. 9, the object position analysis device 150 of the first embodiment is constituted by the ultrasonic sensor 100 and a data processing unit 120.

The ultrasonic sensor 100 has the configuration described earlier with reference to FIGS. 7 and 8. In other words, the ultrasonic sensor 100 includes the ultrasonic speaker 101, which outputs an ultrasonic pulse signal, and the square ultrasonic microphone array 102, in which four microphones are arranged at corresponding vertices of a tilted square.

The microphones 1/102-1 to n/102-*n* illustrated in FIG. 7 correspond to the microphones a (ch0) to d (ch3) at the positions of the respective vertices of the square illustrated in FIG. 6.

The data processing unit 120 includes a timing control unit 121, an ultrasonic pulse transmission unit 122, an amplitude determination unit 123, a phase difference correlation determination unit 124, and an object position (distance and direction) estimation unit 125.

The timing control unit 121 controls the timing of the output of the ultrasonic pulse signal output from the ultrasonic speaker 101 of the ultrasonic sensor 100. The ultrasonic pulse transmission unit 122 generates an ultrasonic pulse signal, and outputs the generated ultrasonic pulse signal from the ultrasonic speaker 101 at a timing controlled by the timing control unit 121.

As described with reference to FIGS. 7 and 8, when the plane on which the ultrasonic speaker 101 and the square ultrasonic microphone array 102 constituting the ultrasonic sensor 100 are present is taken as the xy plane, the output direction of the ultrasonic pulse signal output from the ultrasonic speaker 101 of the ultrasonic sensor 100 is the z-axis direction.

The ultrasonic pulse signal emitted from the ultrasonic speaker 101 of the ultrasonic sensor 100 is reflected by various objects.

The reflected waves from these objects are input into each of the microphones constituting the square ultrasonic microphone array 102 of the ultrasonic sensor 100, i.e., the microphones 1/102-1 to n/102-*n* illustrated in FIG. 9.

An example of an input signal (an input ultrasonic signal) input to a single microphone is illustrated in FIG. 10.

FIG. 10 illustrates the following diagram.

(a) Example of Microphone Reception Signal

The graph illustrated in FIG. 10 is a graph indicating time (t) on the horizontal axis and amplitude on the vertical axis, and is a graph illustrating an example of an input signal (an input ultrasonic signal) input to a single microphone included in the square ultrasonic microphone array 102 of the ultrasonic sensor 100.

As illustrated in the figure, the microphone input signal includes "direct waves" and "reflected waves". A "direct wave" is a direct input signal of an ultrasonic pulse signal output from the ultrasonic speaker 101 of the ultrasonic sensor 100, and is not a reflected wave from an object.

The signal input to the microphone at a delay after the "direct wave" is a "reflected wave", and the ultrasonic pulse signal output from the ultrasonic speaker 101 of the ultrasonic sensor 100 is a signal which has been reflected by some object and is then input to the microphone.

Such an audio signal is input into each of the microphones 1/102-1 to n/102-*n* constituting the square ultrasonic microphone array 102 of the ultrasonic sensor 100.

The input signals (reflected waves) of the microphones 1/102-1 to n/102-*n* are input to the amplitude determination unit 123 of the data processing unit 120.

The amplitude determination unit 123 of the data processing unit 120 selects reflected wave parts from the input signals (reflected waves) of each of the microphones 1/102-1 to n/102-*n* constituting the square ultrasonic microphone array 102, and further extracts only reflected waves exceeding a predefined amplitude threshold from the selected reflected waves as valid reflected waves. Note that a reflected wave "exceeding a defined amplitude threshold" means that the reflected wave has a reception strength sufficiently greater than environmental noise.

FIGS. 11 and 12 are diagrams illustrating a specific example of processing performed by the amplitude determination unit 123.

FIG. 11 illustrates the following diagrams.

(a) Example of Microphone Reception Signal (b1) Example of Processing by Amplitude Determination Unit 123-1

"(a) Example of microphone reception signal" is "(a) example of microphone reception signal", similar to that described with reference to FIG. 10.

First, the amplitude determination unit 123 selects the reflected wave part from the microphone reception signal. Then, the amplitude determination unit 123 extracts, from the selected reflected wave, only a reflected wave exceeding a predefined amplitude threshold prescribed, as a valid reflected wave.

The waveform illustrated in "(b1) Example of processing by amplitude determination unit 123-1" in the lower part of FIG. 11 is data obtained by extracting the waveform of the upper half of the reflected wave part in "(a) example of microphone reception signal".

The amplitude determination unit 123 extracts, from this reflected wave, only a reflected wave exceeding a predefined amplitude threshold, as a valid reflected wave.

In the example illustrated in the figure drawing, two peaks are detected from the reflected wave. The peak part in the first half (the left side) will be called "reflected wave #1", and the peak part in the second half will be called "reflected wave #2".

A specific example of processing for extracting only reflected waves exceeding the predefined amplitude threshold, performed by the amplitude determination unit 123, will be described with reference to FIG. 12.

FIG. 12 illustrates the following diagrams.

(b1) Example of Processing by Amplitude Determination Unit 123-1

(b2) Example of Processing by Amplitude Determination Unit 123-2

"(b1) Example of processing by amplitude determination unit 123-1" is the same as "(b1) example of processing by amplitude determination unit 123-1" in FIG. 11.

The amplitude determination unit 123 extracts, from this reflected wave, only a reflected wave exceeding a predefined amplitude threshold prescribed, as a valid reflected wave.

"(b1) Example of processing by amplitude determination unit 123-1" includes a line indicating the amplitude threshold.

The amplitude determination unit 123 extracts the part of the "reflected wave #1" and the part of the "reflected wave #2" that exceed the threshold line as valid reflected waves.

The waveform part indicated in "(b2) Example of processing by amplitude determination unit 123-2" is a reflected wave extracted as a valid reflected wave exceeding the predefined amplitude threshold.

As described earlier, a reflected wave "exceeding a defined amplitude threshold" means that the reflected wave has a reception strength sufficiently greater than environmental noise.

The reflected waves exceeding the defined amplitude threshold, extracted by the amplitude determination unit 123, are input to the phase difference correlation determination unit 124.

The phase difference correlation determination unit 124 extracts, from the reflected waves exceeding the defined amplitude threshold, only a reflected wave that further exceeds a defined phase difference correlation evaluation value correspondence threshold.

The reflected wave exceeding the phase difference correlation evaluation value correspondence threshold extracted by the phase difference correlation determination unit 124 is a reflected wave from a pre-set analysis target region.

The analysis target region is set as a conical region centered on a specific direction, i.e., a specific analysis target direction.

The region including the reflected wave exceeding the phase difference correlation evaluation value correspondence threshold, extracted by the phase difference correlation determination unit 124, is an analysis target region 170. FIG. 13 illustrates a specific example of the analysis target direction and the analysis target region.

The analysis target direction can be set to any desired direction.

The example illustrated in FIG. 13 is an example in which an analysis target direction 160 is set to a (θ, φ) direction in a spherical coordinate system.

In other words, the figure illustrates an example in which the plane of the ultrasonic sensor is taken as the xy plane, and the (θ, φ) direction in a spherical coordinate system set in an xyz three-dimensional space having a z axis perpendicularly forward from the xy plane of the ultrasonic sensor 100 is taken as the analysis target direction 160.

Note that θ represents an angle of the analysis target direction 160 relative to the z axis, and φ represents an angle formed by the x axis and a line projecting the analysis target direction 160 onto the xy plane.

The spherical coordinates of a point in the analysis target direction 160, e.g., a point at a length r from the origin, are (r, θ, φ).

As illustrated in FIG. 13, a conical region that takes the analysis target direction 160 set in the (θ, φ) direction as a center axis can be set as the analysis target region 170.

As described above, the reflected wave extracted by the phase difference correlation determination unit 124, i.e., the reflected wave having a phase difference correlation evaluation value exceeding the phase difference correlation evaluation value correspondence threshold, is taken as the reflected wave from the analysis target region 170.

The size of the analysis target region 170 can be freely adjusted by setting the threshold used by the phase difference correlation determination unit 124 (the phase difference correlation evaluation value correspondence threshold).

The adjustment of the size of the analysis target region 170 will be described with reference to FIG. 14.

FIG. 14 illustrates two types of analysis target regions 170, i.e., an analysis target region a/170*a* and an analysis target region b/170*b*.

Although each of these is a conical region that takes the analysis target direction 160 set in the (θ, φ) direction as a center axis, the analysis target region a/170*a* is an analysis target region constituted by a small cone having a small diameter.

On the other hand, the analysis target region b/170*b* is an analysis target region constituted by a large cone having a large diameter.

In this manner, the analysis target region 170 can make adjustments by setting the threshold used by the phase difference correlation determination unit 124 (the phase difference correlation evaluation value correspondence threshold).

A specific example of the reflected wave extraction processing by the phase difference correlation determination unit 124, i.e., processing for extracting a reflected wave exceeding the defined phase difference correlation evaluation value correspondence threshold, will be described with reference to FIG. 15 and on.

Note that the setting of the analysis target region 170 when, as illustrated in FIG. 15, the analysis target direction 160 is set to a direction (θ, φ)=(0, 0), i.e., when the analysis target direction 160 is set in the z-axis direction, will be described here as an example.

As described above, the analysis target region 170 is a region corresponding to a region including the reflected wave exceeding the phase difference correlation evaluation value correspondence threshold, extracted by the phase difference correlation determination unit 124.

Evaluation value calculation processing performed by the phase difference correlation determination unit 124 will be described with reference to FIGS. 16 and 17.

The phase difference correlation evaluation value calculated by the phase difference correlation determination unit 124 is an evaluation value that takes on a greater value as the likelihood that the reflected wave received by a microphone has arrived from the analysis target direction increases.

As illustrated in FIG. 16, first, the phase difference correlation determination unit 124 inputs the reflected waves exceeding the defined amplitude threshold, extracted by the amplitude determination unit 123.

(b2) in FIG. 16 is a diagram similar to "(b2) example of processing by amplitude determination unit 123-2" described earlier with reference to FIG. 12, and indicates a reflected wave exceeding the defined amplitude threshold, extracted by amplitude determination unit 123.

The phase difference correlation determination unit 124 inputs a received signal for each microphone with respect to the reflected waves exceeding the defined amplitude threshold, and calculates, on the basis of the input signals, an evaluation value (phase difference correlation evaluation value) corresponding to each reflected wave according to the formula in (c) in FIG. 16.

The phase difference correlation determination unit 124 compares the calculated evaluation value with a predefined threshold (a phase difference correlation evaluation value correspondence threshold), and determines a region in which the evaluation value exceeds the threshold as the analysis target region 170.

In other words, a region in which the phase difference correlation evaluation value exceeds the phase difference correlation evaluation value correspondence threshold is determined to be the analysis target region 170.

For each of the reflected waves exceeding the defined amplitude threshold extracted by the amplitude determination unit 123, the phase difference correlation determination unit 124 calculates an evaluation value (phase difference correlation evaluation value) according to the following (Formula 1), as indicated in FIG. 16.

[Math. 1]

$$\text{Evaluation value} = \frac{pd(\theta, \phi)^H R \; pd(\theta, \phi)}{pd(\theta, \phi)^H pd(\theta, \phi)} \quad \text{(Formula 1)}$$

In (Formula 1), pd(θ, φ) represents an inter-microphone phase difference arising among the microphones constituting the square ultrasonic microphone array 102 of the present first embodiment with respect to the reflected waves arriving from the direction (θ, φ), and is calculated through the following (Formula 2), as illustrated in FIG. 17.

[Math. 2]

$$pd(\theta, \phi) = \begin{pmatrix} pd(\theta, \phi)_0 \\ pd(\theta, \phi)_1 \\ pd(\theta, \phi)_2 \\ pd(\theta, \phi)_3 \end{pmatrix} = \begin{pmatrix} 1 \\ \exp\left[-i \times \frac{2n}{\lambda} \times \left(\left(\frac{\lambda}{4}\right)\sin\theta\cos\phi - \left(\frac{\lambda}{2}\right)\sin\theta\sin\phi\right)\right] \\ \exp\left[-i \times \frac{2n}{\lambda} \times \left(\left(\frac{\lambda}{2}\right)\sin\theta\cos\phi + \left(\frac{\lambda}{4}\right)\sin\theta\sin\phi\right)\right] \\ \exp\left[-i \times \frac{2n}{\lambda} \times \left(\left(\frac{3\lambda}{4}\right)\sin\theta\cos\phi - \left(\frac{\lambda}{4}\right)\sin\theta\sin\phi\right)\right] \end{pmatrix} \quad \text{(Formula 2)}$$

In (Formula 2), i: imaginary unit n: Pi

λ: wavelength of sound pulse signal

When (θ, φ) represent coordinates indicating the arrival direction of the reflected wave in which the inter-microphone phase difference calculated through (Formula 2) arises, and the plane of the microphone array in the ultrasonic sensor 100 is taken as the xy plane, an angle formed with the z axis when the audio output direction is set to the z direction is represented by θ, and an angle formed between the x axis and a line obtained by projecting the reflected wave arrival direction onto the xy plane is φ.

n of $pd(\theta, \varphi)_n$ represents the channel numbers ch0 to ch3 of the microphones a to d, respectively, constituting the square ultrasonic microphone array 102 described with reference to FIG. 8, and n=0 to 3.

The matrix in (Formula 2) is a matrix indicating the amplitude values of the received pulses of the other microphones b to d (ch1 to ch3) at the timing when the amplitude value of the received pulse of the microphone a (ch0) is taken as 1, and is a determinant indicating the phase differences of the microphones a to d (ch0 to ch3).

In addition, in the above (Formula 1), which is an evaluation value calculation formula, $pd(\theta, \varphi)^H$ is a Hermitian transpose of pd(θ, φ).

It should be noted that pd(θ, φ) and $pd(\theta, \varphi)^H$ can be calculated by defining the coordinate positions of the microphones a to d constituting the square ultrasonic microphone array 102 described with reference to FIG. 8, and the coordinate (θ, φ) positions indicating the arrival direction of the reflected wave.

Furthermore, in (Formula 1),

R represents a covariance matrix of an actual observed signal, i.e., a received signal calculated by the phase difference correlation determination unit 124 on the basis of a reflected wave exceeding a defined amplitude threshold input from the amplitude determination unit 123 to determine the analysis target region 170.

When the observed signal is an observed signal x(t) at a reception time t of the received signal, the covariance matrix R of the received signal is calculated according to the following (Formula 3), as illustrated in FIG. 17.

[Math. 3]

$$R = E\left[x(t)\bar{x}(t)^H\right] \quad \text{(Formula 3)}$$

In (Formula 3), x(t) is a Hermitian transpose of x(t), and

E[·] is an ensemble mean.

The ensemble mean is obtained during a pre-set time window.

In addition, in (Formula 3), the observed signal x(t) at the reception time t of the received signal is illustrated as a matrix in the following (Formula 4), as illustrated in FIG. 17.

[Math. 4]

$$x(t) = \begin{pmatrix} x0(t) \\ x1(t) \\ x2(t) \\ x3(t) \end{pmatrix} \quad \text{(Formula 4)}$$

In (Formula 4), x0(t) to x3(t) indicate the amplitude at the time t for each of the microphones a (ch0) to d (ch3) constituting the square ultrasonic microphone array 102 described with reference to FIG. 8.

The value of the denominator $(pd(\theta, \varphi)^H pd(\theta, \varphi))$ in the above (Formula 1), which is the evaluation value calculation formula indicated in FIGS. 16 and 17, is a value that can be calculated on the basis of the coordinate positions of the microphones a to d constituting the square ultrasonic microphone array 102 described with reference to FIG. 8, and the coordinate (θ, φ) positions indicating the arrival direction of the reflected waves.

The microphone arrangement is determined by the square ultrasonic microphone array 102 described with reference to FIG. 8.

In addition, the coordinates (θ, φ) indicating the arrival direction of the reflected waves are determined on the basis of the analysis target direction 160, as described earlier with reference to FIG. 15, for example. For example, when the analysis target direction 160 is in the z-axis direction, the coordinates (θ, φ) can be set to (0, 0), as described with reference to FIG. 15.

In addition, the value of the numerator $(pd(\theta, \varphi)^H \cdot R \cdot pd(\theta, \varphi))$ in the above (Formula 1) changes depending on the value of the covariance matrix R of the actual observed signal.

As described earlier, the covariance matrix R represents a covariance matrix of an actual observed signal, i.e., a received signal calculated by the phase difference correlation determination unit 124 on the basis of a reflected wave exceeding a defined amplitude threshold input from the amplitude determination unit 123 to determine the analysis target region 170.

The phase difference correlation evaluation value calculated through the foregoing (Formula 1), which is the evaluation value calculation formula indicated in FIGS. 16 and 17, is such that the actual observed signal, i.e., the reflected wave exceeding the defined amplitude threshold input from the amplitude determination unit 123 for the phase difference correlation determination unit 124 to determine the analysis target region 170, becomes greater as more reflected waves from the coordinate (θ, φ) direction indicating the analysis target direction 160 used in (Formula 1) are present.

In other words, the higher the correlation (the higher the similarity) between the phase difference distribution of each microphone calculated on the basis of the reflected waves from the coordinate (θ, φ) direction and the phase difference distribution of each microphone obtained from the observed signal is, the greater the value of the evaluation value (the phase difference correlation evaluation value) calculated through the above (Formula 1) becomes.

On the other hand, the lower the correlation (the higher the dissimilarity) between the phase difference distribution of each microphone calculated on the basis of the reflected waves from the coordinate (θ, φ) direction and the phase difference distribution of each microphone obtained from the observed signal is, the lower the value of the evaluation value (the phase difference correlation evaluation value) calculated through the above (Formula 1) becomes.

A specific example of the calculation result of the evaluation value (the phase difference correlation evaluation value) calculated through the foregoing (Formula 1), which is the evaluation value calculation formula indicated in FIGS. 16 and 17, i.e., an example of a simulation result for the evaluation value, will be described with reference to FIG. 18.

FIG. 18 illustrates an example of the simulation result for the evaluation value. The example of the evaluation value calculation result indicated in FIG. 18 is an evaluation value calculation result obtained when the microphone arrangement is the square ultrasonic microphone array 102 described with reference to FIG. 8, and the coordinates (θ, φ) indicating the analysis target direction are (0, 0), i.e., the analysis target direction 160 is taken as the z axis, as described with reference to FIG. 15.

The phase difference correlation evaluation value is calculated in a range of 0.0 to 4.0. Higher phase difference correlation evaluation values are indicated by darker colors (closer to black), and lower phase difference correlation evaluation values are indicated by lighter colors (closer to white).

(a) in FIG. 18 indicates phase difference correlation evaluation value distribution data observed from the upper-right front direction of the z axis, which is the analysis target direction.

(b) in FIG. 18 indicates phase difference correlation evaluation value distribution data observed from the direction of the z axis, which is the analysis target direction.

Note that the x axis and the y axis in (b) in FIG. 18 represent the coordinates (θ, φ)=(0, 0) indicating the analysis target direction, i.e., the angle from the z axis (10°, 30°, 50°).

As can be seen from the figure, the phase difference correlation evaluation value increases with proximity to the z axis, and the phase difference correlation evaluation value decreases with distance from the z axis.

In this manner, the higher the correlation between the phase difference of the microphone calculated on the basis of the coordinates (θ, φ) indicating the analysis target direction and the phase difference of the microphone calculated on the basis of the observed signal (the reflected wave) is, the higher the evaluation value calculated through (Formula 1) becomes, whereas the lower the correlation is, the lower the evaluation value becomes.

This means that the higher the number of reflected waves from the analysis target direction in the observed signal (the reflected wave) is, the higher the evaluation value becomes, and the lower the amount of reflected waves from the analysis target direction in the reflected wave included in the observed signal is, the lower the evaluation value becomes.

The phase difference correlation determination unit 124 further performs processing of comparing the phase difference correlation evaluation value calculated according to the foregoing (Formula 1) with a predefined threshold (the phase difference correlation evaluation value correspondence threshold) and determining a region having a phase difference correlation evaluation value exceeding the threshold to be the analysis target region.

In other words, processing is performed to determine the analysis target region 170 described earlier with reference to FIG. 15 and the like on the basis of the threshold (the phase difference correlation evaluation value correspondence threshold).

This processing will be described with reference to FIG. 19.

The graph in FIG. 19 is a graph indicating the angle from the analysis target direction on the horizontal axis and the evaluation value on the vertical axis. The curve in the graph is a curve calculated through (Formula 1), which is the evaluation value (phase difference correlation evaluation value) calculation formula described earlier with reference to FIGS. 16 and 17, and is data obtained by graphing the shading information indicated in FIG. 18.

Note that the angle of the horizontal axis is, for example, the coordinates (θ, φ)=(0, 0) indicating the analysis target direction in the example illustrated in FIG. 15, i.e., the angle from the z axis.

As can be seen from the graph in the figure, as the angle from the analysis target direction increases, the evaluation value (the phase difference correlation evaluation value) decreases.

FIG. 19 illustrates an example in which the threshold (the phase difference correlation evaluation value correspondence threshold) is set to an evaluation value of 3.0.

When the evaluation value is set to 3.0, the analysis target region is a region with an angle within 20° from the analysis target direction.

For example, as described earlier with reference to FIG. 15, when the analysis target direction (θ, φ)=(0, 0), i.e., when the z axis is taken as the analysis target direction, a region exceeding the evaluation value of 3.0 becomes the analysis target region 170 illustrated in FIG. 20, for example.

In the example illustrated in FIG. 20, a region in which the angle from the analysis target direction 160 exceeding the evaluation value (the phase difference correlation evaluation value) of 3.0 is within 20° becomes the analysis target region 170.

A region where the angle from the analysis target direction 160 is at least 20° has an evaluation value (phase difference correlation evaluation value) of 3.0 or less, and is an analysis exclusion region 175.

Note that the threshold (the phase difference correlation evaluation value correspondence threshold) can be set in various ways, and if the threshold is set to a low value, a broader analysis target region can be set. On the other hand, if the threshold is set to a high value, an analysis target region having a narrower, more limited range can be set.

In this manner, the phase difference correlation determination unit 124 of the data processing unit 120 of the object position analysis device 150 illustrated in FIG. 9 calculates the phase difference correlation evaluation value in accordance with the above-described evaluation value calculation formula (Formula 1) on the basis of a reflected wave exceeding a defined amplitude threshold extracted by the amplitude determination unit 123, and extracts only a reflected wave exceeding a predefined threshold (the phase difference correlation evaluation value correspondence threshold).

In other words, only the reflected wave of the analysis target region 170 illustrated in FIG. 20 is extracted.

The subsequent processing of the data processing unit 120 of the object position analysis device 150 will be described with reference again to FIG. 9.

The reflected wave extracted by the phase difference correlation determination unit 124, i.e., the reflected wave in which the evaluation value calculated in accordance with the above-described evaluation value calculation formula (Formula 1) exceeds the defined threshold (the phase difference correlation evaluation value correspondence threshold), is input to an object position (distance and direction) calculation unit 125, illustrated in FIG. 9.

Specifically, for example, only the reflected wave of the analysis target region 170 illustrated in FIG. 20 is input to the object position (distance and direction) calculation unit 125.

The object position (distance and direction) calculation unit 125 calculates the object position (distance and direction) based on the reflected wave, using only the reflected wave from the analysis target region 170 for the analysis.

The distance of the object is calculated on the basis of a response time, which is a time from the timing at which the audio pulse is output to the timing at which the reflected wave is received, according to the principles of Time of Flight (ToF), for example.

The direction of the object is estimated by applying an existing method, e.g., an algorithm such as a beamforming method, MUSIC, or the like, on the basis of the inter-microphone phase difference of the reflected waves.

For example, as illustrated in FIG. 21, the microphones a (ch0) to d (ch3) of the square microphone array illustrated in (1) in FIG. 21 are projected onto the x axis, as illustrated in (2) in FIG. 21.

At this projection position, a direction α of the reflected waves in the xz plane can be calculated on the basis of the inter-microphone phase difference of the reflected waves.

The direction α of the reflected waves is an angle indicating the planar direction (the direction in the xz plane) of the object that reflected the reflected waves, i.e., an angle α corresponds to an angle formed by the object direction and the Z axis in the xz plane.

Similarly, as illustrated in FIG. 22, the microphones a (ch0) to d (ch3) of the square microphone array illustrated in (1) in FIG. 22 are projected onto the Y axis, as illustrated in (2) in FIG. 22.

At this projection position, a direction β of the reflected waves in the yz plane can be calculated on the basis of the inter-microphone phase difference of the reflected waves.

The direction β of the reflected waves is an angle indicating the vertical direction (the direction in the yz plane) of the object that reflected the reflected waves, i.e., an angle β corresponds to an angle formed by the object direction and the Z axis in the yz plane.

The object position (distance and direction) calculation unit 125 can calculate the direction of the reflected waves, i.e., the direction of the object, in this manner, for example.

As is clear from the foregoing descriptions, the object analysis device 150 of the present disclosure limits the analysis target region around the analysis target direction, selects only the reflected waves from the analysis target region limited in this manner, and uses only the selected reflector to calculate the position of the object that produced the reflected waves, i.e., the distance to and the direction of the object.

This processing makes it possible to perform object position (distance and direction) analysis processing which eliminates the effects of reflected waves from objects outside the analysis target region, e.g., reflected waves from a ceiling and the like, which achieves highly-accurate object position analysis.

3. (First Embodiment) Processing Sequence in Embodiment Using Sensor Having Square Microphone Array A processing sequence in the first embodiment described above, i.e., an embodiment using a sensor having a square microphone array, will be described next.

FIG. 23 is a flowchart illustrating a processing sequence performed in the first embodiment described above, i.e., by the object analysis device 150 described above with reference to FIG. 9.

Note that the processing according to the flowchart illustrated in FIG. 23 can be executed according to a program stored in a storage unit of the object analysis device 150 illustrated in FIG. 9.

The processing according to the flowchart illustrated in FIG. 23 is executed under the control of a control unit having a function for executing programs, such as a CPU, of the object analysis device 150. The processing of each step in the flow illustrated in FIG. 23 will be described in detail hereinafter in order.

(Step S101)

First, in step S101, the object analysis device 150 illustrated in FIG. 9 transmits an ultrasonic wave pulse.

This processing is executed by the timing control unit 121 of the data processing unit 120 of the object analysis device 150 illustrated in FIG. 9, the ultrasonic pulse transmission unit 122, and the ultrasonic speaker 101 of the ultrasonic sensor 100.

The timing control unit 121 controls the timing of the output of the ultrasonic pulse signal output from the ultrasonic speaker 101 of the ultrasonic sensor 100. The ultrasonic pulse transmission unit 122 generates an ultrasonic pulse signal, and outputs the generated ultrasonic pulse signal from the ultrasonic speaker 101 at a timing controlled by the timing control unit 121.

As described with reference to FIGS. 7 and 8, when the plane on which the ultrasonic speaker 101 and the square ultrasonic microphone array 102 constituting the ultrasonic sensor 100 are present is taken as the xy plane, the output direction of the ultrasonic pulse signal output from the ultrasonic speaker 101 of the ultrasonic sensor 100 is the z-axis direction.

(Step S102)

Next, in step S102, the object analysis device 150 receives a reflected wave from the ultrasonic wave pulse transmitted in step S101.

The ultrasonic pulse signal emitted from the ultrasonic speaker 101 of the ultrasonic sensor 100 is reflected by various objects, and these reflected waves are input into each of the microphones constituting the square ultrasonic microphone array 102 of the ultrasonic sensor 100, i.e., the microphones 1/102-1 to n/102-*n* illustrated in FIG. 9.

For example, a sound wave signal such as (a) a microphone reception signal, illustrated on the right side of FIG. 23, is input to the microphones.

This figure corresponds to (a) the microphone reception signal described earlier with reference to FIG. 10. As illustrated in the figure, the microphone input signal includes “direct waves” and “reflected waves”. A “direct wave” is a direct input signal of an ultrasonic pulse signal output from the ultrasonic speaker 101 of the ultrasonic sensor 100, and is not a reflected wave from an object.

The signal input to the microphone at a delay after the “direct wave” is a “reflected wave”, and the ultrasonic pulse signal output from the ultrasonic speaker 101 of the ultrasonic sensor 100 is a signal which has been reflected by some object and is then input to the microphone.

Such an audio signal is input into each of the microphones 1/102-1 to n/102-*n* constituting the square ultrasonic microphone array 102 of the ultrasonic sensor 100.

(Step S103)

Next, in step S103, the object analysis device 150 executes processing for extracting only reflected waves exceeding a predefined threshold from the reflected waves received by the microphones in step S102.

This processing is processing performed by the amplitude determination unit 123 of the data processing unit 120 of the object analysis device 150 illustrated in FIG. 9.

The amplitude determination unit 123 selects reflected wave parts from the input signals (reflected waves) of each of the microphones 1/102-1 to n/102-*n* constituting the square ultrasonic microphone array 102, and further extracts only reflected waves exceeding a predefined amplitude threshold from the selected reflected waves as valid reflected waves.

Note that a reflected wave “exceeding a defined amplitude threshold” means that the reflected wave has a reception strength sufficiently greater than environmental noise.

The processing performed by the amplitude determination unit 123 in step S103 corresponds to the processing described earlier with reference to FIGS. 11 and 12. First, the amplitude determination unit 123 selects the reflected wave part from the microphone reception signal. Then, the amplitude determination unit 123 extracts, from the selected reflected wave, only a reflected wave exceeding a predefined amplitude threshold prescribed, as a valid reflected wave.

For example, as described earlier with reference to FIG. 12, the waveform part indicated in “(b2) Example of processing by amplitude determination unit 123-2” in FIG. 12 is extracted as a valid reflected wave exceeding the predefined amplitude threshold.

(Step S104)

Next, in step S104, the object analysis device 150 executes processing for extracting, from the reflected waves exceeding the defined amplitude threshold extracted in step S103, only a reflected wave for which the phase difference correlation evaluation value further exceeds a predefined threshold (the phase difference correlation evaluation value correspondence threshold).

This processing is processing performed by the phase difference correlation determination unit 124 of the data processing unit 120 of the object analysis device 150 illustrated in FIG. 9.

The processing performed by the phase difference correlation determination unit 124 in step S104 corresponds to the processing described earlier with reference to FIGS. 13 to 20.

As described earlier with reference to FIGS. 13 to 20, the reflected wave exceeding the phase difference correlation evaluation value correspondence threshold extracted by the phase difference correlation determination unit 124 in step S104 corresponds to a reflected wave from a pre-set analysis target region.

As described earlier with reference to FIG. 13 and the like, the analysis target region is set as a conical region centered on a specific direction, i.e., a specific analysis target direction.

As illustrated in FIG. 13, a conical region that takes the analysis target direction 160 set in the (θ, φ) direction as a center axis can be set as the analysis target region 170.

As described earlier with reference to FIGS. 13 and 14, the analysis target direction (θ, φ) can be set to any desired direction. The size of the analysis target region can be freely adjusted by setting the threshold used by the phase difference correlation determination unit 124 (the phase difference correlation evaluation value correspondence threshold).

First, for each of the reflected waves exceeding the defined amplitude threshold extracted by the amplitude determination unit 123 in step S103, the phase difference correlation determination unit 124 calculates an evaluation value (phase difference correlation evaluation value). In other words, the evaluation value (the phase difference correlation evaluation value) is calculated according to (Formula 1) described earlier with reference to FIGS. 16 and 17.

The higher the correlation (the higher the similarity) between the phase difference distribution of the microphones obtained from the observed signal and the phase difference distribution based on the reflected waves from the analysis target direction (θ, φ) is, the higher the phase difference correlation evaluation value calculated according to (Formula 1) becomes, whereas the lower the correlation (the higher the dissimilarity) is, the lower the value becomes. In other words, the evaluation value distribution takes on the distribution described earlier with reference to FIG. 18, for example.

The phase difference correlation determination unit 124 performs processing for comparing the phase difference correlation evaluation value calculated on the basis of the observed signal with a predefined threshold (the phase difference correlation evaluation value correspondence threshold), and determines a region having a phase difference correlation evaluation value that exceeds the threshold as the analysis target region.

This processing is the processing described earlier with reference to FIG. 19.

As described earlier with reference to FIG. 19, as the angle from the analysis target direction increases, the evaluation value (the phase difference correlation evaluation value) decreases. The example illustrated in FIG. 19 is an example in which the threshold (the phase difference correlation evaluation value correspondence threshold) is set to an evaluation value of 3.0.

When the evaluation value is set to 3.0, the analysis target region is a region with an angle within 20° from the analysis target direction, and therefore becomes the analysis target region 170 illustrated in FIG. 20.

As described above, the threshold (the phase difference correlation evaluation value correspondence threshold) can be set in various ways, and if the threshold is set to a low value, a broader analysis target region can be set. On the other hand, if the threshold is set to a high value, an analysis target region having a narrower, more limited range can be set.

In this manner, in step S104, the phase difference correlation determination unit 124 calculates the phase difference correlation evaluation value according to the above-described evaluation value calculation formula (Formula 1) on the basis of the reflected wave exceeding the defined amplitude threshold extracted by the amplitude determination unit 123 in step S103, and extracts only a reflected wave exceeding a predefined threshold (the phase difference correlation evaluation value correspondence threshold).

In other words, only the reflected wave of the analysis target region 170 illustrated in FIG. 20 is extracted.

(Steps S105 and S106)

Next, in steps S105 and S106, the object analysis device 150 calculates the object position (distance and direction) based on the reflected wave extracted by the phase difference correlation determination unit 124 in step S104, i.e., using only the reflected wave having the phase difference correlation evaluation value exceeding the predefined threshold (the phase difference correlation evaluation value correspondence threshold) for the analysis.

This processing is processing performed by the object position (distance and direction) calculation unit 125 of the data processing unit 120 of the object analysis device 150 illustrated in FIG. 9.

The object position (distance and direction) calculation unit 125 calculates the distance of the object on the basis of a response time, which is a time from the timing at which the audio pulse is output to the timing at which the reflected wave is received, according to the principles of Time of Flight (ToF), for example.

Furthermore, the direction of the object is estimated by applying an algorithm such as a beamforming method, MUSIC, or the like.

In other words, as described earlier with reference to FIG. 21, the microphones a (ch0) to d (ch3) of the square microphone array are projected onto the x axis, as illustrated in (2) in FIG. 21.

At this projection position, a direction α of the reflected waves in the xz plane can be calculated on the basis of the inter-microphone phase difference of the reflected waves.

Similarly, as illustrated in FIG. 22, the microphones a (ch0) to d (ch3) of the square microphone array illustrated in (1) in FIG. 22 are projected onto the y axis, as illustrated in (2) in FIG. 22.

At this projection position, a direction β of the reflected waves in the yz plane can be calculated on the basis of the inter-microphone phase difference of the reflected waves.

In this manner, in steps S105 and S106, the object position (distance and direction) calculation unit 125 calculates the distance to and direction of the object that produced the reflected wave.

As described above, the object analysis device 150 of the present disclosure limits the analysis target region around the analysis target direction, selects only the reflected waves from the analysis target region limited in this manner, and uses only the selected reflector to calculate the position of the object that produced the reflected waves, i.e., the distance to and the direction of the object.

This processing makes it possible to perform object position (distance and direction) analysis processing which eliminates the effects of reflected waves from objects outside the analysis target region, e.g., reflected waves from a ceiling and the like, which makes it possible to perform highly-accurate object position analysis.

4. (Second Embodiment) Embodiment Using Sensor Having Diamond-Shaped Microphone Array An embodiment using a sensor having a diamond-shaped microphone array will be described next as a second embodiment of the object position analysis device of the present disclosure.

The object position analysis device of the second embodiment has a configuration in which the square ultrasonic microphone array 102 of the ultrasonic sensor 100 of the object position analysis device 150 of the first embodiment described earlier with reference to FIG. 9 is replaced with a diamond-shaped ultrasonic microphone array having a diamond shape rather than a square shape.

FIG. 24 is a diagram illustrating an example of the configuration of a diamond-shaped ultrasonic microphone array 103 in the ultrasonic sensor 100 of the present second embodiment.

As illustrated in FIG. 24, the ultrasonic sensor 100 of the present second embodiment includes the ultrasonic speaker 101 that outputs an ultrasonic pulse signal, and a diamond-shaped ultrasonic microphone array 103 in which four microphones are provided at corresponding vertices of a diamond shape that is tilted with respect to the x axis and that is longer in an up-down direction.

An example of the configuration of the diamond-shaped ultrasonic microphone array 103 in the ultrasonic sensor 100 of the present second embodiment will be described in detail with reference to FIG. 25.

As illustrated in FIG. 25, the ultrasonic sensor 100 of the present disclosure includes the diamond-shaped ultrasonic microphone array 103 in which four microphones are provided at corresponding vertices of a diamond shape that is tilted and that is longer in the up-down direction (the y-axis direction).

The right side of FIG. 25 is a diagram illustrating the arrangement of the diamond-shaped ultrasonic microphone array 103 in detail.

The plane of the ultrasonic sensor is indicated as an xy plane, and a direction extending perpendicular from the xy plane is indicated as the z axis. The z-axis direction corresponds to a direction in which ultrasonic waves are output from the ultrasonic speaker 101.

A microphone a (ch0), a microphone b (ch1), a microphone c (ch2), and a microphone d (ch3) indicated on the xy coordinates on the right side of FIG. 25 represent the specific positions of the four microphones a to d constituting the diamond-shaped ultrasonic microphone array 103. Each of the microphones a (ch0) to d (ch3) is disposed at a corresponding vertex of a diamond shape, set on the xy plane, that has a tilt relative to the x axis and that is longer in the up-down direction (the y-axis direction), as illustrated in the figure.

When the wavelength of the ultrasonic pulse signal output from the ultrasonic speaker 101 is represented by λ, the microphones a (ch0) to d (ch3) constituting the diamond-shaped ultrasonic microphone array 103 are arranged such that the interval between adjacent microphones projected on the x axis is no greater than λ/4, and the interval between adjacent microphones projected on the y axis is no greater than A. The microphones are also arranged such that the positions thereof do not overlap when projected on the x axis. Using such an arrangement makes it possible to accurately estimate a direction in the xz plane.

Furthermore, arranging the microphones such that the projection positions thereof on the y axis do not overlap makes it possible to accurately estimate a direction in the yz plane.

Although an example in which the number of microphones is four is described here, processing similar to that performed in the present embodiment can be performed as long as the number of microphones is at least three.

As illustrated in FIG. 25, when the microphone (ch0) is set to the position of the origin (x, y)=(0, 0) of the xy coordinates, the four microphones (ch0 to ch3) are set to the following coordinate positions.

Position (x, y) of microphone a (ch0)=(0, 0)

Position (x, y) of microphone b (ch1)=(λ/4, −λ)

Position (x, y) of microphone c (ch2)=(λ/2, 3λ/4)

Position (x, y) of microphone d (ch3)=(3λ/4, −λ/4)

In this manner, the ultrasonic sensor of the object position analysis device of the present second embodiment includes a microphone array having the four microphones a (ch0) to d (ch3) at corresponding vertices of a diamond shape, set on the xy plane, that has a tilt and is longer in the up-down direction (the y-axis direction), as illustrated in FIG. 25, i.e., the diamond-shaped ultrasonic microphone array 103.

Analyzing the phase differences between the reflected waves input to the microphones using the diamond-shaped ultrasonic microphone array 103 makes it possible to extract only the reflected waves in a pre-set analysis target direction, e.g., an analysis target direction in front of a robot corresponding to the z-axis direction of the sensor. This makes it possible to analyze the position (distance and direction) of an object in the analysis target direction with a high level of accuracy.

Using the diamond-shaped microphone array that is longer in the up-down direction (the y-axis direction) of the present second embodiment makes it possible to narrow the viewing angle in the yz plane. In other words, using a narrow viewing angle makes it possible to eliminate reflected waves from a ceiling, a floor, or the like. At the same time, a broader viewing angle can be used for reflected waves in a horizontal plane (the xz plane), which ensures a broad position measurement range.

With the configuration using the diamond-shaped microphone array of the present second embodiment, the horizontal planar viewing angle per ultrasonic sensor can be set to be broader. Accordingly, even in a configuration where the entire 360-degree periphery in the horizontal plane is to be sensed, as with, for example, an automated transport robot, the number of sensors to be installed on the robot can be reduced.

The configuration of the data processing unit of the object position analysis device of the present second embodiment is the same as the configuration of the data processing unit 120 in the object position analysis device 150 of the first embodiment described earlier with reference to FIG. 9.

The amplitude determination unit 123 of the data processing unit 120 selects reflected wave parts from the input signals (reflected waves) of each of the microphones constituting the diamond-shaped ultrasonic microphone array 103, and further extracts only reflected waves exceeding a predefined amplitude threshold from the selected reflected waves as valid reflected waves.

Furthermore, the phase difference correlation determination unit 124 calculates the phase difference correlation evaluation value according to the above-described evaluation value calculation formula (Formula 1) on the basis of the reflected waves exceeding the defined amplitude threshold extracted by the amplitude determination unit 123, and extracts only a reflected wave exceeding a predefined threshold (the phase difference correlation evaluation value correspondence threshold).

In other words, the evaluation value (phase difference correlation evaluation value) is calculated according to the following (Formula 1).

[Math. 5]

-continued $$\text{Evaluation value} = \frac{pd(\theta,\phi)^H R\, pd(\theta,\phi)}{pd(\theta,\phi)^H pd(\theta,\phi)} \qquad \text{(Formula 1)}$$

In (Formula 1), pd(θ, φ) represents an inter-microphone phase difference arising among the microphones constituting the diamond-shaped ultrasonic microphone array 103 of the present second embodiment with respect to the reflected waves arriving from the direction (θ, φ), and is calculated through the following (Formula 5).

[Math. 6]

$$pd(\theta,\phi) = \begin{pmatrix} pd(\theta,\phi)_0 \\ pd(\theta,\phi)_1 \\ pd(\theta,\phi)_2 \\ pd(\theta,\phi)_3 \end{pmatrix} = \begin{pmatrix} 1 \\ \exp\left[-i\times\frac{2n}{\lambda}\times\left(\left(\frac{\lambda}{4}\right)\sin\theta\cos\phi-(\lambda)\sin\theta\sin\phi\right)\right] \\ \exp\left[-i\times\frac{2n}{\lambda}\times\left(\left(\frac{\lambda}{2}\right)\sin\theta\cos\phi+\left(\frac{3\lambda}{4}\right)\sin\theta\sin\phi\right)\right] \\ \exp\left[-i\times\frac{2n}{\lambda}\times\left(\left(\frac{3\lambda}{4}\right)\sin\theta\cos\phi-\left(\frac{\lambda}{4}\right)\sin\theta\sin\phi\right)\right] \end{pmatrix} \qquad \text{(Formula 5)}$$

In (Formula 5), i: imaginary unit n: Pi

λ: wavelength of sound pulse signal

When (θ, φ) represent coordinates indicating the arrival direction of the reflected wave in which the inter-microphone phase difference calculated through (Formula 5) arises, and the plane of the microphone array in the ultrasonic sensor 100 is taken as the xy plane, an angle formed with the z axis when the audio output direction is set to the z direction is represented by θ, and is an angle formed between the x axis and a line obtained by projecting the reflected wave arrival direction onto the xy plane.

n of $pd(\theta, \varphi)_n$ represents the channel numbers ch0 to ch3 of the microphones a to d, respectively, constituting the diamond-shaped ultrasonic microphone array 103 described with reference to FIG. 25, and n=0 to 3.

The matrix in (Formula 5) is a matrix indicating the amplitude values of the received pulses of the other microphones b to d (ch1 to ch3) at the timing when the amplitude value of the received pulse of the microphone a (ch0) is taken as 1, and is a determinant indicating the phase differences of the microphones a to d (ch0 to ch3).

Furthermore, in (Formula 1),

R represents a covariance matrix of an actual observed signal, i.e., a received signal calculated by the phase difference correlation determination unit 124 on the basis of a reflected wave exceeding a defined amplitude threshold input from the amplitude determination unit 123 to determine the analysis target region 170, and is a covariance matrix similar to that of the first embodiment described earlier.

As described earlier with reference to FIG. 17, when the observed signal is an observed signal x(t) at a reception time t of the received signal, the covariance matrix R of the received signal is calculated according to the above-described (Formula 3).

A specific example of a phase difference correlation evaluation value calculated when the diamond-shaped ultrasonic microphone array 103 of the present second embodiment is used will be described with reference to FIG. 26.

The example of the evaluation value calculation result indicated in FIG. 26 is an evaluation value calculation result obtained when the microphone arrangement is the diamond-shaped ultrasonic microphone array 103, and the coordinates (θ, φ) indicating the analysis target direction are (0, 0), i.e., the analysis target direction 160 is taken as the z axis, as described earlier in the first embodiment with reference to FIG. 15.

The phase difference correlation evaluation value is calculated in a range of 0.0 to 4.0. Higher phase difference correlation evaluation values are indicated by darker colors (closer to black), and lower phase difference correlation evaluation values are indicated by lighter colors (closer to white).

(a) in FIG. 26 indicates phase difference correlation evaluation value distribution data observed from the upper-right front direction of the z axis, which is the analysis target direction.

(b) in FIG. 26 indicates phase difference correlation evaluation value distribution data observed from the direction of the z axis, which is the analysis target direction.

Note that the x axis and the y axis in (b) in FIG. 26 represent the coordinates (θ, φ)=(0, 0) indicating the analysis target direction, i.e., the angle from the z axis (10°, 30°, 50°).

As can be seen from the figure, when the diamond-shaped ultrasonic microphone array 103 of the present second embodiment is used, the phase difference correlation evaluation value increases with proximity to the z axis, and the phase difference correlation evaluation value decreases with distance from the z axis. Furthermore, the evaluation value decreases sharply in the up-down direction (the y-axis direction) and the evaluation value decreases gradually in the lateral direction (the x-axis direction).

In other words, there is a flat evaluation value distribution extending in the lateral direction.

As a result, the analysis target region can be set to a flat cone shape that is broad in the lateral direction and narrow in the longitudinal direction. For example, reflected waves from a ceiling, a floor, or the like can be eliminated, and a region which is broad in the horizontal direction can be set as the analysis target region.

Furthermore, the phase difference correlation determination unit 124 performs processing of comparing the phase difference correlation evaluation value calculated according to the above-described (Formula 1) with a predefined threshold (a phase difference correlation evaluation value correspondence threshold) and determining a region having a phase difference correlation evaluation value exceeding the threshold to be an analysis target region.

This processing will be described with reference to FIG. 27.

The graph in FIG. 27 is a graph indicating the angle from the analysis target direction on the horizontal axis and the evaluation value on the vertical axis.

The curve in the graph is a curve calculated through (Formula 1), which is the evaluation value (phase difference correlation evaluation value) calculation formula described earlier, and is data obtained by graphing the shading information indicated in FIG. 26.

Note that the angle of the horizontal axis is the coordinates (θ, φ)=(0, 0) indicating the analysis target direction, i.e., the angle from the z axis.

As can be seen from the graph in the figure, as the angle from the analysis target direction increases, the evaluation value (the phase difference correlation evaluation value) decreases.

With the configuration using the diamond-shaped ultrasonic microphone array 103 of the present second embodiment, the evaluation value decreases sharply in the up-down direction (the y-axis direction) and the evaluation value decreases gradually in the lateral direction (the x-axis direction).

In other words, there is a flat evaluation value distribution extending in the lateral direction.

FIG. 27 illustrates an example in which the threshold (the phase difference correlation evaluation value correspondence threshold) is set to an evaluation value of 1.0.

When the evaluation value is set to 1.0, the analysis target region becomes a region in which the angle from the analysis target direction is within 20° in the up-down direction (the y-axis direction) and 45° in the lateral direction (the x-axis direction).

The analysis target region can be determined using such a threshold. The analysis target region of the present second embodiment can be set to a flat cone shape that is broad in the lateral direction and narrow in the longitudinal direction.

As a result, for example, reflected waves from a ceiling, a floor, or the like can be eliminated, and a region which is broad in the horizontal direction can be set as the analysis target region.

In other words, using a diamond-shaped microphone array makes it possible to eliminate reflected waves from a ceiling, a floor, or the like at a narrow viewing angle, makes it possible to ensure a broad position measurement range in the horizontal plane (the xz plane).

5. (Third Embodiment) Embodiment Using Sensor Having Triangular Microphone Array An embodiment using a sensor having a triangular microphone array will be described next as a third embodiment of the object position analysis device of the present disclosure.

The object position analysis device of the third embodiment has a configuration in which the square ultrasonic microphone array 102 of the ultrasonic sensor 100 of the object position analysis device 150 of the first embodiment described earlier with reference to FIG. 9 is replaced with a triangular ultrasonic microphone array which is triangular instead of square.

FIG. 28 is a diagram illustrating an example of the configuration of a triangular ultrasonic microphone array 104 in the ultrasonic sensor 100 of the present third embodiment.

As illustrated in FIG. 28, the ultrasonic sensor 100 of the present third embodiment includes the ultrasonic speaker 101 that outputs an ultrasonic pulse signal, and the triangular ultrasonic microphone array 104 in which three microphones are provided at corresponding vertices of a triangle that is tilted.

An example of the configuration of the triangular ultrasonic microphone array 104 in the ultrasonic sensor 100 of the present third embodiment will be described in detail with reference to FIG. 28.

The right side of FIG. 28 is a diagram illustrating the arrangement of the triangular ultrasonic microphone array 104 in detail.

The plane of the ultrasonic sensor is indicated as an xy plane, and a direction extending perpendicular from the xy plane is indicated as the z axis. The z-axis direction corresponds to a direction in which ultrasonic waves are output from the ultrasonic speaker 101.

A microphone a (ch0), a microphone b (ch1), and a microphone c (ch2) indicated on the xy coordinates on the right side of FIG. 28 represent the specific positions of the three microphones a to c constituting the triangular ultrasonic microphone array 103. Each of the microphones a (ch0) to c (ch2) is disposed at a corresponding vertex of a triangle, set on the xy plane, that has a tilt relative to the x axis and that is longer in the up down direction (the y-axis direction), as illustrated in the figure.

When the wavelength of the ultrasonic pulse signal output from the ultrasonic speaker 101 is represented by λ, the microphones a (ch0) to c (ch2) constituting the triangular ultrasonic microphone array 103 are arranged such that the interval between adjacent microphones projected on the x axis and the y axis is no greater than λ/4. Arranging the microphones such that the projection positions thereof when projected on the x axis do not overlap makes it possible to accurately estimate a direction in the xz plane.

Furthermore, arranging the microphones such that the projection positions thereof on the y axis do not overlap makes it possible to accurately estimate a direction in the yz plane.

As illustrated in FIG. 28, when the microphone (ch0) is set to the position of the origin (x, y)=(0, 0) of the xy coordinates, the three microphones (ch0 to ch2) are set to the following coordinate positions.

Position (x, y) of microphone a (ch0)=(0, 0)

Position (x, y) of microphone b (ch1)=(λ/4, −λ/4)

Position (x, y) of microphone c (ch2)=(λ/2, λ/4)

In this manner, the ultrasonic sensor of the object position analysis device of the present third embodiment includes a microphone array having the three microphones a (ch0) to c (ch2) at corresponding vertices of a triangle, set on the xy plane, that has a tilt, as illustrated in FIG. 28, i.e., the triangular ultrasonic microphone array 104.

Analyzing the phase differences between the reflected waves input to the microphones using the triangular ultrasonic microphone array 104 makes it possible to extract only the reflected waves in a pre-set analysis target direction, e.g., an analysis target direction in front of a robot corresponding to the z-axis direction of the sensor. This makes it possible to analyze the position (distance and direction) of an object in the analysis target direction with a high level of accuracy.

6. (Fourth Embodiment) Embodiment of Object Position Analysis Device Having Ultrasonic Sensor and Attitude Sensor An embodiment of an object position analysis device having an ultrasonic sensor and an attitude sensor will be described next as a (fourth embodiment).

The fourth embodiment described hereinafter is an embodiment in which an object position analysis device having an ultrasonic sensor and an attitude sensor is mounted on a cane for walking support for a visually impaired person, for example.

An overview of the present fourth embodiment will be given with reference to FIG. 29.

As illustrated in FIG. 29, an object position analysis device 150B is attached to a cane 240 held by a user 180, such as a visually impaired person, for example.

The object position analysis device 150B is a device including the ultrasonic sensor 100 and an attitude sensor 200.

When the ultrasonic sensor 100 in the object position analysis device 150B is used to detect an obstacle having limited the detection to the forward direction of the user 180, the attitude of the ultrasonic sensor may become destabilized due to movement of the cane 240.

In order to correct this attitude instability, attitude information obtained from an accelerometer or a gyro sensor may be used to control the attitude of a gimbal or a drone, for example. However, when controlling the attitude using such a mechanism, there is a high likelihood that delay will arise due to physical effects, such as weight, before the information from the attitude sensor is reflected in the attitude of the device.

Accordingly, the object position analysis device 150B having the attitude sensor 200 along with the ultrasonic sensor 100 is attached to the cane 240, and the positions of objects in the forward direction (walking direction) of the user 180 are analyzed without delay by dynamically changing the analysis target direction and analysis target region on the basis of angle information from the attitude sensor 200.

Through this configuration, attitude instability in the position measurement device can be corrected at high speed through signal processing alone, without dynamically changing the arrangement or orientation of the ultrasonic speaker or microphones.

A specific example will be described with reference to FIG. 30.

FIG. 30 illustrates the following two diagrams.

(a) Before Correction of Analysis Target Region (b) after Correction of Analysis Target Region In both figures, the user 180 holds the cane 240 in the right hand, and the direction of the cane 240 is diagonally forward and to the left of the user 180 so as to be shifted from the forward direction of the user 180.

In both (a) and (b), the ultrasonic sensor 100 of the object position analysis device 150B attached to the cane 240 is facing in the direction of the cane 240, i.e., diagonally forward and to the left of the user 180.

An analysis target direction 160*a* indicated in "(a) before correction of analysis target region" is the forward direction of the plane of the ultrasonic sensor 100 of the object position analysis device 150B (the xy plane), i.e., the z-axis direction in the perpendicular forward direction from the plane of the ultrasonic sensor 100, and an analysis target region 170*a* is set to a conical region that takes the z-axis direction as a center axis (=the analysis target direction 160*a*). That is, as illustrated in (a) in FIG. 30, rather than the forward direction of the user 180, the direction has a cone shape tilted to diagonally forward and to the left.

In this state, rather than detecting an obstacle in the direction of travel of the user 180 (the forward direction), only obstacles in front and to the left of the user 180 will be detected, and the detection of obstacles in the forward direction of the user will be insufficient.

Accordingly, the object position analysis device 150B uses detection information from the attitude sensor 200 to detect the angle between the direction of travel of the user 180 (=the direction of travel of the cane 240) and the forward direction of the plane of the ultrasonic sensor 100 of the object position analysis device 150B (the xy plane), i.e., the z-axis direction in the perpendicular forward direction from the plane of the ultrasonic sensor 100.

The direction of travel of the user 180 (=the direction of travel of the cane 240) is the user forward direction (θ, φ)=(θs, φs) indicated in (a) and (b) in FIG. 30.

The object position analysis device 150B obtains the angle information of the user forward direction (θ, φ)=(θs, φs) input from the attitude sensor 200, executes analysis target direction correction processing for setting an analysis target direction 160*b* to the user forward direction (θ, φ)=(θs, φs) as indicated in (b) in FIG. 30, and further executes the correction processing for setting an analysis target region 170*b* in a conical region that takes the analysis target direction 160*b* as a center axis.

Through this correction processing, as indicated in (b) in FIG. 30, the analysis target region 170*b* is set to a cone shape facing in the forward direction of the user 180, which makes it possible to reliably detect objects in the direction of travel of the user.

Note that the processing for setting the analysis target direction 160*b* to the user forward direction (θ, φ)=(θs, φs) and setting the analysis target region 170*b* in the periphery thereof is executed by the phase correlation determination unit 124.

FIG. 31 illustrates an example of the configuration of the object position analysis device B of the present fourth embodiment.

The object position analysis device B illustrated in FIG. 31 corresponds to a configuration in which the attitude sensor 200 has been added to the object position analysis device 150 of the first embodiment described earlier with reference to FIG. 9.

The amplitude determination unit 123 of the data processing unit 120 selects reflected wave parts from the input signals (reflected waves) of each of the microphones constituting the square ultrasonic microphone array 102, and further extracts only reflected waves exceeding a predefined amplitude threshold from the selected reflected waves as valid reflected waves.

Furthermore, the phase difference correlation determination unit 124 calculates the phase difference correlation evaluation value according to the above-described evaluation value calculation formula (Formula 1) on the basis of the reflected waves exceeding the defined amplitude threshold extracted by the amplitude determination unit 123, and extracts only a reflected wave exceeding a predefined threshold (the phase difference correlation evaluation value correspondence threshold).

However, the phase difference correlation determination unit 124 in the present fourth embodiment inputs, from the attitude sensor 200, the angle information of the direction of travel of the user 180 (=the direction of travel of the cane 240), i.e., the user forward direction (θ, φ)=(θs, φs) indicated in (a) and (b) in FIG. 30, and calculates the phase difference correlation evaluation value on the basis of the user forward direction angle information.

The evaluation value calculation formula indicated at the bottom of (a) in FIG. 30, i.e., the following (Formula 6a), is an evaluation value calculation formula in which the forward direction (z-axis direction) (θ, φ)=(0, 0) of the ultrasonic sensor 100 is set to the analysis target direction 160*a* instead of the user forward direction (θ, φ)=(θs, φs).

[Math. 7]

$$\text{Evaluation value} = \frac{pd(0, 0)^H R\ pd(0, 0)}{pd(0, 0)^H pd(0, 0)} \qquad \text{(Formula 6a)}$$

The phase difference correlation evaluation value calculated through the evaluation value calculation formula according to the foregoing (Formula 6a) is the highest in the forward direction of the plane of the ultrasonic sensor 100 of the object position analysis device 150B (the xy plane), i.e., the z-axis direction in the perpendicular forward direction from the plane of the ultrasonic sensor 100 (θ, φ)=(0, 0).

In other words, the phase difference correlation evaluation value calculated through the evaluation value calculation formula according to the foregoing (Formula 6a) corresponds to a configuration in which the analysis target direction 160*a* is set to the forward direction of the plane of the ultrasonic sensor 100 of the object position analysis device 150B (the xy plane), i.e., the z-axis direction in the perpendicular forward direction from the plane of the ultrasonic sensor 100. As a result, the analysis target direction 160*a* indicated in "(a) before correction of analysis target region" in FIG. 30 is obtained.

With these settings, the analysis target region 170*a* is set to a conical region that takes the z-axis direction in the perpendicular forward direction from the plane of the ultrasonic sensor 100 as a center axis (=the analysis target direction 160*a*). That is, as illustrated in (a) in FIG. 30, rather than the forward direction of the user 180, the direction is set to a cone shape tilted to diagonally forward and to the left.

To solve such a problem, the phase difference correlation determination unit 124 in the present fourth embodiment inputs, from the attitude sensor 200, the angle information of the direction of travel of the user 180 (=the direction of travel of the cane 240), i.e., the user forward direction (θ, φ)=(θs, φs) indicated in (a) and (b) in FIG. 30, and calculates the phase difference correlation evaluation value on the basis of the user forward direction angle information.

In other words, the phase difference correlation evaluation value is calculated using the evaluation value calculation formula indicated by the following (Formula 6b).

[Math. 8]

$$\text{Evaluation value} = \frac{pd(\theta s, \phi s)^H R\ pd(\theta s, \phi s)}{pd(\theta s, \phi s)^H pd(\theta s, \phi s)} \qquad \text{(Formula 6b)}$$

The evaluation value calculation formula according to the foregoing (Formula 6b) is an evaluation value calculation formula in which the user forward direction (θ, φ)=(θs, φs) is set to the analysis target direction 160*b*, as indicated in (b) in FIG. 30.

The phase difference correlation evaluation value calculated through the evaluation value calculation formula according to the foregoing (Formula 6b) is highest in the user forward direction (θ, φ)=(θs, φs).

In other words, the phase difference correlation evaluation value calculated through the evaluation value calculation formula according to the foregoing (Formula 6b) corresponds to a configuration in which the analysis target direction 160*b* is set in the user forward direction (θ, φ)=(θs, φs). As a result, the analysis target direction 160*b* indicated in "(b) before correction of analysis target region" in FIG. 30 is obtained.

With these settings, the analysis target region 170*b* is set to a conical region that takes the user forward direction (θ, φ)=(θs, φs) as the center axis. In other words, as indicated in (b) in FIG. 30, the region is set to a cone shape in the forward direction of the user 180.

In this manner, in the configuration of the present fourth embodiment, the phase difference correlation determination unit 124 inputs the angle information of the direction of travel of the user 180 (the forward direction) from the attitude sensor 200, and executes phase difference correlation evaluation value calculation processing such that the evaluation value is the highest when the analysis target direction is set to the direction of travel of the user 180 (the forward direction).

This processing makes it possible to set the analysis target region to the forward direction of the user 180.

A processing sequence performed by the object position analysis device B of the present fourth embodiment will be described next with reference to FIG. 32.

FIG. 32 is a flowchart illustrating a processing sequence performed by the object analysis device 150B of the fourth embodiment, i.e., illustrated in FIG. 31. Note that the processing according to the flowchart illustrated in FIG. 32 can be executed according to a program stored in a storage unit of the object analysis device 150B illustrated in FIG. 31.

The processing according to the flowchart illustrated in FIG. 32 is executed under the control of a control unit having a function for executing programs, such as a CPU, of the object analysis device 150B. The processing of each step in the flow illustrated in FIG. 32 will be described in detail hereinafter in order.

(Step S100)

First, in step S100, the object analysis device 150B illustrated in FIG. 31 obtains a detection value from the attitude sensor 200.

This processing is performed by the attitude sensor 200 of the object analysis device 150B illustrated in FIG. 31.

The attitude sensor 200 obtains the direction of travel of the user (=the direction of travel of the cane), i.e., the angle information in the user forward direction (θ, φ)=(θs, φs) indicated in (a) and (b) in FIG. 30 described earlier (the angle information with respect to the sensor forward direction (the z-axis direction)).

The angle information of the user forward direction (θ, φ)=(θs, φs) obtained by the attitude sensor 200 (the angle information with respect to the sensor forward direction (the z-axis direction)) is input to the phase difference correlation determination unit 124 of the data processing unit 120.

(Step S101)

The processing of the subsequent steps S101 to S103 is the same as the processing of steps S101 to S103 in the processing flow of the first embodiment described earlier with reference to FIG. 23.

First, in step S101, the object analysis device 150B transmits an ultrasonic wave pulse.

This processing is executed by the timing control unit 121 of the data processing unit 120 of the object analysis device 150B illustrated in FIG. 31, the ultrasonic pulse transmission unit 122, and the ultrasonic speaker 101 of the ultrasonic sensor 100.

The timing control unit 121 controls the timing of the output of the ultrasonic pulse signal output from the ultrasonic speaker 101 of the ultrasonic sensor 100. The ultrasonic pulse transmission unit 122 generates an ultrasonic pulse signal, and outputs the generated ultrasonic pulse signal from the ultrasonic speaker 101 at a timing controlled by the timing control unit 121.

When the plane having the ultrasonic speaker 101 and the square ultrasonic microphone array 102 constituting the ultrasonic sensor 100 is taken as the xy plane, the output direction of the ultrasonic pulse signal output from the ultrasonic speaker 101 of the ultrasonic sensor 100 is the z-axis direction.

(Step S102)

Next, in step S102, the object analysis device 150 receives a reflected wave from the ultrasonic wave pulse transmitted in step S101.

The ultrasonic pulse signal emitted from the ultrasonic speaker 101 of the ultrasonic sensor 100 is reflected by various objects, and these reflected waves are input into each of the microphones constituting the square ultrasonic microphone array 102 of the ultrasonic sensor 100, i.e., the microphones 1/102-1 to n/102-*n* illustrated in FIG. 9.

(Step S103)

Next, in step S103, the object analysis device 150B executes processing for extracting only reflected waves exceeding a predefined threshold from the reflected waves received by the microphones in step S102.

This processing is processing performed by the amplitude determination unit 123 of the data processing unit 120 of the object analysis device 150B illustrated in FIG. 31.

The amplitude determination unit 123 selects reflected wave parts from the input signals (reflected waves) of each of the microphones 1/102-1 to n/102-*n* constituting the square ultrasonic microphone array 102, and further extracts only reflected waves exceeding a predefined amplitude threshold from the selected reflected waves as valid reflected waves.

Note that a reflected wave "exceeding a defined amplitude threshold" means that the reflected wave has a reception strength sufficiently greater than environmental noise.

The processing performed by the amplitude determination unit 123 in step S103 corresponds to the processing described earlier with reference to FIGS. 11 and 12. First, the amplitude determination unit 123 selects the reflected wave part from the microphone reception signal. Then, the amplitude determination unit 123 extracts, from the selected reflected wave, only a reflected wave exceeding a predefined amplitude threshold prescribed, as a valid reflected wave.

For example, as described earlier with reference to FIG. 12, the waveform part indicated in "(b2) Example of processing by amplitude determination unit 123-2" in FIG. 12 is extracted as a valid reflected wave exceeding the predefined amplitude threshold.

(Step S104)

Next, in step S104, the object analysis device 150B executes processing for extracting, from the reflected waves exceeding the defined amplitude threshold extracted in step S103, only a reflected wave for which the phase difference correlation evaluation value further exceeds a predefined threshold (the phase difference correlation evaluation value correspondence threshold).

However, in the present fourth embodiment, the angle information of the direction of travel of the user 180 (=the direction of travel of the cane 240), i.e., the user forward direction (θ, φ)=(θs, φs) indicated in (a) and (b) in FIG. 30, is input from the attitude sensor 200, and the phase difference correlation evaluation value is calculated on the basis of the user forward direction angle information, as described with reference to FIGS. 30, and 31.

In other words, the phase difference correlation evaluation value is calculated by generating an evaluation value calculation formula according to (Formula 6b) described earlier.

The evaluation value calculation formula according to (Formula 6b) described earlier is an evaluation value calculation formula in which the user forward direction (θ, φ)=(θs, φs) is set to the analysis target direction 160*b*, as indicated in (b) in FIG. 30.

The phase difference correlation evaluation value calculated through the evaluation value calculation formula according to the foregoing (Formula 6b) is highest in the user forward direction (θ, φ)=(θs, φs).

In other words, the phase difference correlation evaluation value calculated through the evaluation value calculation formula according to the foregoing (Formula 6b) corresponds to a configuration in which the analysis target direction 160*b* is set in the user forward direction (θ, φ)=(θs, φs). As a result, the analysis target direction 160*b* indicated in "(b) before correction of analysis target region" in FIG. 30 is obtained.

With these settings, the analysis target region 170*b* is set to a conical region that takes the user forward direction (θ, φ)=(θs, φs) as the center axis. In other words, as indicated in (b) in FIG. 30, the region is set to a cone shape in the forward direction of the user 180.

In this manner, in the configuration of the present fourth embodiment, the phase difference correlation determination unit 124 inputs the angle information of the direction of travel of the user 180 (the forward direction) from the attitude sensor 200, and executes phase difference correlation evaluation value calculation processing such that the evaluation value is the highest when the analysis target direction is set to the direction of travel of the user 180 (the forward direction). This processing makes it possible to set the analysis target region to the forward direction of the user 180.

The phase difference correlation determination unit 124 further perform processing for comparing the phase difference correlation evaluation value calculated on the basis of the evaluation value calculation formula according to the foregoing (Formula 6b) with a predefined threshold (the phase difference correlation evaluation value correspondence threshold), and determining a region in which the phase difference correlation evaluation value exceeds the threshold as the analysis target region.

This processing is the same as the processing described earlier with reference to FIG. 19.

As described above, the threshold (the phase difference correlation evaluation value correspondence threshold) can be set in various ways, and if the threshold is set to a low value, a broader analysis target region can be set. On the other hand, if the threshold is set to a high value, an analysis target region having a narrower, more limited range can be set.

In this manner, in step S104, the phase difference correlation determination unit 124 calculates the phase difference correlation evaluation value according to the above-described evaluation value calculation formula (Formula 6b) on the basis of the reflected wave exceeding the defined amplitude threshold extracted by the amplitude determination unit 123 in step S103, and extracts only a reflected wave exceeding a predefined threshold (the phase difference correlation evaluation value correspondence threshold).

This processing makes it possible to extract only reflected waves from the analysis target region 170*b* set in the forward direction of the user 180, as indicated in (b) in FIG. 30.

(Steps S105 and S106)

Next, in steps S105 and S106, the object analysis device 150 calculates the object position (distance and direction) based on the reflected wave extracted by the phase difference correlation determination unit 124 in step S104, i.e., by analyzing only the reflected wave from the analysis target region 170*b* set in the forward direction of the user 180.

This processing is processing performed by the object position (distance and direction) calculation unit 125 of the data processing unit 120 of the object analysis device 150B illustrated in FIG. 31.

The object position (distance and direction) calculation unit 125 calculates the distance of the object on the basis of a response time, which is a time from the timing at which the audio pulse is output to the timing at which the reflected wave is received, according to the principles of Time of Flight (ToF), for example.

Furthermore, the direction of the object is estimated by applying an algorithm such as a beamforming method, MUSIC, or the like.

For example, in the first embodiment, the direction of the reflected wave, i.e., the direction of the object, is calculated according to the processing described with reference to FIGS. 21 and 22.

In this manner, in steps S105 and S106, the object position (distance and direction) calculation unit 125 calculates the distance to and direction of the object that produced the reflected wave.

As described above, the object analysis device 150B of the present fourth embodiment sets the analysis target region that limits the analysis target direction to the direction of travel of the user (the forward direction) on the basis of information on the direction of travel (the forward direction) of the user obtained by the attitude sensor 200, and uses the reflected waves from the set analysis target region to calculate the position of the object that produced the reflected waves, i.e., the distance to and the direction of the object.

Performing such processing makes it possible to perform the processing for analyzing the position (distance and direction) of an object in the direction of travel of the user (the forward direction) with a high level of accuracy.

7. Example of Hardware Configuration of Object Position Analysis Device

An example of the hardware configuration of the object position analysis device of the present disclosure will be described next with reference to FIG. 33.

The object position analysis device corresponds to the object position analysis devices 150 and 150B described earlier with reference to 23, FIG. 32, and the like. Each constituent element in the hardware configuration of the object position analysis device of the present disclosure illustrated in FIG. 33 will be described hereinafter.

A Central Processing Unit (CPU) 301 functions as a data processing unit that performs various types of processing according to a program stored in a Read Only Memory (ROM) 302 or a storage unit 308. For example, the processing according to the sequences described in the foregoing embodiments is performed. Programs executed by the CPU 301, data, and the like are stored in a Random Access Memory (RAM) 303. The CPU 301, the ROM 302, and the RAM 303 are connected to each other by a bus 304.

The CPU 301 is connected to an input/output interface 305 by the bus 304, and an input unit 306, an output unit 307, the storage unit 308, and communication unit 309, as well as a drive 310 connected to a removable medium, are connected to the input/output interface 305.

The input unit 306 is constituted by various types of sensors such the ultrasonic sensor, the attitude sensor, and the like described in the foregoing embodiments, as well as various types of switches, a keyboard, a touch panel, a mouse, a microphone, user input units, and the like.

The output unit 307 is constituted by a speaker for outputting an audio pulse such as the ultrasonic waves described in the foregoing embodiments, a display, and the like.

The CPU 301 is input with commands from the input unit 306, status data, and the like, executes various types of processing, and outputs processing results to the output unit 307, for example.

The storage unit 308 connected to the input/output interface 305 is constituted by, for example, a hard disk or the like, and stores programs executed by the CPU 301, various types of data, and the like. The communication unit 309 functions as a transmission/reception unit for data communication over a network such as the Internet or a local area network, and communicates with external devices.

The drive 310 connected to the input/output interface 305 drives a removable medium 311 such as a magnetic disk, an optical disk, a magneto-optical disk, or a semiconductor memory such as a memory card, and records or reads data.

8. Summary of Configuration of Present Disclosure

Embodiments of the present disclosure have been described above in detail with reference to specific embodiments. However, it will be apparent to those skilled in the art that modifications and substitutions of the embodiments can be made without departing from the essential spirit of the technology disclosed in the present disclosure. That is, the present invention has been disclosed in the form of examples and should not be construed in a limiting manner. The essential spirit of the present disclosure should be determined in consideration of the claims.

The technology disclosed in the present specification can have the following configuration.

(1) An object position analysis device including:

a speaker that outputs a sound pulse signal;

a plurality of microphones that input reflected waves from the sound pulse signal output by the speaker; and a data processing unit that analyzes the reflected waves input by the plurality of microphones and analyzes a position of an object that has reflected the sound pulse signal, wherein the data processing unit:

selects, as an analysis target reflected wave, a reflected wave, among the reflected waves input by the plurality of microphones, having a phase difference that has a high correlation with a phase difference of a sound pulse signal from an analysis target direction defined in advance; and analyzes a position of an object in an analysis target region near the analysis target direction through analysis processing on the analysis target reflected wave selected.

(2) The object position analysis device according to (1), wherein the data processing unit:

calculates a phase difference correlation evaluation value that takes on a greater value as the correlation between the reflected waves input by the plurality of microphones and the phase difference of the sound pulse signal from the analysis target direction increases; and selects, as the analysis target reflected wave, a reflected wave for which the phase difference correlation evaluation value calculated exceeds a threshold defined in advance.

(3) The object position analysis device according to (1) or (2), wherein the plurality of microphones are at least three microphones arranged on an xy plane such that projection positions of the microphones on an x axis do not overlap, and the data processing unit selects, as the analysis target reflected wave, a reflected wave, among the reflected waves input by the at least three microphones, having a phase difference that has a high correlation with the phase difference of the sound pulse signal from the analysis target direction defined in advance.

(4) The object position analysis device according to any one of (1) to (3), wherein the plurality of microphones are at least three microphones arranged on an xy plane such that projection positions of the microphones on an x axis do not overlap and projection positions of the microphones on a y axis do not overlap, and the data processing unit selects, as the analysis target reflected wave, a reflected wave, among the reflected waves input by the at least three microphones, having a phase difference that has a high correlation with the phase difference of the sound pulse signal from the analysis target direction defined in advance.

(5) The object position analysis device according to any one of (1) to (4), wherein the plurality of microphones constitute a square microphone array in which four microphones are arranged on an xy plane at positions of four corresponding vertices of a square tilted relative to an x axis.

(6) The object position analysis device according to (5), wherein the data processing unit:

selects, as an analysis target reflected wave, a reflected wave, among the reflected waves input by the microphones constituting the square microphone array, having a phase difference that has a high correlation with a phase difference of a sound pulse signal from an analysis target direction defined in advance; and analyzes a position of an object in an analysis target region constituted by a conical region that takes the analysis target direction as a center axis, through analysis processing on the analysis target reflected wave selected.

(7) The object position analysis device according to any one of (1) to (4), wherein the plurality of microphones constitute a diamond-shaped microphone array in which four microphones are arranged on an xy plane at positions of four corresponding vertices of a diamond shape that is longer in a y-axis direction and is tilted relative to an x axis.

(8) The object position analysis device according to (7), wherein the data processing unit:

selects, as an analysis target reflected wave, a reflected wave, among the reflected waves input by the microphones constituting the diamond-shaped microphone array, having a phase difference that has a high correlation with a phase difference of a sound pulse signal from an analysis target direction defined in advance; and analyzes a position of an object in an analysis target region constituted by a flat conical region that takes the analysis target direction as a center axis, through analysis processing on the analysis target reflected wave selected.

(9) The object position analysis device according to any one of (1) to (4), wherein the plurality of microphones constitute a triangular array in which three microphones are arranged on an xy plane at positions of three corresponding vertices of a triangle tilted relative to an x axis.

(10) The object position analysis device according to any one of (1) to (9), wherein the sound pulse signal is an ultrasonic wave signal, the speaker outputs the ultrasonic wave signal, the plurality of microphones input reflected waves from the ultrasonic wave signal output by the speaker, and the data processing unit performs analysis processing on the reflected waves from the ultrasonic wave signal input by the plurality of microphones.

(11) The object position analysis device according to any one of (1) to (10), wherein the data processing unit includes:

an amplitude determination unit that extracts, from the reflected waves input by the plurality of microphones, only reflected waves exceeding an amplitude threshold defined in advance, as valid reflected waves;

a phase difference correlation determination unit that extracts, from the reflected waves exceeding the defined amplitude threshold extracted by the amplitude determination unit, only a reflected wave that further exceeds a defined phase difference correlation evaluation value correspondence threshold; and an object position calculation unit that analyzes a distance and a direction of an object within the analysis target region by analyzing the reflected wave exceeding the prescribed phase difference correlation evaluation value correspondence threshold extracted by the phase difference correlation determination unit.

(12) The object position analysis device according to (11), wherein the phase difference correlation determination unit:

calculates a phase difference correlation evaluation value that takes on a greater value as the correlation between the reflected waves input by the plurality of microphones and the phase difference of the sound pulse signal from the analysis target direction increases; and extracts, as the analysis target reflected wave, a reflected wave for which the phase difference correlation evaluation value calculated exceeds a threshold defined in advance.

(13) The object position analysis device according to (11) or (12), wherein as analysis processing for analyzing the reflected wave exceeding the prescribed phase difference correlation evaluation value correspondence threshold extracted by the phase difference correlation determination unit, the object position calculation unit: performs processing of projecting the plurality of microphones arranged on an xy plane onto an x axis, and calculating a direction α of a reflected wave in an xz plane on the basis of a phase difference, among the microphones, of the reflected waves at positions of the microphones projected.

(14) The object position analysis device according to (13), wherein the object position calculation unit further performs processing of projecting the plurality of microphones arranged on the xy plane onto a y axis, and calculating a direction β of a reflected wave in a yz plane on the basis of a phase difference, among the microphones, of the reflected waves at positions of the microphones projected.

(15) The object position analysis device according to any one of (11) to (14), further including:

an attitude sensor that analyzes an attitude of the object position analysis device, wherein the phase difference correlation determination unit controls the analysis target direction and the analysis target region on the basis of a detection value from the attitude sensor.

(16) The object position analysis device according to (15), wherein on the basis of the detection value from the attitude sensor, the phase difference correlation determination unit controls the analysis target direction to be set to a direction of travel of a user holding the object position analysis device.

(17) An object position analysis method performed by an object position analysis device, the object position analysis method including:

outputting, by a speaker, a sound pulse signal;

inputting, by a plurality of microphones, reflected waves from the sound pulse signal output by the speaker; and performing, by a data processing unit, object position analysis processing of analyzing the reflected waves input by the plurality of microphones and analyzing a position of an object that has reflected the sound pulse signal, wherein in the object position analysis processing, the data processing unit: selects, as an analysis target reflected wave, a reflected wave, among the reflected waves input by the plurality of microphones, having a phase difference that has a high correlation with a phase difference of a sound pulse signal from an analysis target direction defined in advance; and analyzes a position of an object in an analysis target region near the analysis target direction through analysis processing on the analysis target reflected wave selected.

(18) A program that causes an object position analysis device to perform object position analysis processing, the object position analysis processing including: causing a speaker to output a sound pulse signal;

causing a plurality of microphones to input reflected waves from the sound pulse signal output by the speaker; and causing a data processing unit to perform object position analysis processing of analyzing the reflected waves input by the plurality of microphones and analyzing a position of an object that has reflected the sound pulse signal, wherein in the object position analysis processing, the program causes the object position analysis device to:

perform processing of selecting, as an analysis target reflected wave, a reflected wave, among the reflected waves input by the plurality of microphones, having a phase difference that has a high correlation with a phase difference of a sound pulse signal from an analysis target direction defined in advance; and perform processing of analyzing a position of an object in an analysis target region near the analysis target direction through analysis processing on the analysis target reflected wave selected.

Note that the series of processing described in the specification can be executed by hardware, software, or a composite configuration of both. When the processing is executed by software, a program in which a processing sequence has been recorded can be installed in memory in a computer embedded in dedicated hardware and executed, or the program can be installed in a general-purpose computer capable of executing various types of processing and executed. For example, the program can be recorded in advance on a recording medium. In addition to being installed in the computer from the recording medium, the program can be received over a network such as a local area network (LAN) or the Internet and installed in a recording medium such as a built-in hard disk.

The various processing described in this specification can be performed consecutively in the described order or may be performed in parallel or individually depending on the processing capability of the device performing the processing, or as needed. In the present specification, the system is a logical set of configurations of a plurality of devices, and the devices having each configuration are not limited to being in the same housing.

INDUSTRIAL APPLICABILITY

As described above, according to the configuration of one embodiment of the present disclosure, an object position analysis device that analyzes the position of an object in a specific analysis target region is realized.

Specifically, for example, the device includes: a speaker that outputs a sound pulse signal: a plurality of microphones that input reflected waves from the sound pulse signal output by the speaker; and a data processing unit that analyzes the reflected waves input by the plurality of microphones and analyzes a position of an object that has reflected the sound pulse signal. The data processing unit: selects, as an analysis target reflected wave, a reflected wave, among the reflected waves input by the plurality of microphones, having a phase difference that has a high correlation with a phase difference of a sound pulse signal from an analysis target direction defined in advance; and analyzes a position of an object in an analysis target region near the analysis target direction through analysis processing on the analysis target reflected wave selected.

According to this configuration, an object position analysis device that analyzes the position of an object in a specific analysis target region is realized.

REFERENCE SIGNS LIST

10 Robot
20 Ultrasonic sensor
21 Ultrasonic speaker
22 Ultrasonic microphone array
50 Object
60 False image
100 Ultrasonic sensor
101 Ultrasonic speaker
102 Square ultrasonic microphone array
103 Diamond-shaped ultrasonic microphone array
104 Triangular ultrasonic microphone array
120 Data processing unit
121 Timing control unit
122 Ultrasonic pulse transmission unit
123 Amplitude determination unit
124 Phase difference correlation determination unit
125 Object position (distance and direction) estimation unit
160 Analysis target direction
170 Analysis target region
175 Analysis exclusion region
200 Attitude sensor
240 Cane
301 CPU
302 ROM
303 RAM
304 Bus
305 Input/output interface
306 Input unit
307 Output unit
308 Storage unit
309 Communication unit
310 Drive
311 Removable medium

The invention claimed is:

1. An object position analysis device comprising:
a speaker that outputs a sound pulse signal;
a plurality of microphones that input reflected waves from the sound pulse signal output by the speaker; and
a data processing unit that analyzes the reflected waves input by the plurality of microphones and analyzes a position of an object that has reflected the sound pulse signal,
wherein the data processing unit:
selects, as an analysis target reflected wave, a reflected wave, among the reflected waves input by the plurality of microphones, having a phase difference that has a high correlation with a phase difference of a sound pulse signal from an analysis target direction defined in advance; and
analyzes a position of an object in an analysis target region near the analysis target direction through analysis processing on the analysis target reflected wave selected.

2. The object position analysis device according to claim 1,
wherein the data processing unit:
calculates a phase difference correlation evaluation value that takes on a greater value as the correlation between the reflected waves input by the plurality of microphones and the phase difference of the sound pulse signal from the analysis target direction increases; and
selects, as the analysis target reflected wave, a reflected wave for which the phase difference correlation evaluation value calculated exceeds a threshold defined in advance.

3. The object position analysis device according to claim 1,
wherein the plurality of microphones are at least three microphones arranged on an xy plane such that projection positions of the microphones on an x axis do not overlap, and
the data processing unit selects, as the analysis target reflected wave, a reflected wave, among the reflected waves input by the at least three microphones, having a phase difference that has a high correlation with the phase difference of the sound pulse signal from the analysis target direction defined in advance.

4. The object position analysis device according to claim 1,
wherein the plurality of microphones are at least three microphones arranged on an xy plane such that projection positions of the microphones on an x axis do not overlap and projection positions of the microphones on a y axis do not overlap, and
the data processing unit selects, as the analysis target reflected wave, a reflected wave, among the reflected waves input by the at least three microphones, having a phase difference that has a high correlation with the phase difference of the sound pulse signal from the analysis target direction defined in advance.

5. The object position analysis device according to claim 1,
wherein the plurality of microphones constitute a square microphone array in which four microphones are arranged on an xy plane at positions of four corresponding vertices of a square tilted relative to an x axis.

6. The object position analysis device according to claim 5, wherein the data processing unit:

selects, as an analysis target reflected wave, a reflected wave, among the reflected waves input by the microphones constituting the square microphone array, having a phase difference that has a high correlation with a phase difference of a sound pulse signal from an analysis target direction defined in advance; and analyzes a position of an object in an analysis target region constituted by a conical region that takes the analysis target direction as a center axis, through analysis processing on the analysis target reflected wave selected.

7. The object position analysis device according to claim 1, wherein the plurality of microphones constitute a diamond-shaped microphone array in which four microphones are arranged on an xy plane at positions of four corresponding vertices of a diamond shape that is longer in a y-axis direction and is tilted relative to an x axis.

8. The object position analysis device according to claim 7, wherein the data processing unit:

selects, as an analysis target reflected wave, a reflected wave, among the reflected waves input by the microphones constituting the diamond-shaped microphone array, having a phase difference that has a high correlation with a phase difference of a sound pulse signal from an analysis target direction defined in advance; and analyzes a position of an object in an analysis target region constituted by a flat conical region that takes the analysis target direction as a center axis, through analysis processing on the analysis target reflected wave selected.

9. The object position analysis device according to claim 1, wherein the plurality of microphones constitute a triangular array in which three microphones are arranged on an xy plane at positions of three corresponding vertices of a triangle tilted relative to an x axis.

10. The object position analysis device according to claim 1, wherein the sound pulse signal is an ultrasonic wave signal, the speaker outputs the ultrasonic wave signal, the plurality of microphones input reflected waves from the ultrasonic wave signal output by the speaker, and the data processing unit performs analysis processing on the reflected waves from the ultrasonic wave signal input by the plurality of microphones.

11. The object position analysis device according to claim 1, wherein the data processing unit includes:

an amplitude determination unit that extracts, from the reflected waves input by the plurality of microphones, only reflected waves exceeding an amplitude threshold defined in advance, as valid reflected waves;

a phase difference correlation determination unit that extracts, from the reflected waves exceeding the defined amplitude threshold extracted by the amplitude determination unit, only a reflected wave that further exceeds a defined phase difference correlation evaluation value correspondence threshold; and an object position calculation unit that analyzes a distance and a direction of an object within the analysis target region by analyzing the reflected wave exceeding the prescribed phase difference correlation evaluation value correspondence threshold extracted by the phase difference correlation determination unit.

12. The object position analysis device according to claim 11, wherein the phase difference correlation determination unit:

calculates a phase difference correlation evaluation value that takes on a greater value as the correlation between the reflected waves input by the plurality of microphones and the phase difference of the sound pulse signal from the analysis target direction increases; and extracts, as the analysis target reflected wave, a reflected wave for which the phase difference correlation evaluation value calculated exceeds a threshold defined in advance.

13. The object position analysis device according to claim 11, wherein as analysis processing for analyzing the reflected wave exceeding the prescribed phase difference correlation evaluation value correspondence threshold extracted by the phase difference correlation determination unit, the object position calculation unit:

performs processing of projecting the plurality of microphones arranged on an xy plane onto an x axis, and calculating a direction α of a reflected wave in an xz plane on the basis of a phase difference, among the microphones, of the reflected waves at positions of the microphones projected.

14. The object position analysis device according to claim 13, wherein the object position calculation unit further performs processing of projecting the plurality of microphones arranged on the xy plane onto a y axis, and calculating a direction β of a reflected wave in a yz plane on the basis of a phase difference, among the microphones, of the reflected waves at positions of the microphones projected.

15. The object position analysis device according to claim 11, further comprising:

an attitude sensor that analyzes an attitude of the object position analysis device, wherein the phase difference correlation determination unit controls the analysis target direction and the analysis target region on the basis of a detection value from the attitude sensor.

16. The object position analysis device according to claim 15, wherein on the basis of the detection value from the attitude sensor, the phase difference correlation determination unit controls the analysis target direction to be set to a direction of travel of a user holding the object position analysis device.

17. An object position analysis method performed by an object position analysis device, the object position analysis method comprising:

outputting, by a speaker, a sound pulse signal;

inputting, by a plurality of microphones, reflected waves from the sound pulse signal output by the speaker; and performing, by a data processing unit, object position analysis processing of analyzing the reflected waves input by the plurality of microphones and analyzing a position of an object that has reflected the sound pulse signal, wherein in the object position analysis processing, the data processing unit:

selects, as an analysis target reflected wave, a reflected wave, among the reflected waves input by the plurality of microphones, having a phase difference that has a high correlation with a phase difference of a sound pulse signal from an analysis target direction defined in advance; and analyzes a position of an object in an analysis target region near the analysis target direction through analysis processing on the analysis target reflected wave selected.

18. A program that causes an object position analysis device to perform object position analysis processing, the object position analysis processing comprising:

causing a speaker to output a sound pulse signal;

causing a plurality of microphones to input reflected waves from the sound pulse signal output by the speaker; and causing a data processing unit to perform object position analysis processing of analyzing the reflected waves input by the plurality of microphones and analyzing a position of an object that has reflected the sound pulse signal, wherein in the object position analysis processing, the program causes the object position analysis device to:

perform processing of selecting, as an analysis target reflected wave, a reflected wave, among the reflected waves input by the plurality of microphones, having a phase difference that has a high correlation with a phase difference of a sound pulse signal from an analysis target direction defined in advance; and perform processing of analyzing a position of an object in an analysis target region near the analysis target direction through analysis processing on the analysis target reflected wave selected.

* * * * *